US007069249B2

(12) United States Patent
Stolfo et al.

(10) Patent No.: US 7,069,249 B2
(45) Date of Patent: Jun. 27, 2006

(54) ELECTRONIC PURCHASE OF GOODS OVER A COMMUNICATIONS NETWORK INCLUDING PHYSICAL DELIVERY WHILE SECURING PRIVATE AND PERSONAL INFORMATION OF THE PURCHASING PARTY

(75) Inventors: Salvotore J. Stolfo, Ridgewood, NJ (US); Yechiam Yemini, New York, NY (US); Leonard P. Shaykin, New York, NY (US)

(73) Assignee: iPrivacy, LLC, New York, NY (US)

( * ) Notice: Subject to any disclaimer, the term of this patent is extended or adjusted under 35 U.S.C. 154(b) by 41 days.

(21) Appl. No.: 10/441,844

(22) Filed: May 19, 2003

(65) Prior Publication Data
US 2004/0002903 A1    Jan. 1, 2004

Related U.S. Application Data

(63) Continuation of application No. 09/360,812, filed on Jul. 26, 1999, now abandoned.

(51) Int. Cl.
G06Q 30/00 (2006.01)
G06Q 99/00 (2006.01)
H04K 1/00 (2006.01)
H04L 9/00 (2006.01)
(52) U.S. Cl. ............................. 705/74; 705/64; 705/78
(58) Field of Classification Search ................. 705/26, 705/64, 74, 78
See application file for complete search history.

(56) References Cited

U.S. PATENT DOCUMENTS

| 5,255,182 | A  | * | 10/1993 | Adams ....................... 705/17 |
| 5,963,915 | A  | * | 10/1999 | Kirsch ....................... 705/26 |
| 6,006,200 | A  | * | 12/1999 | Boies et al. ................. 705/26 |
| 6,205,437 | B1 | * | 3/2001  | Gifford ....................... 705/75 |
| 6,292,789 | B1 | * | 9/2001  | Schutzer ..................... 705/40 |
| 6,422,462 | B1 | * | 7/2002  | Cohen ........................ 235/381 |
| 6,675,153 | B1 | * | 1/2004  | Cook et al. .................. 705/74 |
| 6,807,530 | B1 | * | 10/2004 | Shub et al. ................... 705/1 |

(Continued)

FOREIGN PATENT DOCUMENTS

EP    1033854 A2 *  9/2000

(Continued)

OTHER PUBLICATIONS

Lewis, P.H., "Student Accused of Running Network for Pirated Software," New York Times, late edition, column 2, p. 1, Apr. 9, 1994.*

(Continued)

Primary Examiner—Nicholas D. Rosen
(74) Attorney, Agent, or Firm—Morgan, Lewis & Bockius LLP

(57) ABSTRACT

E-commerce which may include delivery of a good ordered or purchased over a network (e.g., the Internet) to a purchaser/user, and/or arranging for electronic payment of the good is accomplished while securing private and personal information of purchasers/users. Proxy software is provided for user computers, one or more proxy computers, or both, for users to communicate with vendors anonymously over the network, provide for delivery of an ordered good and provide for electronic payment, while securing the user's private information.

6 Claims, 35 Drawing Sheets

1. First party transmits an order to the proxy party.
2. Proxy party requests credit approval of first party.
3. Third party approves credit of first party.
4. Proxy party passes order and its account information to second party
5. Second party requests credit approval of proxy party.
6. Third party approves credit of proxy party.
7. Second party ships good.
8. Third party credits second party.
9. Third party debits first party.

(Credits or payments between parties are not shown except for the credit to the second party)

U.S. PATENT DOCUMENTS

| | | | |
|---|---|---|---|
| 2001/0011250 A1* | 8/2001 | Paltenghe et al. | 705/41 |
| 2001/0014878 A1* | 8/2001 | Mitra et al. | 705/39 |
| 2002/0004900 A1* | 1/2002 | Patel | 713/155 |
| 2002/0038292 A1* | 3/2002 | Quelene | 705/80 |
| 2002/0069174 A1* | 6/2002 | Fox et al. | 705/52 |
| 2004/0249766 A1* | 12/2004 | Ganesan et al. | 705/64 |
| 2005/0033659 A1* | 2/2005 | Zucker et al. | 705/26 |

FOREIGN PATENT DOCUMENTS

| | | |
|---|---|---|
| WO | WO-9814900 A1 * | 4/1998 |

OTHER PUBLICATIONS

Reiter M.K., et al., "Anonymous Web Transactions with Crowds," Communications of the ACM, vol. 42, No. 2, pp. 32-38, Feb. 1999.*

Frezza, "Privacy Protection Needs To Be a Personal Responsibility," InternetWeek, p. 33, Mar. 29, 1999.*

Anon., "TriSense Offers Bank-Controlled Electronic Bill Presentment Solution," Business Wire, Mar. 25, 1998.*

* cited by examiner

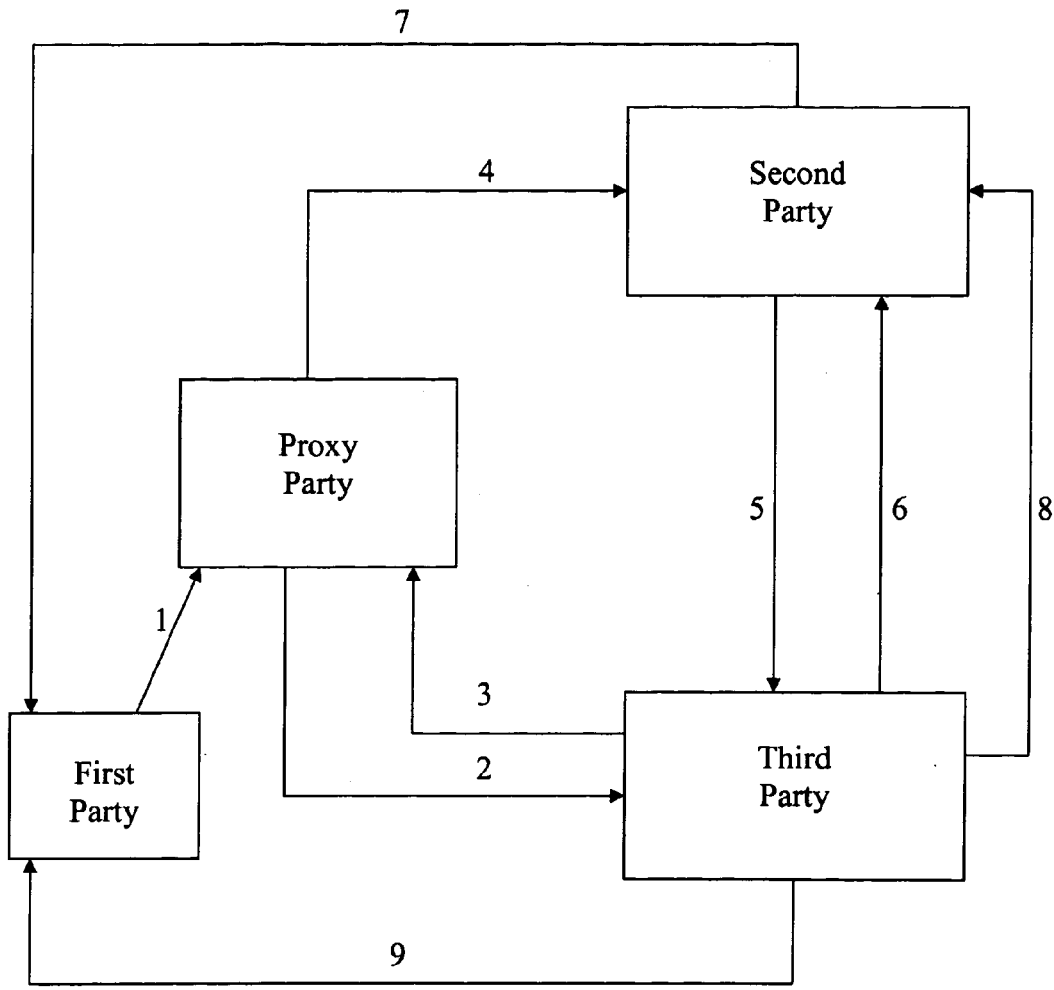

1. First party transmits an order to the proxy party.
2. Proxy party requests credit approval of first party.
3. Third party approves credit of first party.
4. Proxy party passes order and its account information to second party
5. Second party requests credit approval of proxy party.
6. Third party approves credit of proxy party.
7. Second party ships good.
8. Third party credits second party.
9. Third party debits first party.

(Credits or payments between parties are not shown except for the credit to the second party)

Fig. 3E

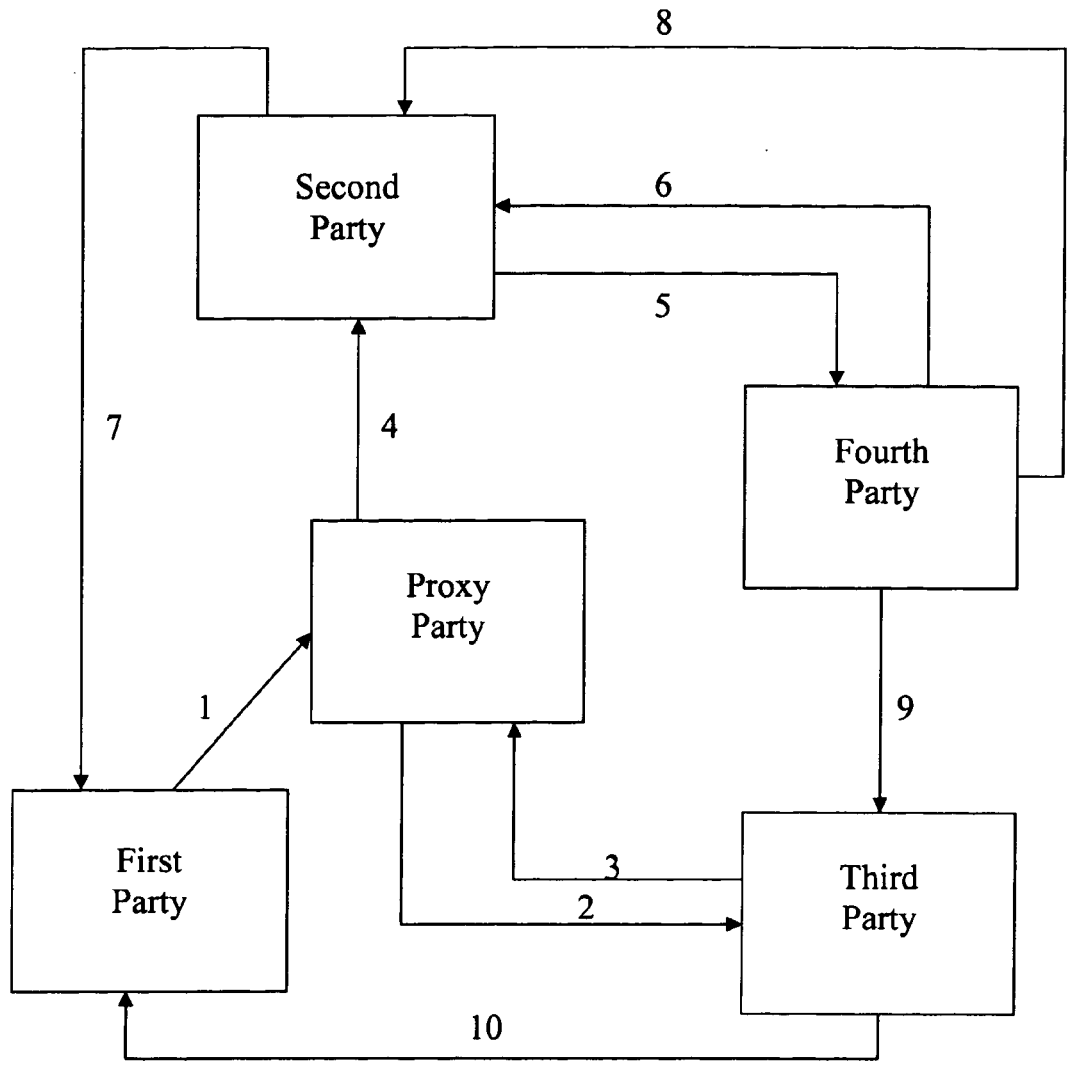

1. First party transmits an order to the proxy party.
2. Proxy party requests credit approval of first party.
3. Third party approves credit of first party.
4. Proxy party passes the order and its account information to second party.
5. Second party requests credit approval of proxy party.
6. Fourth party approves credit of proxy party.
7. Second party ships good.
8. Fourth party credits second party.
9. Fourth party debits third party.
10. Third party debits first party.

(Credits or payments between parties are not shown except for the credit to the second party)

Fig. 3F

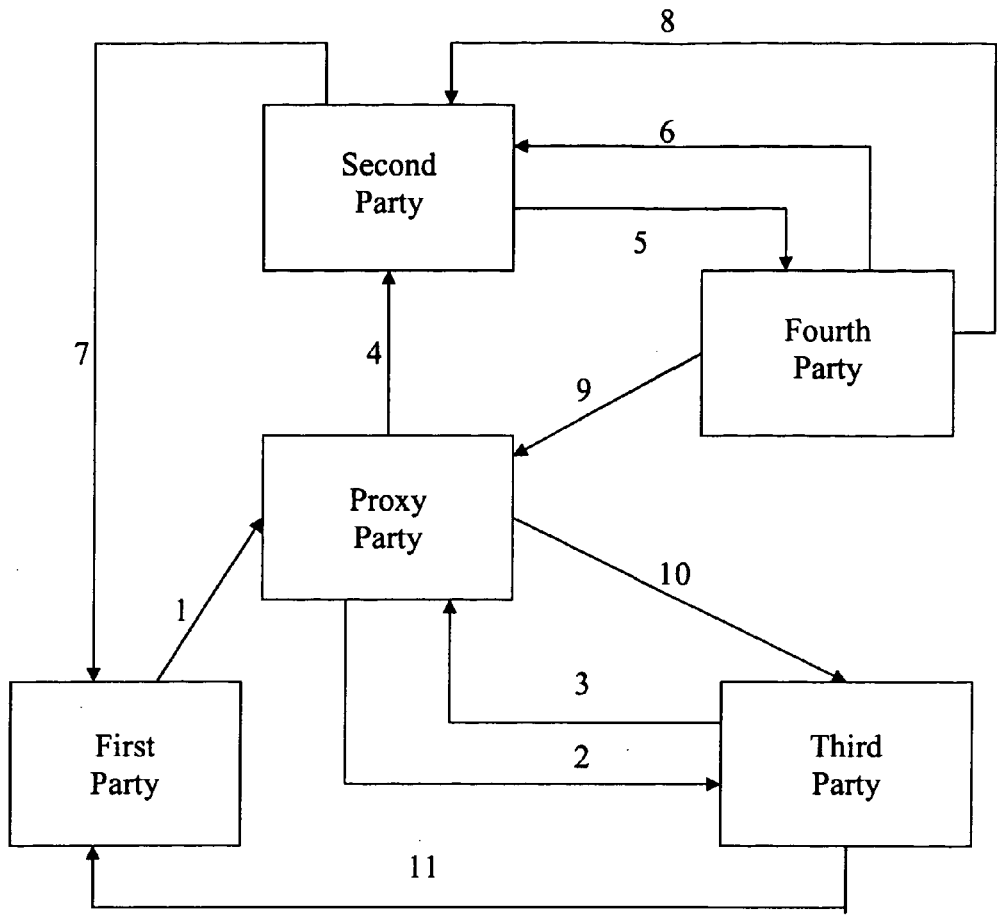

1. First party transmits an order to the proxy party.
2. Proxy party requests credit approval of first party.
3. Third party approved credit of first party.
4. Proxy party passes the order and its account information to second party.
5. Second party requests credit approval of proxy party.
6. Fourth party approves credit of proxy party.
7. Second party Ships good.
8. Fourth party credits second party.
9. Fourth party debits proxy party.
10. Proxy party debits proxy party.
11. Third party debits first party.

(Credit or payments between parties are not shown except for the credit to the second party)

Fig. 3G

1. First party transmits an order to the second party.
2. Second party requests credit approval of first party.
3. Third party approves credit of first party.
4. Second party ships good.
5. Third party credits second party.
6. Third party debits first party.

Browse first

- Customer with client computer or wallet with preloaded Client Plug-in Proxy Software with Serial Number I decides to Browse and Shop at Retailer Website R

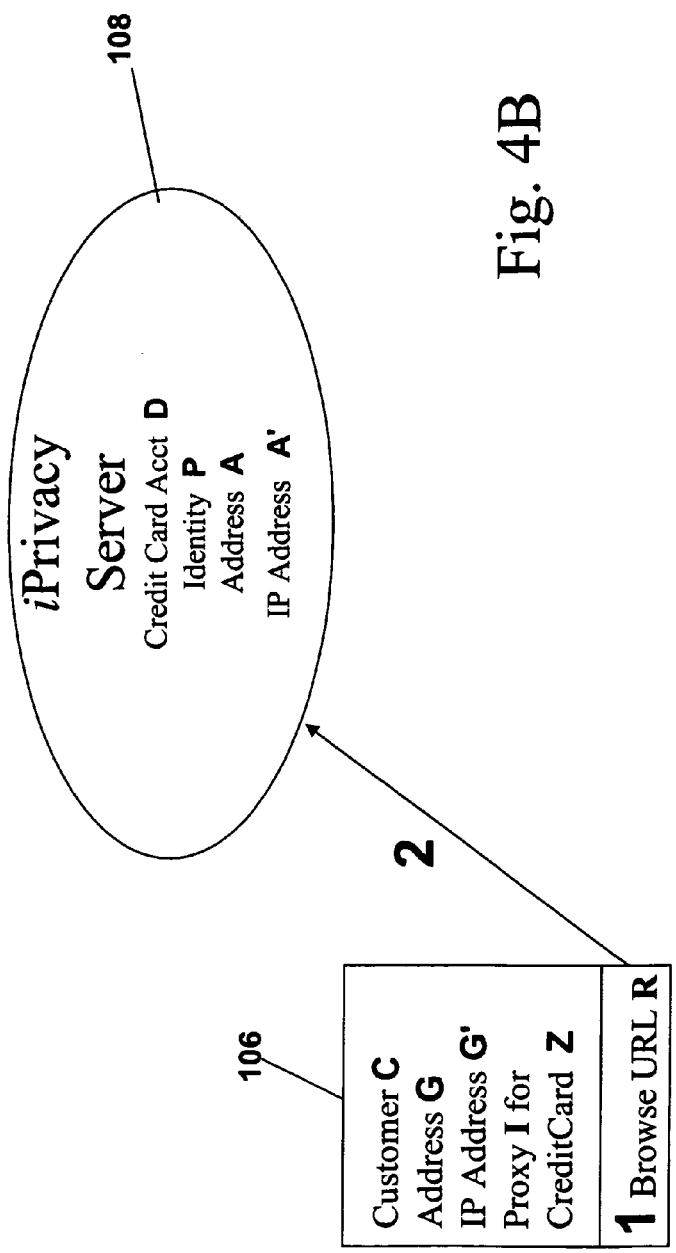

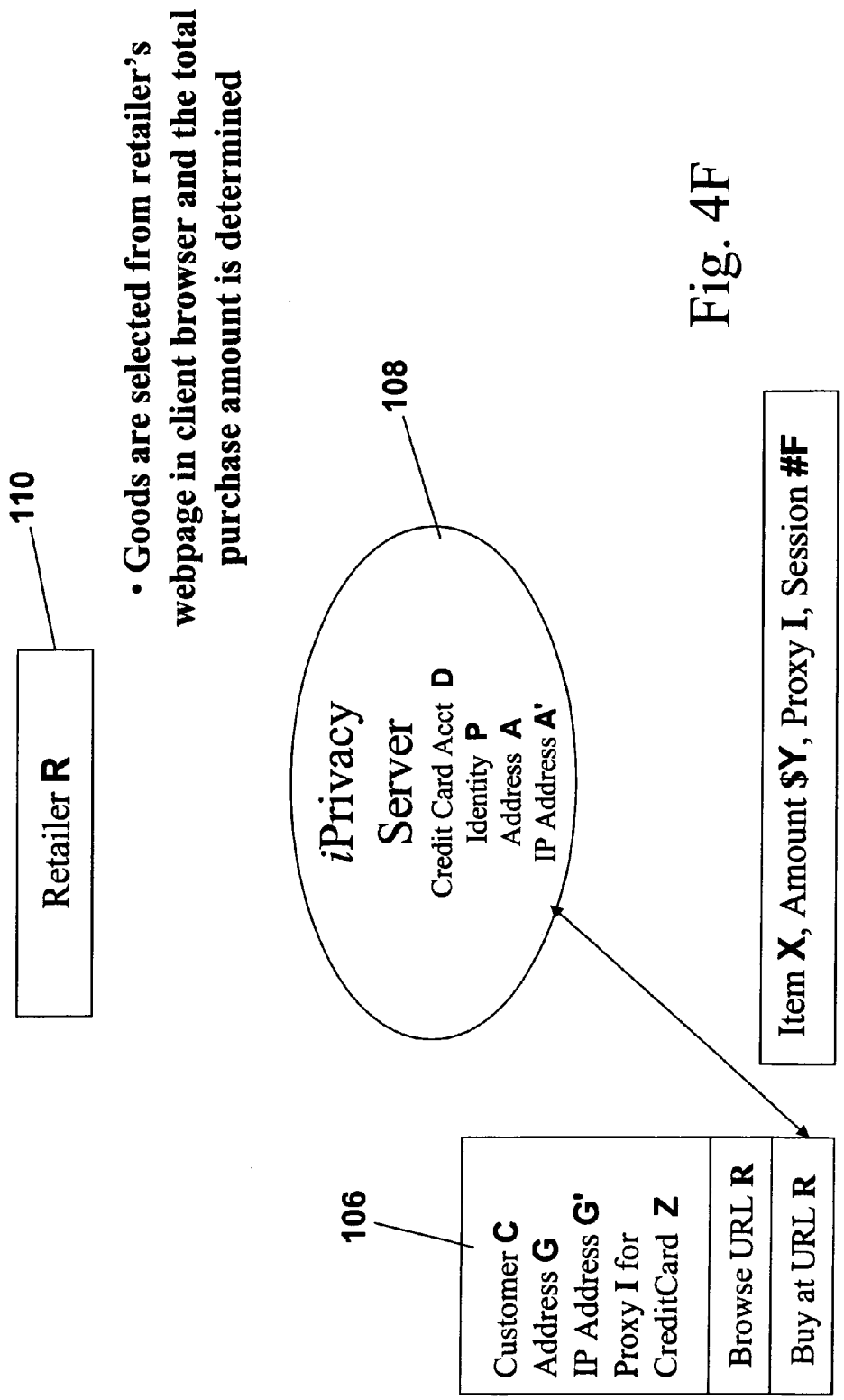

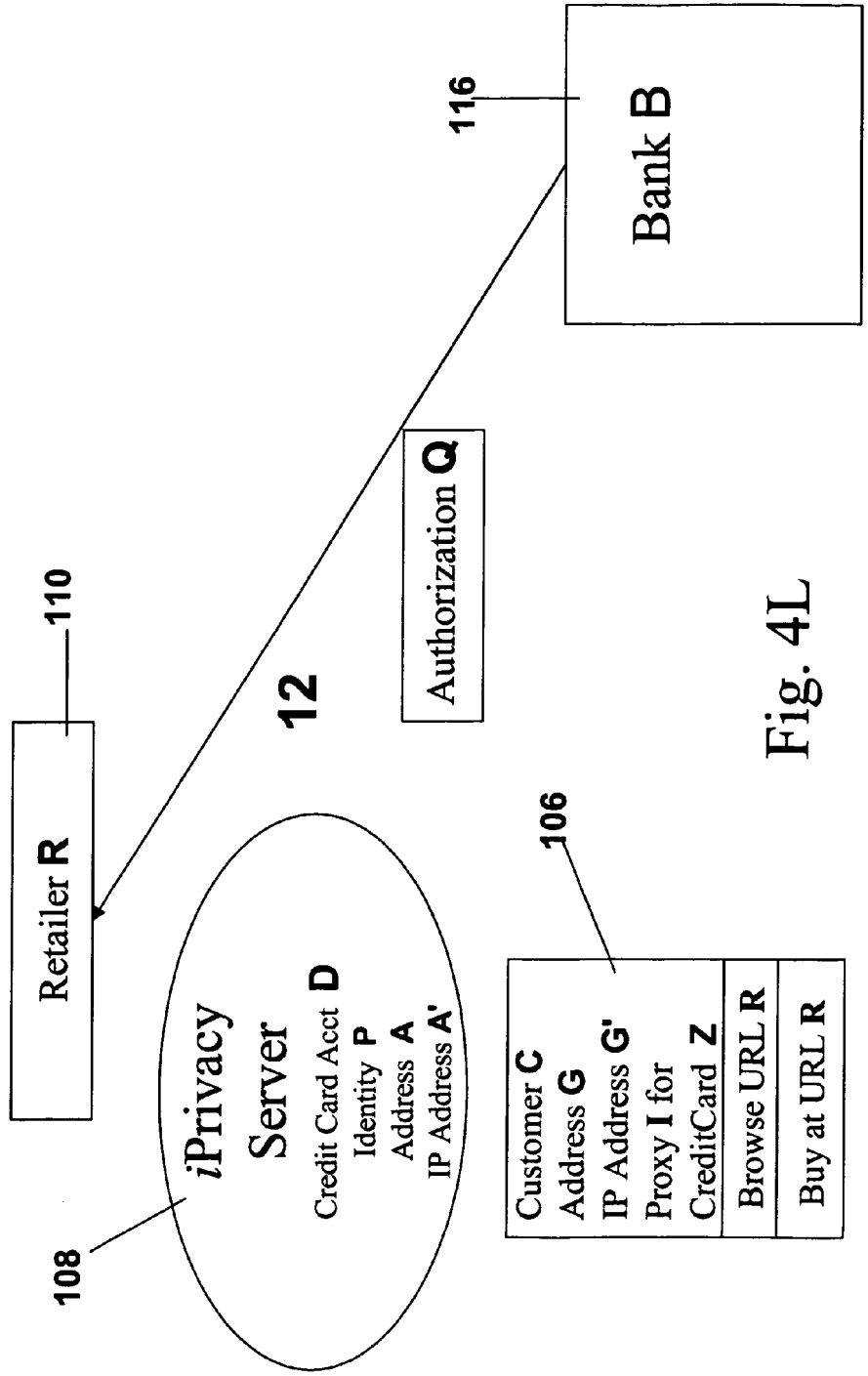

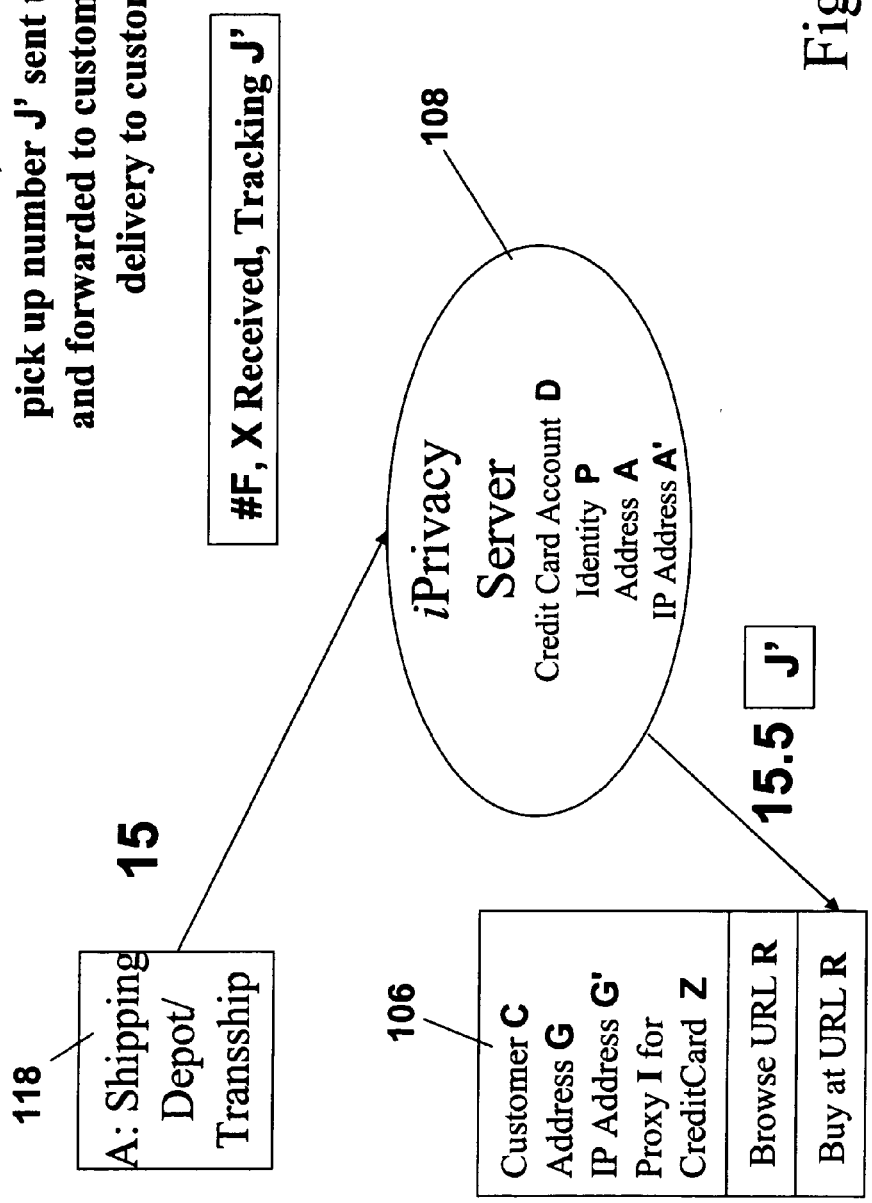

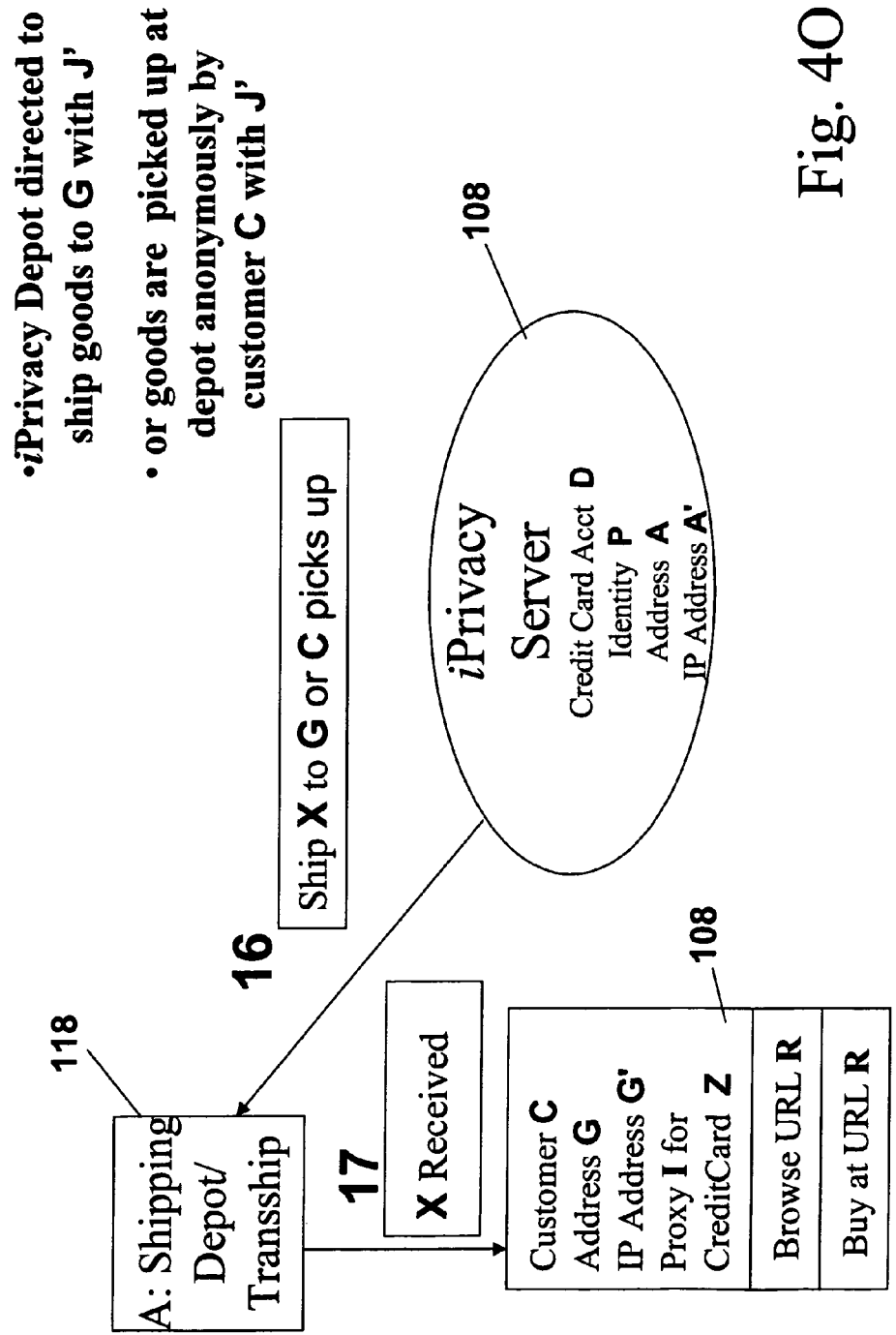

Final Bank Confirmation...

- *iPrivacy* sends final confirmation of shipment to bank for fee

Fig. 5

- Bank B has Authorized Purchase by C thru P
- Approved Purchase by P from R.
- Final transaction netting are performed by bank B.
- Customer C charged $Y and settles with B
  Retailer R paid ($Y - fee) by B
  *i*Privacy paid (% of fee) by B;

Fig. 6

Bank B's Transaction Data — 117

| Time | Customer | Authorization | Session | Amount | Confirm | Retailer | Items |
|------|----------|---------------|---------|--------|---------|----------|-------|
| T    | C        | W             | #F      | $Y     | H       | P        | X     |
| T+µ  | P        | Q             | #F      | $Y     | H       | R        | X     |

Netted Transactions (columns Retailer, Items)

| Time | Proxy | Authorization | Session | Amount | Confirm | Retailer | Items | Order | Track |
|------|-------|---------------|---------|--------|---------|----------|-------|-------|-------|
| T | I | W | #F | $Y | H | R | X | O | J/J' |

*i*Privacy's Data

Fig. 7

Proxy System Knowledge Matrix

|  | Customer | Customer Bank | Proxy | Proxy Bank | Retailer | Shipper | Depot | Trans-Shipper |
|---|---|---|---|---|---|---|---|---|
| Customer Name C | yes | yes | no/yes | no/yes | no | no/yes | no/yes | yes |
| Customer Address G | yes | yes | no/yes | no/yes | no | no/yes | no/yes | yes |
| Customer Proxy ID I | no | yes | yes | yes | no | no | no | no/yes |
| Customer Credit Card # CC | yes | yes | no/yes | no/yes | no | no | no | no |
| Customer PIN | yes | yes | no/yes | no/yes | no | no | no | no |
| Customer Bank ID | yes | yes | yes | no/yes | no/yes | no | no/yes | no |
| First Hop Tracking J | yes | no | yes | no/yes | yes | yes | yes | no |
| Second Hop Tracking J' | yes | no | yes | no/yes | no | no | yes | yes |
| Proxy's Party Bank ID | no | no/yes | yes | yes | yes | no/yes | no/yes | no |
| Proxy's Credit Card # D | no | no/yes | yes | yes | yes | no/yes | no | no |
| Retailer ID R | yes | no/yes | yes | yes | yes | yes | no/yes | no |
| Shipper ID | no/yes | no/yes | yes | no/yes | yes | yes | yes | yes |
| Depot Address A | yes | no/yes | yes | yes | yes | no | no | no |
| Transaction Time T | yes | yes | yes | yes | yes | no | yes | no |
| Product ID X | yes | no/yes | yes | yes | yes | no | no | no |
| Item Price $Y | yes | yes | yes | yes | yes | no/yes | no | no/yes |
| Session # F | yes | yes | yes | yes | no | no/yes | yes | no/yes |
| Order # O | yes | no/yes | yes | no/yes | yes | no/yes | no/yes | no/yes |

"no/yes" indicates that a party may have or be provided with access to the indicated information depending upon the business arrangement and/or the embodiment of the system in use and/or the customer's preference

Fig. 8

ELECTRONIC PURCHASE OF GOODS OVER A COMMUNICATIONS NETWORK INCLUDING PHYSICAL DELIVERY WHILE SECURING PRIVATE AND PERSONAL INFORMATION OF THE PURCHASING PARTY

This application is a continuation of U.S. patent application Ser. No. 09/360,812, filed Jul. 26, 1999 now ABN, which is incorporated herein by reference.

BACKGROUND OF THE INVENTION

The invention disclosed herein relates to transactions over a communications network between first and second parties, including ordering of a good and/or delivery of the good and/or payment for the good while securing private and personal information specific to the first party or the network device used by the first party with respect to the second party and unauthorized parties, i.e., others who may or may not be parties to the transaction. Such information may include the first party's identity, financial information (where a purchase is involved) and address. The first party may be a consumer or retail customer and the second party may be a merchant or retailer. The good may be delivered to a physical address or electronic address designated by the first party or to a physical depot for pick-up by the first party, while providing complete anonymity of the first party with respect to the second party.

"Communications network" is meant in a broad sense, and may include any suitable technology for information transmission, including electrical, electromagnetic and optical technologies. Such a network may include a computer or computers associated with the first party, a computer or computers associated with the second party and/or a computer or computers associated with the network. Such a communications network may link computers, e.g., a LAN or WAN. Although the invention has particular application to an open network such as the Internet, it may also be used in other networks, internets and intranets. Therefore, while much of the following description makes specific reference to the Internet, it is to be understood that there is no intention to limit application of the invention to the Internet and that the invention has application to any suitable network. Further, while the invention is primarily directed to the ordering and/or purchase and physical delivery of goods from retailers selling electronically over a network, it also applies to the ordering and/or purchase of goods that may be delivered electronically and to the purchase and delivery of services that result in a deliverable.

The growth of electronic commerce (e-commerce) over the Internet has been explosive, and expectations are that such growth will continue. However, the Internet as an open network provides opportunities to legally and illegally collect and use vast amounts of information which people consider private and personal, and concerns over privacy, fraud and security online could inhibit the continued explosive growth of business-to-consumer electronic commerce. Currently, shopping, browsing or other information-sharing activities on the Internet exposes users to unwanted collection of their private and personal information, from which their identities, activities, behaviors and preferences can be ascertained. Many people are fearful that someone may be watching their every move when they interact on the Internet, and that somehow information collected by such persons will be used to their disadvantage, from outright theft using credit card information to unwanted intrusions from marketers in the form of "spam" email, and other intrusive activities. (See, e.g., 1999 *National Consumer League: Consumers and the 21$^{st}$ Century*, New York: Louis Harris & Associates, Inc., 1999).

In fact, information on the Internet is currently being captured from mouse clicks made on a Web browser by a user, and from information transmitted by a user to a Web site. This information can be processed, for example, to electronically profile users, and used or sold, depending upon the data collector's privacy policy. Internet users are becoming aware of the relative ease with which parties may obtain their private and personal information and are concerned about the gathering of such information and the potential for its distribution. They are also concerned about interception of credit card numbers and other financially related data.

As a result, many people, fearful of providing their private and personal information, are restricting their use of the World Wide Web. This may be manifested by potential users seldomly accessing the Internet, by users cautiously not submitting or clicking anything of a private or personal nature, and by users not entering into e-commerce transactions, any of which of course inhibits e-commerce and development of the full potential of the e-commerce marketplace.

Since most business-to-consumer transactions conducted over the Internet involve the use of credit or debit cards, and consumers are protected by the legal limits on liability for the unauthorized use by third parties of their cards, the parties most concerned about security and fraud prevention have naturally been the banks, credit card companies and merchants which must bear the cost of fraudulent transactions for which their card holders are not legally liable. Encryption of credit card and other data transmitted over the Internet helps banks and credit card companies protect against unauthorized use of credit cards.

Nonetheless, despite the limitations on their legal liability described above, a great number of consumers remain hesitant about electronic commerce. Their concerns include questions about whether the merchants doing business in electronic commerce actually exist outside of "cyberspace," whether they will misuse credit card, private and personal information provided to them, whether they will correctly and honestly fulfill orders, honor product warranties and return-for-credit guarantees, and the like. (See G. Gray and R. Debreceny, The Electronic Frontier, 185 Journal of Accountancy 32–37, May 1998.)

To complete an electronic transaction in current and emerging e-commerce, one or more of the parties to the transaction must pass private and/or personal information to another party. For example, in the transaction represented in FIG. 1, a first party customer (consumer) submits an order for a good in step 1.1 to a second party merchant (retailer) using a WWW form. The second party merchant in step 1.2 requests credit authorization for the transaction with a respective credit card clearing entity. Upon authorization of the transaction by the credit card clearing entity (step 3), the merchant confirms the transaction with the customer (step 1.4) and then provides for transfer of the good to a shipper (step 1.5) who delivers it to the customer (step 1.6). These different steps involve transfer of private and/or personal information among the parties. The customer provides credit card information and a shipping address to the merchant. The merchant passes the credit card information and the sum of the transaction to the credit card clearing entity. The merchant may also pass identification of the purchased good or service to the credit card clearing entity, at least in cases where the credit card clearing entity provides or extends product warranties or another service which require an identification of the good. The merchant provides for transfer of the good to a first party's shipping address usually in the name of the first party which are both provided to the shipper.

Additionally, underlying communication protocols and systems may provide additional private and/or personal information. The customer's computer has an identifying IP address used to route data packets to the merchant computers or servers. This IP address is often monitored by unknown parties and merchant systems, and incorporated in databases to enable the merchant and others to identify the customer as soon as the customer accesses services in the future. Over time, merchants (and others) collect such private information and share it with various entities compromising consumer privacy.

These databases are provided or bought and sold among organizations and companies who may then correlate this information along with other information producing larger databases that store very detailed history of the user's activities and behaviors, often without user's being aware of this activity. Users' histories are thus correlated over time often using their transactions that are linked to their true identity.

Tools have been developed to address privacy and security concerns of Internet users. (See, for example, the February, 1999 issue of *Communications of the ACM*, Vol. 42. No. 2.) One approach developed to help protect the identity of Internet users which allows them to surf the Web anonymously utilizes anonymizing agents, which prevent a user's IP address from reaching a Web site. This approach requires that the users trust the anonymizing agent. Some of these tools enable Internet users to insert pseudonyms into Web forms, so that users can anonymously return to the same site as the same user. Different pseudonyms can be provided for different Web sites. Examples of anonymizing (and pseudonym) agents include: "The Anonymizer" (www dot anonymizer dot com). "Lucent Personalized Web Assistant" (LPWA) (www dot bell-labs dot com/project/lwpa). Novell Directory Services (NDS) "digitalme"; Zero Knowledge System's "Freedom" (www dot zeroknowledge dot com). PrivaSeek's "PersonaXpress" (www dot privaseek dot com)(www dot personaxpress dot com).

Another approach, which does not require an anonymizing agent, randomly routes requests to a Web site through numerous users without shielding the IP address of any of the users so that neither the destination Web site nor any user (or intermediate node) through which the request was routed can determine the IP address of the originating user. Examples of tools which provide anonymity in this way include: "Crowds" (www dot research dot att dot com/projects/crowds); and "Onion Routing" (www dot onion-router dot net).

In addition, a privacy seal program has been instituted by a non-profit organization, TRUSTe. Display of the TRUSTe "trustmark" by member Web sites requires that they adhere to established privacy principles and agree to comply with ongoing TRUSTe oversight and consumer resolution procedures, including: adoption and implementation of a privacy policy that takes into account consumer anxiety over sharing personal information online; notice and disclosure of the Web site's information collection and use practices; and the opportunity for users to exercise control over their information.

European Patent Application Publication EP 0 855 659 A1 of Lucent Technologies Inc. describes a proxy system that allows anonymous browsing on the Internet. The proxy system substitutes identifiers in browsing commands received from a user which would identify the user, and filters other information (e.g., HTTP Header fields) associated with browsing commands that would allow server sites to determine the true identity of users. The substitute identifiers are site specific, and are consistently used so that a server site recognizes a returning user and may provide personalized service, and so that the proxy system is transparent to server sites. The proxy system may perform all functions within a central proxy system, or some functions in a peripheral proxy system (e.g., at a user site) and some in a central proxy system. The proxy system may provide its own credit card number or an alias credit card number to a requesting site and collect money from its users.

U.S. Pat. No. 5,794,221 discloses an Internet billing method in which an ISP through agreement with customers and vendors pays vendors and collects from customers for products and services purchased by the customer over the Internet without the need for the customer to transmit credit information to the vendor. While the method improves security of the financial aspect of a transaction, the customer browses in the usual way and the method does not provide for customer anonymity.

Examples of systems and methods for anonymous and/or secure Internet communications and transactions are disclosed in U.S. Pat. Nos. 5,420,926, 5,557,518, 5,729,594 and 5,815,665, Japanese Patent Application Publication 10-320646 dated Apr. 12, 1998, and WIPO International Publication No. WO 97/26612.

As shown in FIG. 1 and discussed above, purchase of a good over the Internet requires delivery of the good, which in turn requires a postal address. Postal addresses today are maintained on numerous databases, many of which are available from a number of commercial sources. Address matching software is likewise commercially available. Hence, a first party's postal address can be sufficiently revealing of personal identity that without some means of hiding address information from a second party, any effort by a first party to remain anonymous or unknown to the second party cannot be guaranteed. Although this problem has been recognized, to the knowledge of the inventors it has not been addressed, and there is no e-commerce system which allows a first party to electronically purchase a good from a second party while not only securing the identity of the first party, but also the first party's postal address. The use of post office boxes, discussed below, is an improvement, but not a solution.

As represented in FIG. 2, shipping involves at least three participating entities: a sender—an entity that wishes to deliver a good, who can be a merchant, vendor, retailer or provider of the good; a recipient—a target entity to receive the good—who can be a customer or purchaser or orderer of the good; and a shipper—an entity that transports the good from the sender to the recipient. In a typical Internet transaction involving shipping, the sender provides identification of the recipient and the recipient's address to the shipper in order for the shipper to deliver the good to the recipient. The recipient must initially provide data on his, her or its identity and address to the sender or the shipper or both. This data may be collected, analyzed and correlated with other data to compromise the privacy of the recipient.

The need for private shipping has been known for a long time and is currently addressed through the use of a post-office box (POB), or its variants. A recipient can use a POB to hide his, her or its identity from a sender. A recipient must however disclose his, her or its identity to the POB operator (e.g., the post-office (shipper), or private operators)—which functions as a trusted entity—once, and then uses the POB to protect the recipient's identity from the sender.

There are several drawbacks to the use of POB techniques in providing privacy-protected shipping for electronic commerce.

1. Pre-arranged relationship: a POB requires the recipient to first arrange for a mailbox with the POB provider. This restrictive requirement discourages use by persons or entities who occasionally desire privacy. POB is typically used for other reasons and for mass market privacy-protected distribution applications.
2. Pre-allocated space: the provider of a POB service pre-allocates storage space for the mailbox owner and charges each mailbox owner a storage fee. This restrictive requirement also discourages use by persons or entities who occasionally want privacy.
3. Inability to handle returns: a POB provides one-way privacy protection. If the recipient wishes to return the good in a verifiable way, the recipient must disclose his, her or its identity and association with the POB.
4. Non-provability of delivery: in a dispute concerning a lost package, the shipper cannot prove that a package was actually delivered to the recipient.
5. Coordinated comprehensive privacy protection: shipping is only part of a commerce transaction through which a purchaser exchanges information with a vendor to purchase and obtain the good. To protect privacy, one needs to assure that no private data is transmitted through the entire transaction. POB shipping does not accommodate simple or obvious mechanisms that may be coordinated with other elements of the transaction to assure privacy.
6. Single-failure compromisability: the privacy of a POB owner can be compromised through a single incident of correlating the identity of the owner with the mailbox number.

There is thus a need to protect private and personal information, particularly of first party users (purchasers, consumers, etc.) and provide security in e-commerce transactions, particularly where delivery and/or purchase of a good is involved.

OBJECTS AND SUMMARY OF THE INVENTION

It is an object of the invention to provide communication over a communications network, particularly an open network, with improved privacy protection for users of the network.

It is another object of the invention to reduce the unwanted collection and/or dissemination of information related to users of a communications network, particularly an open communications network.

It is another object of the invention to provide for the electronic order or purchase of a good over a communications network by a first party from a second party while securing the private and personal information of the first party with respect to the second party and unauthorized parties, i.e., others who may or many not be parties to the transaction. It is another object to provide for the delivery of the good while securing the private and personal information of the first party with respect to second party and unauthorized parties. It is another object to provide for return of the good while securing the private and personal information of the first party with respect to the second party and unauthorized parties. It is another object to provide for payment of the good while securing the private and personal information of the first party with respect to the second party and unauthorized parties. It is another object to also provide for electronic tracking of delivery while securing the first party's private and personal information from unauthorized parties.

It is another object of the invention to reduce fraudulent purchases in e-commerce transactions which use a communications network.

It is another object of the invention to provide for the credit processing aspects of an e-commerce transaction conducted over a communications network while securing private and personal information of the purchaser with respect to unauthorized parties (e.g., identity, address and bank and credit account information, etc.).

It is another object of the invention to provide for shipping of a good ordered electronically over a communications network to the party that ordered the good while securing private and personal information of the party that ordered the good with respect to unauthorized parties.

It is another object of the invention to share information relating to electronic purchases of goods by purchasers from vendors, retailers or merchants and provide a database for the purpose of determining the performance of the vendors, retailers and vendors.

It is another object of the invention to gather information about electronic transactions and purchases that does not include private and personal information of purchasers, but includes other information about the transaction, including information about the good, its price, and the identity of the electronic vendor. It is another object to provide a database which stores such information such that purchasers are anonymous in the database.

It is another object of the invention to provide a system and software for the electronic purchase of a good over a communications network which secures private and personal information of the purchaser with respect to unauthorized parties, and provides for electronic payment to the electronic vendor without an operator or provider of the system and/or software being liable to the merchant for payment on behalf of the purchaser. It is another object of the invention to provide the operator or provider a fee for this service.

It is another object of the invention to provide such a system and software for the electronic purchase of a good over a communications network which can be selectively configured to provide certain transaction information to parties of the transaction while securing the first party's private and personal information with respect to the second party and unauthorized parties.

It is another object of the invention to provide improved filtering of information from network users (e.g., first party purchasers, etc.) to prevent others on a network from obtaining private and personal information of users.

It is another object of the invention to protect private and personal information of network users making electronic purchases over a network while providing flexibility to accommodate multiple users per network device and per bank or credit card account.

It is another object of the invention to protect private and personal information of network users making electronic purchases over a network while providing flexibility to accommodate one, or more than one, bank or credit card entity, and to permit such flexibility on a per user or per transaction basis.

Unless otherwise indicated expressly or by context, "good" encompasses a deliverable, including a physical good, an electronic or virtual good and a service which provides a physical, electronic or virtual deliverable. The terms "user", "purchaser", "customer", "consumer", "recipient" and "orderer" are used interchangeably unless indicated otherwise expressly or by context, and are encompassed by the term "first party" (to an electronic transaction). Similarly, the terms "vendor", "retailer", "merchant" or "provider" or "sender" of a good, are used interchangeably unless indicated otherwise expressly or by context, and are encompassed by the term "second party" (to the electronic transaction).

Securing information of a private or personal nature of a first party or specific to a first party and/or the device or computer used by the first party means preventing other parties (who may or may not be parties to a transaction or communication involving the first party), typically at least the second party, from obtaining such information as may be generated, transmitted, stored or collected in a transaction and from which another party may learn the private or personal information of the first party. Such private or personal information may include: an identity which may be a true physical and/or true electronic identity of the first party and/or a computer or device used by the first party; an address which may be a true physical and/or true electronic address of the first party or the computer or device used by the first party; and/or other information relating to the first party such as social security number, driver's license number and bank and/or credit account information. Such information may be derived from multiple collections stored and provided by multiple parties and shared, linked and/or merged to reveal personal and private information and behavior of the user over time.

The invention disclosed herein achieves the above and other objects, and provides for users of a communications network, such as the Internet, to communicate, and/or order, and/or obtain and/or receive, and/or purchase and/or charge or electronically pay for deliverables using the network, while securing such information of a private or personal nature of the users with respect to unauthorized parties, and providing improved protection against fraud. In accordance with the invention, communications and/or a transaction can be carried out between a user or first party, typically a consumer, or a prospective or actual purchaser or customer, and a second party, typically a merchant, retailer or vendor, over a communications network linking the first and second parties, in which information is provided and/or a good is ordered, and/or purchased and/or paid for and/or delivered, while securing such information of the first party with respect at least to the second party. The invention provides methods, systems and software for doing this and other things.

The terms "provides for" and "providing for" are meant in a broad sense, and encompass a party or device directly or indirectly, alone or with or through one or more other parties or devices, effecting the specified action(s), function(s), task(s), etc.

Depending upon the embodiment and the communications network, the parties may use computers or other devices to communicate and provide for payment and physical or electronic delivery. (The term "computer" is also used in a broad sense, and includes devices which operate or include a component that operates in accordance with a stored set of instructions, including PCs, microcomputers, microcontrollers. A hard-wired device such as a gate array though not technically a computer may be considered to be a computer or the equivalent of a computer as that term is used herein depending upon the function(s) performed by the hard-wired device. For ease of description and claiming, "computer" should be interpreted to include such other devices and instruments and such hard-wired devices.)

In accordance with the invention, delivery of a physical good may be made to a physical address of a physical facility designated by the first party which may be a depot for pick-up anonymously by or on behalf of first party, or a second or last address while securing private information of the first party at least with respect to the second party. The first party may designate any appropriate physical address (e.g., residence or business), including an address related to another party, e.g., a friend or a party to whom the good is delivered as a gift. In accordance with the invention, an electronic good may be delivered to an electronic address designated by the first party while securing the private and personal information of the first party with respect to other parties.

In one embodiment, a user or first party may communicate over the network with a second party, using a proxy. The proxy may provide a different identity for a user for a set of communications (e.g., browsing) or for each transaction. Thus, the user has a different identity each time it establishes communication with a second party or for each transaction. For example, the proxy may use a unique session number (#F) generated by the proxy for each transaction to provide a unique alphanumeric name that is supplied to the second party vendors. In a sense, the proxy party is anonymized or privatized vis a vis the second party. Also, vendors will not be able to compile any use history on any user since new or unique proxy identities generated automatically cannot be linked with other transactions over time.

Alternatively, the proxy may provide the same identity for a user for all communications and transactions. In this embodiment, the proxy can provide a user name which is a function of a unique name or proxy identifier (I) of each user and the proxy's identity (public identity) (P) for each transaction. This user name is the same for each user for all transactions and communications for all vendors. This, a user history may be compiled by vendors and others for a user who is anonymous to them.

The proxy may also alter information from the first party directed to the network or the second party so that the second party can not ascertain the first party's private and personal information. The proxy may also provide for payment and/or delivery of an ordered identity. The proxy may or may not know the true identity of the first party, or any private or personal information of the first party.

The proxy provided by the embodiments of the invention described immediately above differ from the proxy system disclosed in the European patent application of Lucent referenced above (EP 0 855 651 A1) because in one case the identity of the user changes with each transaction or browsing or shopping session so that each transaction appears to involve a different party without a repeat transaction from any party, and in another case the identity of a particular user is the same for all transactions (browsing, shopping, etc.) with all vendors, while in the published Lucent European patent application the identity of a particular user with a particular Web site is the same for all communications and transactions with that Web site and different for other Web sites.

In another embodiment a proxy is not required, unlike the proxy system disclosed in the referenced Lucent European patent publication. In this embodiment, the user (first party) is provided a transacting (or communicating) identity not the true identity of the user, which is revealed to the second party but from which the second party (and unauthorized parties) can not ascertain private or personal information of the first party. Second parties and others can not link the true identity or other private or personal information to the first party (or the first party's equipment) with the transacting identity. Thus, all communications from the first party appear to others to be from a party with an identity of the transacting identifier. Only the party providing the first party with the transacting identity can link the true identity of the first party with the transacting identity. Where a purchase is involved, the bank or credit clearing entity stores information linking the true identity of the user and the transacting identity. This embodiment may also provide for altering information from the first party directed to the network or the second party to prevent the second party from ascertaining the first party's private and personal information. The bank or credit card clearing entity generates these transacting identities for all customers who use the inventive system and method, and provides a database linking the transacting and true identities. When a retailer provides the bank or credit card clearing entity with a transacting identity, they link to the true identity to process the transaction. For an Internet application, users may also use the transacting identity to browse, subscribe to an ISP and/or to obtain telephone service for accessing the Internet. Thus, only the bank or credit card clearing entity will know the true identity of the user. In this embodiment, the bank or credit card company performs some of the functions of the proxy described in other embodiments.

In the embodiment which does not require a proxy, a proxy may be provided for the purpose of collecting and storing transaction information for safe keeping and possible later use, e.g., in the case of non-receipt or return of an ordered good, or a dispute on payment or price, etc. The proxy may expire identifiers and/or user names similar to the manner in which credit card company's expire credit cards. This will terminate the history that a vendor has with a particular user and prevent vendors from maintaining long term preferences for any user. The expiration cycle for the identifiers and user names may be linked to (e.g., the same as) the expiration date of a user's credit card. Expiring identifiers and user names on the same cycle as user credit card numbers, or more frequently such as after each transaction may be also used as a fraud prevention measure.

In the preferred embodiments, a first party, having information of a personal or private nature specific to the first party or a first device used by the first party, orders a good from a second party over a communications network. A delivery address to which the good can be delivered is provided over the network to the second party while securing said information of the first party with respect to the second party. Information from the first party directed to the second party for communicating with the second party or to order a good is provided while securing said information of the first party as indicated above.

The first and second parties communicate with each other over the network using devices or computers, e.g., PCs. In the embodiment which uses a proxy, the proxy may be or utilize a proxy device, typically a computer or computers, and/or proxy software associated with a user device typically a computer (PC) and/or a proxy device, typically a computer server.

Proxy software includes software executed by devices or computers used by the first parties and/or software executed by one or more proxy devices or computers. A proxy system includes the proxy software, one or more devices or computers for executing the proxy software, and may include other elements as disclosed herein. "Proxy software" and "proxy system" sometimes overlap and are sometimes used interchangeably as the context will indicate. Preferably, information from the first party directed to the second party or the network is altered using software associated with a first device used by the first party or a proxy device, or both. In this embodiment, this software provides the delivery address to the second party. The proxy software may be executed by a central proxy device to provide the delivery address to the second party from stored information. In the embodiment that does not require a proxy, the delivery address is provided by the first party device.

As mentioned, the good may be a physical good and the delivery address is a physical address of a physical facility, where the good is physically delivered. The delivery address may be that of a depot, where the good may be made available for pick up by or on behalf of the first party in a manner which does not require said information of the first party to be revealed at the physical facility. Alternatively, delivery to a physical address, which may not secure said information of the first party, designated by the first party may be provided for by delivering first to a first physical address (e.g., a depot), without revealing the private and personal information of the first party to the second party and unauthorized parties, and then trans-shipping to a second or last physical address designated by the first party but not revealed to the second party. The first physical address, given to the second party, does not reveal the private and personal information of the first party. Although the second physical address may reveal such information, it is made known at the first physical address and not given to the second party. Alternatively, the delivery address may be a proxy address that does not reveal the true physical address of the first party and that may be converted or mapped by a shipper to the true physical address to which the good is to be delivered as designated by the first party. Shipment to the first delivery address may be referred to as a "first hop" shipment, and shipment to the second physical address designated by the first party may be referred to as a "second hop" or "last hop" shipment.

The good may also be an electronically transmittable file and the delivery address an electronic address of a proxy, or an electronic address of a first party having a transacting identity that does not reveal said private and personal information of the first party. In either case, electronic delivery to the respective electronic address does not reveal said information. The file is electronically transmitted to the proxy or the first party. If the file is electronically transmitted to the proxy, the file is then transmitted to an electronic address of the first party, which may not secure said information of the first party, and which is available to the proxy, but not to the second party. If transmitted to the first party, the electronic address is a transacting address which does not reveal the private or personal information of the first party, as discussed above with respect to a transacting identity.

Provision may be made, with or without a delivery provision, for approval or disapproval of a purchase of a good by a first party from a second party based on financial information relating to the first party, and if the purchase is approved, provision may be made for payment to the second party while securing said information of the first party with respect to the second party. Information from the first party directed to the network or the second party is secured as described above.

Approval or disapproval may comprise another party providing for approval or disapproval of the purchase based on financial information relating to the first party, and payment (e.g., crediting an account) may be provided to the second party, if the purchase is approved, by other party who also provides for debiting the first party. The other party may be a third party who approves or disapproves of the purchase based on financial information relating to the first party, and who also pays (credits) the second party and debits the first party if the purchase is approved.

The other party may arrange with at least a third party to provide for approval or disapproval of the purchase based on the financial information relating to the first party, and if approved the other party arranging with at least the third party to provide for payment to the second party and debiting of the first party.

In the embodiments described herein, the other party may be the proxy, or a bank or credit clearing entity. In the proxy embodiment, the other party may be a proxy party and may use proxy software associated with the first party's first device or a proxy device, or both, to provide for payment to the second party and debiting of the first party. The proxy can do this directly, or through at least one third party.

Approval or disapproval by a third party may be provided using a third device communicating with the proxy software which also provides for crediting the second party and debiting the first party if the purchase is approved.

In the embodiment that does not require use of a proxy, the party providing the transacting identity may be a bank or credit card company which may also provide the first user with an account which also can not be linked to the true identity of the first party. A second party merchant simply forwards the transacting identity and account number to the bank or credit card company, which has a database linking true identities and true accounts to the transacting identities and accounts. The bank or credit card company credits the merchant and debits the true account of the transacting first party. In this embodiment, the first party provides a delivery address to the second party, and delivery is otherwise treated as described above.

The invention is applicable to payment via a credit card or other means, e.g., e-cash or other component of an electronic wallet. A transaction fee or service charge may be levied for the transaction, similar to the fee levied in a credit card transaction. Part of the fee may be paid to a proxy operating or otherwise associated with use of the invention or a proxy system, etc. Netting and settling among the first, second, proxy and other parties involves crediting and debiting various accounts for the purchase price of the good and all or parts of the service charge. The fee may alternatively be a subscription or sign-up fee which enables a party to participate in purchases. The fee may be periodic and fixed for each period, or based on the volume or dollar amount of purchases, etc.

In one embodiment, a third party approves the credit of the first party purchaser, credits the second party vendor and debits the first party purchaser. In this embodiment, the proxy may or may not have an account with the third party, and the proxy need not be actively involved in credit approval and need not be financially responsible for payment to the second party and collection from the first party.

In another embodiment, two parties in addition to a proxy party are involved in the approval and payment processes. For example, a third party approves the credit of a first party and electronically credits a proxy party and electronically debits the first party, and a fourth party approves credit of the proxy party and electronically debits the proxy party and electronically credits the second party. Here the fourth party approves or disapproves the transaction based on the proxy party's account with the fourth party, and the proxy party undertakes financial responsibility. Alternatively, the proxy party's participation (and financial liability) in settling the transactions may be eliminated, and the third party debits the first party and credits the fourth party, who debits the third party and credits the second party. The approvals in this variation are as follows. The third party approves the credit of the first party and the fourth party approves the credit of the third party. In this embodiment, as above, the accounts can be credit card accounts, and also a fee is paid to the proxy party, which can come from both the third party and the fourth party.

In one embodiment, a system implementing the invention described above may be configurable, e.g., on a user or other party basis or on a transaction basis, for operation using a third party, or a third party and a fourth party in addition to the proxy party for the financial procedures described above. In still another embodiment, systems implementing the invention described above may be configurable for operation with various parties having access to or being provided with various information, with the exception that the first party's private information remains secured with respect to the second party.

As pointed out above, the first party's private information is withheld from the second party and from any unauthorized party, but may be provided to authorized parties. For example, depending upon the embodiment, the first party's credit card company (a third or fourth party) could be provided with price information only, with price and good information only, or with price, good and second party vendor information. A shipper making a last hop delivery of a good to a first party would of course know the delivery address and perhaps the identity of the first party. The identities of the good and the second party where these appear on the outside of a package containing the good or in a shipping record may also be known to the shipper. However, in those cases, which are expected to be minimal, the shipped good can be repackaged or wrapped, or the last hop delivery may be made by a shipper who is authorized by proxy software or is part of the proxy system.

The first party's identity and credit card number are not transmitted between parties, and therefore such information is protected and not available to unauthorized parties as part of the transaction. In the proxy embodiment, the first party's account information is not transmitted to the proxy, and the proxy transmits proxy account information to the second party, not first party account information. The proxy need not have the true account information of the first party, but identifying information by which a third party can link to the first party's account. In the embodiment that does not require a proxy, a transacting account, not a true account is transmitted to the second party.

Thus, the invention allows private and personal information to be withheld from the second party, and allows the first party to communicate with the second party via the communications network without revealing the user's identity and location or address. This provides complete anonymity to the first party vis a vis the second party. With specific respect to the Internet, given the existing capability in the communication, transaction processing and credit processing chains for accumulating and distributing information relating to an Internet user's identity, preferences, etc., the complete anonymity that use of the invention provides to Internet users should allay their fear of conducting e-commerce over the Internet, or any open computer network. Further, authorized parties who use the invention, for example credit card companies and banks, will have a powerful tool to expand use of their credit cards and to attract new members, and prevent fraudulent use.

In the preferred embodiment, the invention is implemented on the Internet (although the invention is not so limited), and comprises information-processing modules (hardware, and software) which permit Internet users (first parties) to browse and search the Internet anonymously, order or purchase goods from second parties online anonymously, and have them delivered anonymously (at least with respect to the second parties providing the goods) to their homes or offices or other designated address, or to a depot for pick-up by the user.

The user's anonymity is preserved as against (i) proprietors of the Web sites that the user may visit, (ii) the online second party vendors from whom the user orders or purchases goods, and (iii) shippers except for the last-hop shipper that delivers a good to an address designated by the user. Although in the proxy embodiment the user's identity may be known to the ISP, the browsing behavior, the items purchased, the identity of the vendor, and the user's financial information are secured or withheld from the ISP. The user's credit card issuer or company (a third or fourth party) is notified that that the user wishes to make a purchase for a given sum, and information necessary for authorization of the purchase is provided in a way which prevents fraud and protects the user's credit card information as well. Information about what the user has bought (or ordered if a purchase is not involved), and where that purchase is ultimately being shipped can be withheld from the credit card company as well as from other parties in the chain of commerce, except for the last-hop shipper who delivers to the address designated by the user. Measures discussed herein may also be taken to limit the information available to the last hop shipper. In cases where the credit card company has a need for information identifying the good or service purchased, as for example where the credit card company provides or extends a warranty, or provides a promotion, etc., such information will be supplied to the credit card company. Special arrangements may also be made so that this information is routinely given to the credit card company. The transaction database, or a similar database may also be used to measure vendor performance by logging data such as returns, complaints, delivery times, damaged goods, etc. Thus, the invention acts as an information buffer between the user and the Internet and/or certain parties in the transaction.

In processing transactions, a proxy transaction database may be provided in accordance with the invention to store information generated in the transactions. In an embodiment having a proxy system, the proxy transaction database indexes and links the second party vendor supplied confirmation, order or purchase information, with a unique session or transaction identifier (#F) generated by the proxy system for each transaction. The unique session number may be used as an index to the transaction to route messages from second party vendor computers to the respective first party computer involved in the transaction represented by the unique session number. This linkage also allows the proxy system to route shipped goods to the user's address if so requested by the user, and to enable return of the goods to the vendor.

The proxy transaction database or another secured address mapping (SAM) database (which may be part of or separate from the proxy transaction database) may be used to link user's and their addresses. Second party vendors typically include identifying information on shipping labels with sufficient detail to uniquely identify purchase or order information received from customers. This information is linked with the unique session or transaction identifier created by the proxy computer software working in conjunction with the user proxy software. Optionally, the proxy computer software may transmit to second party vendors sufficient identity information that includes the unique session identifier #F. For example, the NAME field, or some other field, of the second party vendor's form-based web page may be an automatically generated symbol including as a portion the unique session identifier #F or a number from which #F may be determined. Automated readers of shipping labels would therefore read the unique session identifier #F to allow for automated lookup of the user's actual shipping address where the good is to be delivered directly to a user designated address.

The unique shopping session number (#F) may be a tracking number and/or linked to a tracking number used to track physical delivery through a shipper's existing tracking system. Alternatively, a tracking number may be stored in the SAM database and/or provided to the first party to track the delivery without disclosing the tracking number to the second party.

Third and other parties may also provide transaction databases to store transaction information that they are provided with or generate.

As pointed out above, first party private and personal information is secured at least with respect to second parties. While credit card companies received all of the transactional information when the first party customers dealt direct with second party vendors, use of the invention can result in the credit card companies receiving only that transactional information that is necessary to perform the credit function. In accordance with an aspect of the invention, information in the proxy database containing private and personal information of first parties can selectively be made available to parties other than the second party such as credit card companies. As mention above, the proxy need not know the true identity of the first party or any private or personal information of the first party. Regardless, a proxy database can be provided which does not contain any private or personal information of first parties, and such information made available to any other party. Optionally, the proxy party can be compensated or otherwise rewarded for supplying such information. Stated another way, access by banks and credit card companies to transaction information they previously received can be selectively restricted by the invention.

One way that the invention implements selective passing of transaction information is for the proxy party to present itself as the vendor to the credit card company in place of the true vendor, and pay the vendor. In order to prevent the credit card company or any other party from matching transactions to obtain certain transaction information, the invention provides for a proxy party to use the credit card of another credit card company for the transaction.

In addition, rather than selectively supplying such information to credit card companies or other parties to the transaction (other than the second party vendors), proxy software can provide for passing selected information during the transaction, i.e., the software can be selectively configured to pass selected information depending upon the relationships and arrangements the proxy party has with third and fourth parties and other parties to the transaction. Some non-private information can also be provided to second party vendors so that they can maintain an historical preference database. For example, a consistent user name may be provided for a particular user to a particular vendor.

The invention provides for reconfiguration of the software on a party by party basis to achieve the above-described selectivity.

Internet Embodiments

In the preferred Internet embodiment, the invention utilizes a proxy and is implemented by proxy software executed on user or first party computers and on one or more proxy computers. The software may be provided to users by way of a download or preferably on a tangible medium like a CD-ROM. The software on the user's computer operates in conjunction with the user computer's browser, such as Microsoft Internet Explorer® or Netscape Navigator®, either by a default or upon selection by the user. The proxy software on the user's computer and the proxy computer(s) cause all communications for second parties to be routed through a proxy computer.

In the preferred Internet embodiment, all browsing by the user is done anonymously through the proxy system using a protected proxy identifier (I) or persona unique to the user and known only to the proxy system. A unique proxy identifier is assigned to each copy of user proxy software provided to a user. The relationship of the proxy identifier and the user is maintained secret by the proxy system. As mentioned above, the proxy system need not know the user's true identity. To reduce the risk of unintended disclosure of this relationship, the proxy identifier is withheld from the user so the user cannot link their true identity with the proxy identifier.

The proxy system can use the proxy identifier to automatically apply preferences to a transaction, such as shipping mode, delivery name and address (or depot pick up), etc. The proxy system may store in a secure way the user's credit card information linked with the user's proxy identifier, and charge the user's credit card for the purchase made by the proxy system on behalf of the user. Alternatively, the proxy may not have the user's true name and account information, and the user's bank (a third or fourth party) may link the user's account with the user's proxy identifier and either credit the proxy system operator (proxy party) for a purchase made on behalf of the user or eliminate the proxy party from the financial aspects of the transaction, i.e., provide for payment to a second party and debit a first party directly. Regardless of whether the proxy party is in the payment and responsibility chain, it may be paid a transaction fee for each transaction (or on some other basis). The user's bank provides for payment to the second party merchant of the purchase price less a service charge, and provides part of the service charge to the proxy party as the transaction fee.

Typically, the proxy identifier identifies one user. However, sub-accounts may be set up for other users (e.g., family or business unit members authorized by the registered user) in a household or business unit who use the same computer and the same copy of the user proxy software. The sub-account may, for example, be identified by a field or fields in the proxy identifier, or in any suitable way. Alternatively, more than one registered copy of user proxy software by be stored on the same computer.

In conjunction with the user's credit card issuing company or bank, the proxy system generates the unique proxy identifier I and provides it as part of the proxy software provided to a user, without disclosing the proxy identifier to the user. Each registered copy of user proxy software with its unique proxy identifier may be considered as a distinct plastic credit card. For security and fraud reduction, the proxy system can expire the user's proxy software and proxy identifier with the expiration of the user's credit card to which the user has authorized the proxy system to charge for purchases made on behalf of the user. Thereby, user proxy software and proxy identifiers will be on the same expiration cycle as the user's credit card. Similarly, a user's proxy software and proxy identifier can be made unauthorized (or expired) if a user's proxy identifier or proxy software is lost, stolen, corrupted, etc., or when the user's credit card is lost or stolen. Users can be supplied with a new copy of user proxy software (with a new proxy identifier) whenever the user is provided with a new credit card.

Further, users may register multiple credit cards issued by multiple banks (third or fourth parties), but each would require the download of a unique copy of user proxy software with a unique proxy identifier. Alternatively, a single copy of the user proxy software can store multiple proxy identifiers, selectable by the user for his, her or its purchases, or a copy of the user proxy software can be provided with the same proxy identifier indexed into the same credit card account for multiple users of the same credit card account. This is akin to issuing additional credit cards on the same credit card account. A user may store his, her or its single "proxy credit card" on more than one computer, e.g., a palm top and a desktop PC.

A user may provide the proxy system with more that one credit card number for each copy of the user proxy software, and designate credit card choice as part of the transaction or otherwise.

The proxy system allows the user (first party) to be represented not as an individual transaction with a true identity, but rather as an anonymous transaction with a proxy identifier. For example, a user may allow someone else to make an e-commerce purchase with the user's proxy identifier, just like a person today may allow a spouse or child to make purchases on that person's credit card account. Use of the same proxy identifier by authorized persons is under the control of the user and the issuing bank (third or fourth party), and the true identity of any of the users of the same proxy identifier (e.g., spouse, child) can be maintained by the user's bank. However, the true identity of the actual transactor is known only to the user when the user allows someone else to use the user's unique proxy identifier. The proxy system essentially provides an electronic means to transact exactly as it is now done with plastic credit cards, but without disclosing the true name on the card. The proxy system may provide security against unauthorized use of a proxy identifier by requiring secret information such as a PIN or password or a biometric be used whenever anyone wants to transact using the proxy system. This provides a level of security above what is available today using credit cards.

The proxy software alters a variety of information about the user and his, her or its location from the information transmitted from the user to a proxy computer, and provides information which enables a Web site to respond to that proxy computer, and that proxy computer route the information supplied by the Web server to the proper user. Although prior art filtering techniques may be used, the filtering described herein is preferred at least because it is more comprehensive.

When a user wishes to purchase or order a good from an online second party vendor, the user simply follows the vendor site's usual procedures, selects the good to be ordered, enters purchase order information, etc., which the proxy software analyzes and, alters where necessary. The user has the perception of placing the order directly with the online vendor. Alternatively, the proxy computer may substitute its own set of procedures for the vendor's procedures, and translate between the two sets of procedures while maintaining user anonymity. Alternatively, the user may supply proxy information by clicking a menu of choices or dragging and dropping proxy information into the field's of the vendor's WebPages.

The invention provides comprehensive multi-layer privacy protection, examining messages of user or client computers that are to be transmitted to server computers and messages received from server computers. At the network protocol layer (e.g., IP and future protocols), address information of the client computer is replaced with a proxy address. At the transport protocol layer (e.g., HTTP and future protocols), client computer information of a private nature is replaced with information that anonymizes the client computer. Unlike some approaches that only provide anonymizing of IP addresses, and other approaches, such as disclosed in the European patent application of Lucent referenced above (EP 0 855 651 A1), which filter HTTP headers, the invention goes further and provides for anonymization at the application layer, capturing and replacing all accesses to client computer system information of a private nature, including cookies and other sources of information of a private nature, with information that anonymizes the client computer.

The invention also provides for replacement of compromising procedures, e.g., procedures which collect data from a user's computer, or anonymization of the collected data. For example, the invention replaces compromising active code (e.g., Java applets and Active X) and/or XML forms. (XML is a new extension of HTML which allows services to send pages to users marked with tags that activate local information collection routines that can compromise user information.)

In the proxy embodiment, a proxy computer provides the user's credit card company (bank) with the user's unique proxy identifier which the bank correlates with the user's credit card account information, and authorizes or denies authorization for the purchase. In the embodiment in which a bank gives a user a transacting identity and account, the user's true credit card information is not known to the proxy and is not transmitted to or by the proxy. Thus, the user's true credit card information is not transmitted at all on the network. Information other than the purchase price may or may not be transmitted to the user's bank depending upon the arrangement between the proxy system operator and the bank. For example, information about the vendor, the good(s) being purchased or the shipper may also be provided to the user's bank.

The user's bank authorizes (or declines to authorize) the purchase, and conveys such information back to the requesting party. Assuming the purchase has been authorized, a proxy computer enters the order with the online vendor using the proxy system operator's name and the proxy system's account number (thereby further masking the identity of the user). The proxy system may implement the credit function with a bank or banks in different ways. In one embodiment, a single bank is involved in a transaction, which authorizes a vendor to charge the proxy system operator's credit card account, and then nets the transaction by paying the vendor the price of the good less the transaction fee, charging the user's credit card the price of the good, crediting the proxy system operator's account, and paying the proxy system operator a percentage of the transaction fee (part of the service charge). Here, the bank may be provided with a description of the good, and of course has the identity of the vendor. Alternatively, the single bank can be provided with all details of the transaction and eliminate the proxy operator from the liability and netting chains, except for the percentage of the bank fee.

In another proxy embodiment, two banks are involved: one as the credit card company of the proxy system operator and the other as the credit card company of the user. Here, the vendor charges the purchase price to the proxy system operator's bank and the proxy system charges the purchase price to user's credit card, and netting provides the two banks and the proxy system with part of the bank fee. Depending upon the arrangement, identification of the good may be withheld from both banks and the identity of the vendor may be withheld from the user's bank.

In either embodiment, the proxy system provides shipping instructions to the second party vendor which do not include an address linked to the user. The proxy system may include one or more proxy shipping computers to perform certain shipping functions. (The other proxy computer(s) can be referred to as privacy protection computers to distinguish between them and the shipping computer(s).)

In the embodiment that does not require a proxy, only a single bank or credit card entity need be involved. The first party user transmits the transacting identity and account to the second party vendor, who requests approval from the bank. In this embodiment, the first party user transmits shipping information directly to the second party vendor. The bank or a party acting on behalf of the bank may handle shipping (depot operation, label-switching, transshipping) as described for the proxy embodiment.

As suggested above, e-commerce requires privacy-protected shipping techniques beyond the scope of POB-like mechanisms. The invention provides privacy-protected shipping techniques that offer the following features:

1. Two-way Privacy: The recipient of a good ordered using the invention, i.e., a user of the proxy system, can not only have the good delivered, but can return the good as well, while assuring that his, her or its identity is disclosed only to the proxy party or a party authorized by the proxy party and remains completely anonymous with respect to any distrusted participant in the shipping chain (i.e., the second party vendor, and possibly the shipper, if the shipper is not authorized by the proxy party to receive private information. The second party cannot identify the recipient from any data available to it either for shipping or for returns).

2. Two-way verifiability: The second party vendor and shipper can verify with the proxy party or a party authorized by the proxy party without compromising privacy that the recipient received or returned the package in a manner that can allocate responsibility for loss.

3. One-time transaction privacy: Privacy is provided for each individual shipping transaction independently of other shipping transactions. In particular, it does not require long term per-recipient allocation of space or other resources; furthermore, should privacy be compromised by one transaction, it does not enable compromising additional transactions.

4. Coordinated comprehensive privacy-protection of e-commerce transactions:

Shipping can be easily coordinated with shopping and purchasing to provide fully assured comprehensive privacy protection.

POB privacy-protection substantially fails to support any of these four features. The invention as it relates to the problem of privacy-protected shipping provides shipping techniques that accomplish these four features.

The invention provides two techniques to accomplish privacy-protected shipping: label-switching and one-time virtual mailbox agent (OVM), e.g., depot pick-up. Label-switching involves switching the labels on a package. Alternatively, label switching may be provided by using devices that scan computer readable information or codes printed or otherwise placed on packages which may generate a new electronic label, e.g., by reading a remote database, and that display an address on a device without printing a physical paper-based label. The second party vendor provides the package with the ordered good for shipping labeled with a unique transaction identifier (e.g., #F) and the address of a label switching agent authorized by the proxy party to handle private information. The label-switching agent uses this transaction identifier to generate a label with the recipient's identity and address. A trans-shipper then delivers the relabeled package. In case of return, the authorized label-switching agent reverses the process and relabels the package with the respective transaction identifier. Label-switching also applies to electronically delivered goods. Thus, for example, a file delivered to an electronic depot with the depot's electronic address may be retransmitted from the electronic depot with the user-designated electronic address.

Label-switched shipping may include the following. A recipient concludes a transaction with a second party using the services of the proxy party. The proxy party generates the unique transaction identifier and provides it to the second party vendor and the recipient. The unique transaction identifier may be applied in machine readable form using any suitable technology, e.g., bar codes, glyphs, OCR, etc. The unique transaction identifier serves to hide the true identity of the recipient and indexes the transaction. The unique transaction identifier may therefore serve as a data key to the entire transaction and may be used to store and access transaction data such as recipient name, address, second party vendor, credit card information, good information, etc. The unique transaction identifier may be, or may be linked to, a tracking number.

The proxy party provides the unique identifier and the respective recipient identity and shipping address to the label-switching agent authorized to handle private information. The package, labeled with the unique identifier is passed to the authorized label-switching agent where a new shipping label is generated with the unique transaction identifier and address of the recipient. The package is delivered via a shipper to the recipient. To handle a return, the authorized label-switching agent reverses the process, replacing the label with a unique transaction identifier and notifying the proxy party of the relabeled shipment. Multiple different media for communications and/or label switching may be used.

OVM operates as follows. The second party vendor labels the package containing the good with the unique transaction identifier as described above, and the address of an OVM depot, for example, OVM77432572980975, 10 Main Street, Any Town, USA 12345. The shipper delivers the package to the OVM depot at the address. The recipient claims the package by providing at least the unique transaction identifier (or some number or code from which the transaction identifier (#F) may be determined) on the package to the OVM depot. However, it is preferred that the recipient provide two pieces of identifying data. Other identifying data may be secret information such as a confidential code or a pass word or biometric known to the recipient and the OVM agent.

The shipping instructions include the unique transaction identifier which is associated with the shipment so that the shipment can be identified for later trans-shipment to the user or for later depot pick-up by the user. The unique transaction identifier is such that the user's identity and address are not revealed to the second party vendor. In the case of depot pick-up, the OVM agent releases the shipment based on a presentation of the unique transaction identifier, and perhaps some other information which does not reveal the identity and address of the user to the shipper or depot. In the case of trans-shipment, the users name and address are associated with the package after delivery to a trans-shipment point (authorized label-switching agent) on the basis of the unique transaction identifier, and the good is delivered from there directly to the user's address. While the trans-shipper may know the identity and address of the user, the trans-shipper does not know the contents of the package or the price of the good. However, the identity of the second party vendor and the good may be printed upon or otherwise evident from the package. In such cases, the package delivered to the authorized label-switching agent may be repackaged, i.e., placed into another package or wrapped in some way. An OVM agent may also be required to repackage or wrap a package so that the clerk who hands the package over to the recipient can not associate the good with the appearance of the recipient.

Thus, at each step of the transaction, the identity and other sensitive information about the user remain anonymous to the second party vendor, and no third party has all information identifying the user, the product, the second party vendor and the user's financial information.

In the embodiment that does not require a proxy, the functions of the proxy relating to shipping, labeling, depot operation and trans-shipping may be handled by the bank or a party or parties authorized by the bank.

In a preferred Internet embodiment, the proxy system includes or uses the following.

1. User proxy software: The user proxy software is stored on a user's PC or other device capable of accessing a network-based information systems or communications networks such as the Internet/World Wide Web. Each copy of the user proxy software is registered and is assigned a unique and secured proxy identifier (I). The proxy identifier is preferably withheld from the user to enhance security as indicated above. For example, the proxy identifier is embedded in the user proxy software so that a typical user can not access it. The user proxy software is "registered" with the proxy system operator which serves as a privacy protection agent. As described above, multiple related users of the same registered copy of user proxy software can be accommodated in one or more fields of the proxy identifier, or otherwise. Also, multiple copies for multiple users may reside on the same computer. The user proxy software can be distributed by the proxy system operator or a bank or credit card company affiliated with the proxy system operator, or the proxy system operator may be a bank or credit card company.

2. Proxy computer software: Proxy computer software is stored on one or more proxy computers and identifies registered user proxy software, indexes or links to a user's bank account (or debit account, or electronic check account, or credit card account) or some other account used for transacting business or purchasing items. (This user financial information is not made available to the proxy system operator, who only has information to index to the user financial information.) Proxy computer software also performs shipping, label generating and switching functions, and tracking status (during shipping and return) and shipping status.

The proxy software (user prosy software and/or proxy computer software) includes filtering software, preferably the filtering software described herein 3. Proxy computer(s): One or more proxy computers are owned and/or operated by the proxy system operator, and operate in conjunction with the proxy computer software to control transactions, including a secured address mapping (SAM) database that links purchase information with user's shipping address, and a transaction database for purchase, shipping and transaction information. Different proxy computers or software modules may perform different functions. For example, separate computers or modules may be used to perform privacy functions (e.g., handling communications between an on-line second party vendor and a first party user while maintaining user anonymity), transaction logging, shipping, label-switching, transaction inquiry handling and confirmation (e.g., linking the proxy system database and a shippers tracking database), etc.

4. A browser program: Software or some other means of accessing the communications network stored on a user's PC or other appliance.

5. Bank authorization software: Software stored on the proxy computer(s) and/or on one or more computers of one or more banks for submitting transaction information to the bank and receiving in return authorization or denial information.

6. Proxy party credit system: In some embodiments, a credit card account or other credit arrangement by which credit of the proxy system operator is involved in the purchase of the goods from retailers.

In addition, a user must have a credit card account, or other account information (debit, electronic check, etc.), which is authorized to be charged for goods ordered by a user.

In the context of the Internet/World Wide Web, the proxy system may operate as follows.

I. Registration procedure: A prospective user applies to the proxy system operator or to his, her or its credit card company to become a proxy system user. Upon approval by the proxy system operator and/or the credit card company (or as part of the initial application), the user must provide information such as his, her or its credit card number(s) and expiration date(s), shipping preferences, and services depot and user address(es). A copy of the user proxy software is given, mailed or shipped to the user, who loads it on his, her or its PC, e.g., as a plug-in to the browser on the PC. The user proxy software, in cooperation with the browser on the user's computer, can automatically go online to a proxy system computer or prompt the user to access the proxy system, and can complete the registration process automatically or in response to prompts, or a combination thereof. The registration process may require input by a user of secret information such as a PIN or pass word or biometric or other secret information that the user downloads or selects. Loading and downloading menus and procedures are providing to facilitate loading of the user proxy software on the user's PC.

II. User accesses the proxy system: The user elects to shop privately by actively clicking an icon, button, book mark or "favorites" or by some other typical means provided on the browser of the computer being used by the now loaded user proxy software. Alternatively, the user proxy software may set private shopping as a default, whenever the browser is active so that a user must click an icon, etc. to browse conventionally.

The user proxy software may first issue a request to the user to enter secret information such as a PIN, password, biometric, key or some other identifying information to determine that the user is authorized to transact with the user proxy software. (Since, the active participation of the user in initiating the privacy feature provides direct evidence of the user's wish to remain anonymous to second party vendors, users directly control their own personal information.)

III. Proxy system creates a session: The proxy computer software creates a unique session for each transaction, (or browsing session with a vendor) to identify transactions initiated by users in cooperation with the user proxy software. The unique session is assigned a unique identifier (e.g., #F) for identification and control purposes.

The user proxy software transmits to the proxy computer software unique and encrypted or secured numbers that are used by the proxy computer software to uniquely identify and index the user's unique proxy identifier (I) for the registered client software, current shopping activity, current order, if any, and user shipping address.

With the proxy system active, the second party vendor's WebPage provided through the proxy system may appear "wrapped" or "framed" within a window, frame or panel provided by the proxy system, or as largely provided by the second party vendor but with a banner, unique cursor icon, or other indication that the proxy system is active but not appearing in full view. When a user browses through the proxy system, the proxy system acts as a portal to Web sites. Alternatively, if the user is currently visiting the second party vendor's WebPage independently of the proxy system and the user wants to now shop privately, the user accesses the proxy system, and the second party vendor's WebPage cached on the user's PC then appears in the proxy system's window, etc.

The proxy system may provide banner messages, or scrolling or pop up messages within its WebPage to remind and direct the user of certain actions the user must or may take to hide their identity and personal information from the second party vendor, and may provide a final message asking whether all information on the screen is correct.

The second party vendor's WebPage, now embedded within the proxy system's "wrapping" WebPage or "bannered" by the proxy system, includes form-based fields requesting the name, address, salutation, shipping address and credit card information from the user, as well as perhaps other identifying, private or personal information.

IV. The proxy system communicates with the second party vendor: The user proxy software on the user's PC provides menus called, for example, by right mouse button clicking on the user's mouse. (Alternatively, icons, buttons, or other easily accessible means that may be clicked or invoked can be provided, e.g., dragging and dropping information into fields of the WebPage. When the user first clicks in the NAME field of the second party vendor's WebPage form, the user may then right click the mouse to reveal a pop-up menu of choices, one of which may be NAME, for example. When the user chooses the NAME item from the right mouse button menu, the user proxy software provides the proxy system's identity. Alternatively, the proxy computer software, alone or in conjunction with the user proxy software, provides the proxy system's identity. The proxy system's identity may be transmitted immediately or when a final submit action is made by the user. The user's true identity is therefore not transmitted to the second party vendor.

For each field of the second party vendor's WebPage form that requests identifying information, right mouse button menus and clicks on the menu choices are provided by the proxy system to fill out the form entirely with the proxy system's own identity information. The clicking actions by the user essentially directs the proxy computer software to transmit the appropriate identity information of the proxy system. One such piece of information is credit card account information that is used by the second party vendor to charge and receive payment. The proxy computer software does not have and does not transmit the user's credit card information, but rather the proxy's system's credit card information, which need not and preferably is not disclosed to the user. Other account information used by the proxy system in the transaction may be transmitted instead, e.g., debit account information, electronic check account information, or some other information that provides for a billing, or charge and payment transaction between the second party vendor and the proxy system.

The proxy computer software also transmits as part of the identifying information the proxy system's shipping (e.g., depot) address. The user's real shipping address has either been previously stored or on file with the proxy system when the user registered, or the user may be asked to select shipping information from the proxy computer software while shopping and filling out the second party vendor's web form. In the latter case, the selected shipping address is transmitted to the proxy computer software for further processing. The proxy system does not forward the user's shipping address to the second party vendor. Hence, the information provided to the second party vendor indicates that the second party vendor transacted with the proxy system, and the user's identity, account information and address is entirely unknown to the second party vendor in the transaction.

The proxy system additionally removes and replaces any identifying, private and personal information from all data transmitted to the retailer as discussed herein.

The proxy temporarily stores transaction information until a transaction is completed.

V. The proxy system completes the transaction with the second party vendor:

When the user initiates completion of the order by clicking the appropriate button or icon in the second party vendor's WebPage (e.g., using the right mouse button menus provided by the user proxy software) the proxy computer software also completes the transaction by submitting the now completed form but with the proxy system's identifying information which has been inserted by the proxy software.

The second party vendor obtains authorization from the proxy system operator's bank (which may be the same as the first party user's bank) to charge the transaction to a credit card. The proxy computer software waits for and receives from the second party vendor confirmation information (e.g., a confirmation page) that the proxy computer software stores for future reference. This archived confirmation information includes all identifying information transmitted to the second party vendor as well as typically a complete list of items ordered from the second party vendor and credit card information. This transaction information may be stored on the proxy computer (in a transaction database) for later retrieval by the first party. The shipping information may be stored in a secured address mapping (SAM) database.

The second party vendor also supplies a confirmation or order number or symbol (e.g., H) used to identify the purchase information displayed in the confirmation page. The unique session number (#F) is indexed to this confirmation or order information for future processing and completion of shipping instructions to direct goods to their final destination (the user's shipping address or the proxy system's depot). This information (unique session number #F, any confirmation numbers or symbols H returned by the second party vendor, and other possible information produced by the proxy computer software working in conjunction with the user proxy software) is stored in the transaction database and may optionally be transmitted to the user's PC for local storage and future reference. Information supplied by a second party vendor and proxy system supplied information may be downloaded to a user's PC to enable the user to contact the second party vendor anonymously to check on order status, or to arrange for return, or to report damage, etc. The down-loaded information must be sufficient to enable a user to contact a second party vendor and identify the concerned transaction while maintaining user anonymity.

VI. The proxy system submits a transaction to the bank: The proxy system's server software now transmits purchasing information to a bank as if a customer (the user) were purchasing from the proxy system. The proxy system passes to the bank the user's proxy identifier that allows the bank to identify the user as a bank customer and access the customer's account. In an alternative embodiment, the proxy system database may store user bank account information linked to the proxy identifier, and the proxy system may transmit this account information (encrypted or secured) to the bank.

The interactions between the proxy system and the bank are protected by authentication and encryption of all information communicated. The proxy system enables the bank to configure these protection mechanisms in a way that enables only the bank to validate the identity of the user and to decode the information transmitted.

The proxy system notes transaction, as well as the transaction amount that includes at least the transaction amount charged by second party vendor for the selected goods plus, optionally, additional fees that the proxy system may charge for use of its service. The proxy system may thus charge the user an amount that is displayed to the user with confirmation information that the user's order and credit card transaction have been completed and authorized. This information may be directly displayed to the user who may still be browsing, or it may be transmitted by some other means at a later time, for example email.

The bank returns or communicates to the proxy system sufficient authorization information to allow the transaction to complete. The bank-supplied authorization information may optionally be linked with the previously stored confirmation information received from the second party vendor. In the normal course of business functions, the second party vendor charges the correspondent bank or credit card company of the proxy system for the proxy system's apparent purchase of goods. The second party vendor is charged a fee by the correspondent bank for the transaction, just as in non-anonymous transactions.

However, hidden from the second party vendor, the credit card company or bank of the user credits the proxy system for the purchase of goods and pays the proxy system part of the fee charged to the second party vendor by correspondent bank as the proxy system fee. The correspondent bank matches the transaction with the user's credit card bank, nets the transaction and pays the proxy system its fee. As discussed herein, a different fee arrangement may be provided to compensate the proxy system operator.

As also discussed herein, the user's bank and the proxy system operator's bank may be different or the same.

The authorization and other transaction information with the bank is also stored in the transaction database.

V. and VI. Reversed: Alternatively, the proxy system may first submit transaction information to the user's bank, wait for authorization and then complete the order with the second party vendor and complete its communication with the user. If the bank denies the transaction, then the proxy system would not send confirmation or completion orders to the second party vendor and the user would be informed that their purchase is denied. Alternatively, the user's bank may have pre-authorized the user's transactions by providing certificates, or certified electronic cash and thus the user's bank need not be contacted during the transaction process.

VII. Shipping: The second party vendor ships to the address provided by the proxy system (e.g., by a proxy shipping computer from the secured address mapping (SAM) database), which can not be linked to the user by the second party vendor. The proxy system previously indexed the user's shipping information with the previously stored confirmation information and unique shopping session or transaction identifier in the secured address mapping (SAM) database. This shipping information will include either the user's shipping address or information designating user pick-up and/or tracking numbers. Where the user designated delivery to a shipping address, that address, indexed to the confirmation information, is used to generate a new shipping label. The packaged goods are then relabeled (or repackaged or wrapped if the identity of the good or the second party vendor is to be shielded) with the user-designated shipping address and shipped to the user.

Where the user designated depot pick-up, the packaged goods can simply be stored for pick-up indexed by the shopping session or transaction identifier, or with some other information. Alternatively, the packaged goods can be relabeled with other information useful in facilitating pick-up by the user. (As discussed above, the packaged goods may also be repackaged or wrapped to hide the identity of the good and the identity of the second party vendor.) The proxy system notifies the user of shipment by the second party vendor, receipt at the depot, or both. The proxy system may provide the user and the depot with information other than the session identifier (#F) by which the user's package is identified and indexed at the depot.

The procedure described above provides for communication over the Internet using the TC/IP protocol. However, certain communications between the first party users and the proxy computer(s) can be by e-mail, as can certain communications between the proxy computer(s) and third party computer. For example, after successful installation of the user proxy software, the user may register by e-mail (encrypted). The proxy may capture the registration data and forward it by e-mail to a database (e.g., the transaction database). Similarly, after an order has been successfully entered and stored, for example, in a temporary file, the proxy may capture the information and e-mail it to the database (e.g., the transaction database). Appropriate information may also be captured and e-mailed to the bank(s). In addition, confirmations, order information, tracking information and good receipt information may also be sent by e-mail as well as in response to requests transmitted by the browser. Thus, a user may access the order information and track order processing and shipping.

BRIEF DESCRIPTION OF THE DRAWINGS

The invention is illustrated in the figures of the accompanying drawings which are meant to be exemplary and not limiting. The description herein, including the appended claims, identifies various elements by specific names for convenience. These names are intended to be generic in their application unless otherwise indicated. In the accompanying drawings:

FIGS. 3E–3H are flow diagrams showing credit approval and crediting/debiting of the parties involved in a transaction for various embodiments;

FIG. 5 is a diagram illustrating transaction authorization and netting procedures carried out by the system depicted in FIG. 3B;

FIG. 6 is data diagram representing data generated in a transaction using the system depicted in FIG. 3B stored by the third party bank;

FIG. 7 is a data diagram representing data generated in a transaction using the system depicted in FIG. 3B stored by the proxy;

FIG. 8 is a table showing data generated during a transaction and the parties who have access to the data;

DESCRIPTION OF THE PREFERRED EMBODIMENTS

Figure 1:
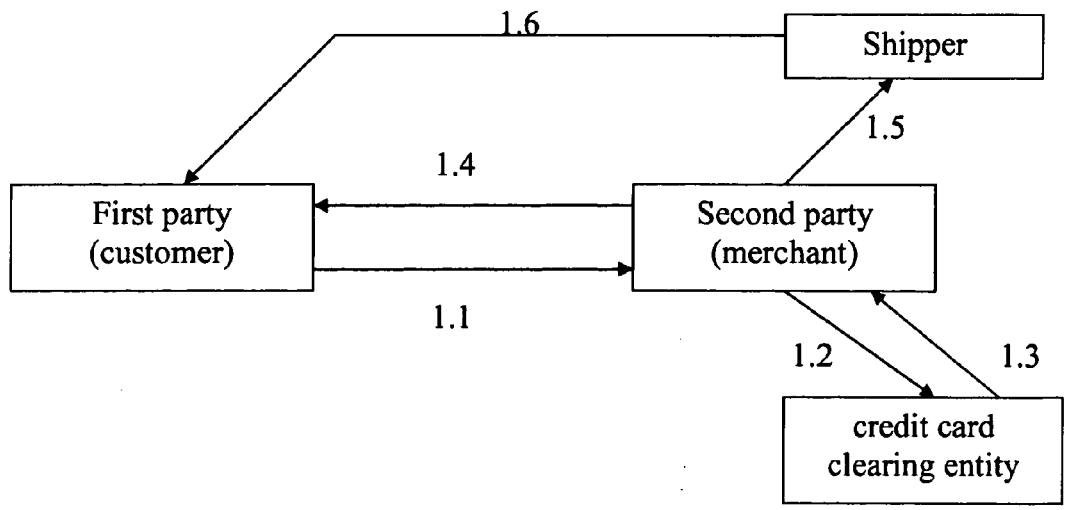
FIG. 1 is a block and flow diagram representing a conventional multi-party e-commerce transaction involving a first party consumer, a second party merchant, a shipper and a credit card clearing entity.
Figure 2:
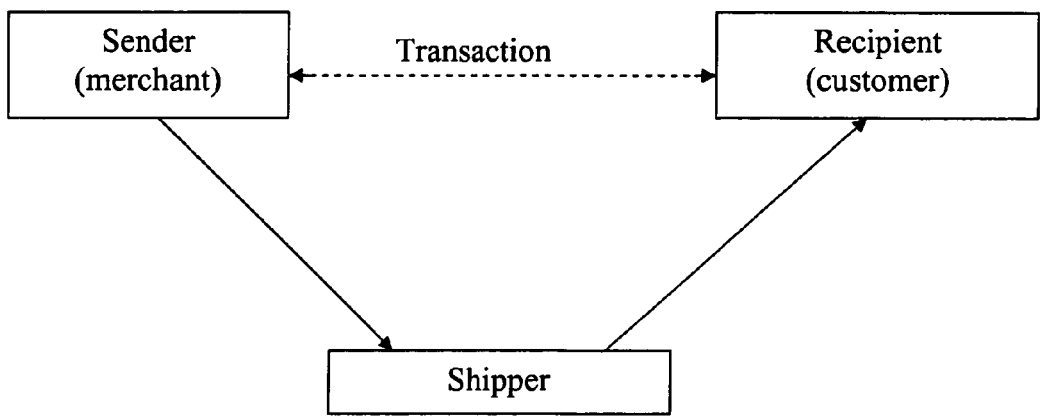
FIG. 2 is a block and flow diagram of a conventional shipping transaction involving a sender, a recipient and a shipper.

As mentioned above, the invention provides methods and systems which enable users of a communications network such as the Internet to communicate, and/or order, and/or obtain or receive, and/or charge or electronically pay for deliverables over the network, while securing private and personal information of the users with respect to unauthorized parties and providing improved protection against fraud. Embodiments of the invention may or may not include a proxy, as discussed above.

In the presently preferred embodiment, the methods and systems include a central proxy, and a system including a proxy is described below.

The overall architecture of systems with a central proxy incorporating the invention can be implemented in different ways, some of which are illustrated in FIGS. 3, 3A, 3B and 3C which depict a system 100, 100a, 100b, 100c linked by the Internet 102 and optionally by one or more secure transmission links 104 for conducting e-commerce over the Internet and World Wide Web between first party customers, represented by first party computers 106, and second party merchants, represented by second party computers 110 through a proxy system 112, 112a which includes proxy computer(s) 108 and proxy software 114. The proxy computer(s) 108 represent a proxy party or proxy system operator. A third party, represented by third party computer(s) 116, pays (credits) second party merchants for respective goods purchased by first party customers and debits the accounts of respective first party customers.

Figure 3:
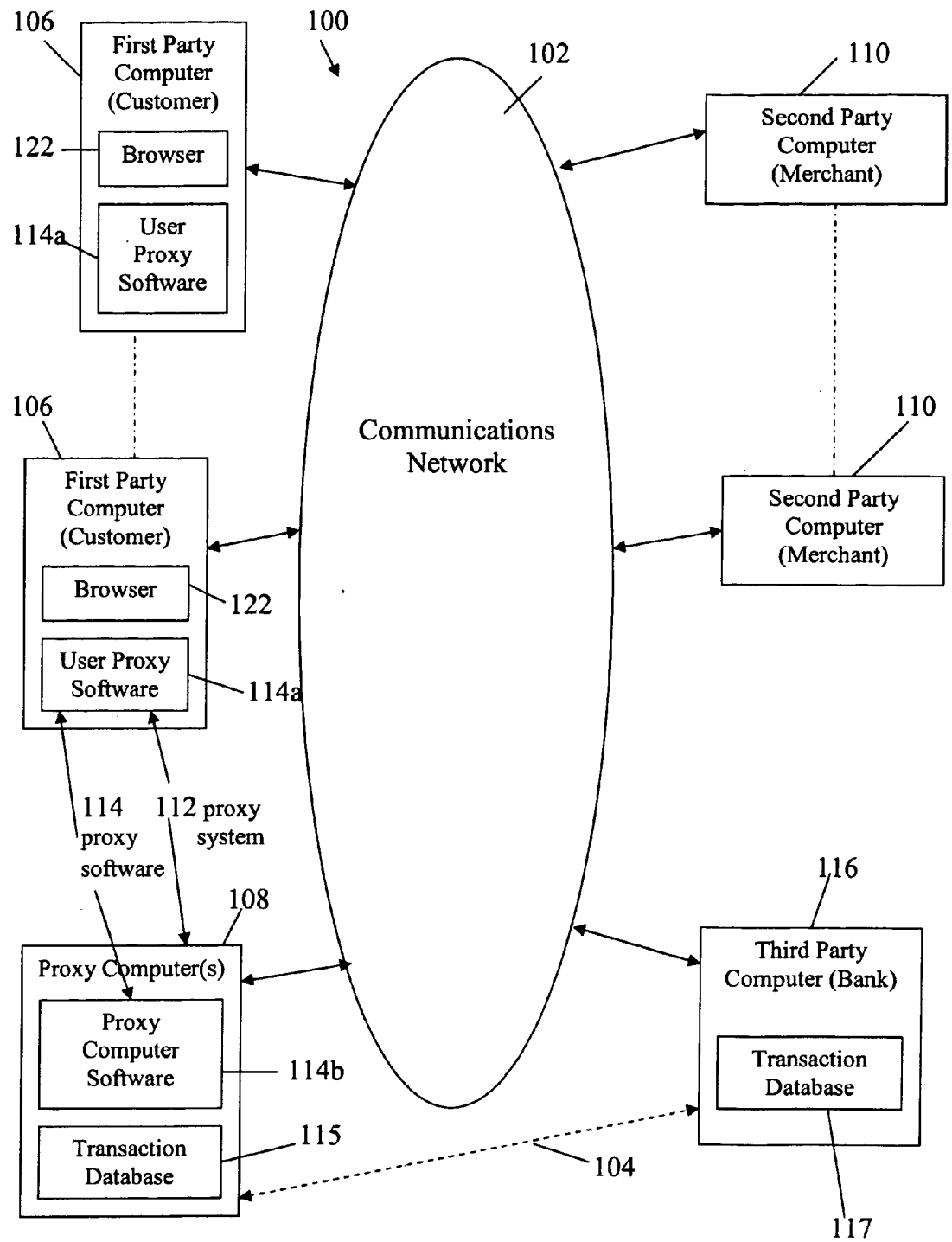
FIG. 3 is a block diagram of an embodiment of a system incorporating the invention for the purchase of goods over the Internet and payment for the goods.

Referring to FIG. 3, the proxy system 112 may include one or more databases for storing transaction data. For example, a transaction database 115 that stores transaction data (e.g., as shown in FIG. 7) may be provided that links transaction data, as described below. Other parties such as the third party bank 116 may also have a database such as a transaction database 117 that stores transaction data (e.g., as shown in FIG. 6). As pointed out above, by logging data such as returns, complaints, delivery times, damaged goods, etc. in the proxy transaction data base, or in another database maintained by the proxy, vendor performance can be measured.

The first party can elect to communicate and transact directly with the second party conventionally, as in FIG. 1, or through the proxy system 112 represented in FIG. 3. If privacy is wanted, communicating or transacting with a second party is handled through the proxy system 112. The proxy software 114 secures the first party's private and personal information with respect to unauthorized parties and provides information necessary for an e-commerce transaction which routes the transaction through the proxy system 112 and identifies the proxy party (i.e., the proxy system operator) as the transactor.

The proxy software 114 may be executed by the proxy computer(s) 108, or distributed and executed by both first party computers 106 and proxy computer(s) 108. FIG. 3 depicts an embodiment in which the proxy software 114 is distributed, part 114a being executed by user computers 106 and part 114b being executed by proxy computer(s) 108. The first party computers 106 may function as client computers, and the proxy party computer(s) 108 and the third party computers 106 may function as server computers. For convenience, and to more easily differentiate the proxy software parts, proxy software 114a executed by first party computers 106 is referred to as user proxy software 114a, and proxy software 114b executed by a proxy computer 108 is referred to as proxy computer software 114b.

Figure 3A:
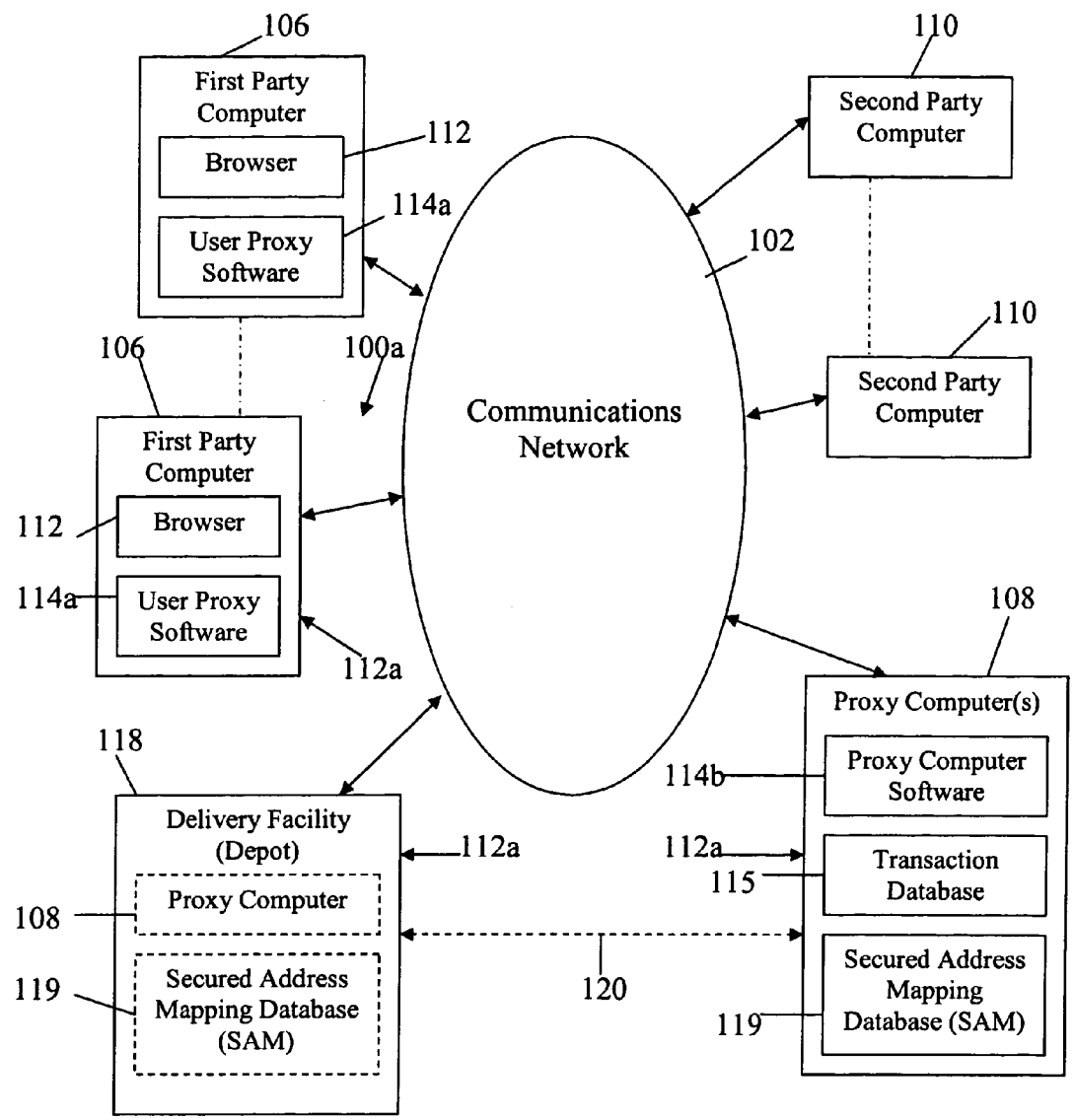
FIG. 3A is a block diagram of an alternate embodiment of system depicted in FIG. 3 showing a delivery facility as part of the system.

A system 112a which may provide for delivery of physical goods, and as illustrated in FIG. 3A, includes a physical or virtual delivery facility 118 to which a good ordered by a first party customer is delivered while securing the identity of the first party. The delivery facility 118 may be linked to a proxy computer 108 through the Internet or a secure link 120, and may include one or more proxy computers 108. A secured address mapping (SAM) database 119 may be provided to link users with their physical or electronic shipping addresses. The SAM 119 database may be located within a proxy computer 108 that communicates with first party computers or at a delivery facility 118, or at another location accessible over the Internet (preferably over a secured channel).

Thus, FIGS. 3 and 3A respectively represent embodiments in which payment for purchase of a good is achieved over the Internet while securing the private and personal information of the purchaser with respect to unauthorized parties, and in which physical delivery of a good ordered over the Internet is achieved while securing the private and personal information of the purchaser with respect to unauthorized parties. In the preferred embodiment, the system 100b show in FIG. 3B provides for both payment and delivery and is represented by combining FIGS. 3 and 3A, i.e., FIG. 3B includes the delivery facility 118 and the SAM database 119 at the delivery facility and/or the proxy computer(s) and/or at another location.

In the systems 100, 100b depicted in FIGS. 3 and 3B, both first parties and the proxy party have accounts with the third party 116 (bank or credit card company, etc.), and third party 116 performs credit clearing and provides for payment (credit) to a second party and debiting of a first party involved in a particular transaction, and also crediting the proxy party with a part of the service charge, as described in more detail below. FIG. 3C illustrates a system 100c which includes two parties, third party 116a and fourth party 124, involved in credit clearing and payment for a purchase, and represents an alternate embodiment of the system 100b depicted in FIG. 3B. The third party 116a may be a bank or credit card company, etc., as in FIG. 3B, with which a first party has an account, and the fourth party 124 may be another bank or credit card company with which the proxy party has an account. Third party 116a clears credit card transactions with respect to the first party and fourth party 124 clears credit card transactions with respect to the proxy party. The third and fourth parties settle, where, generally, the fourth party pays the second party, and debits the proxy party's account with the fourth party, and the third party pays the proxy party by crediting the proxy party's account with the fourth party and debits the first party's account with the third party, as described in more detail below.

Figure 3B:
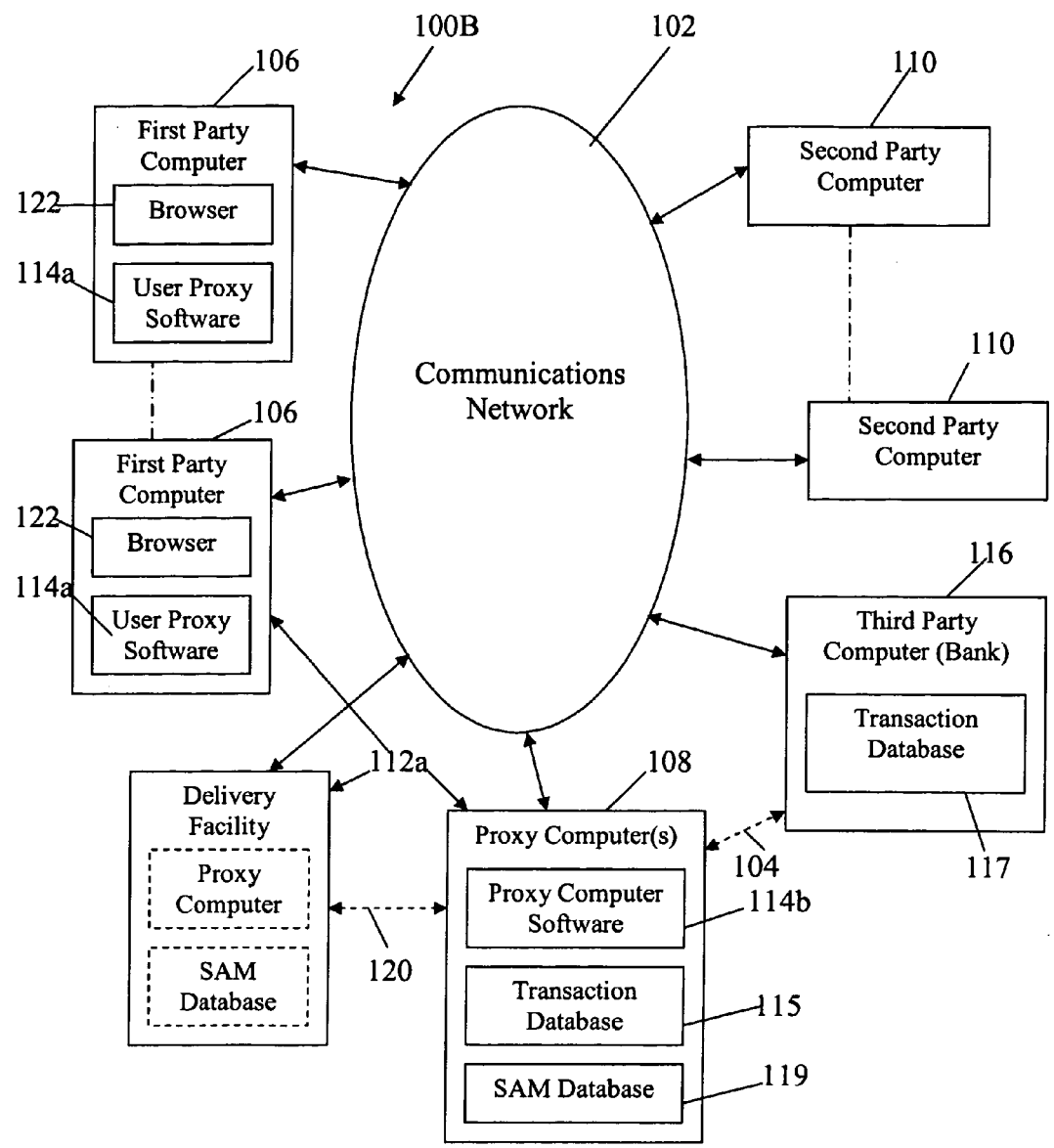
FIG. 3B is a block diagram of an embodiment of a system which provides for purchase and payment and delivery of goods over the Internet.
Figure 3C:
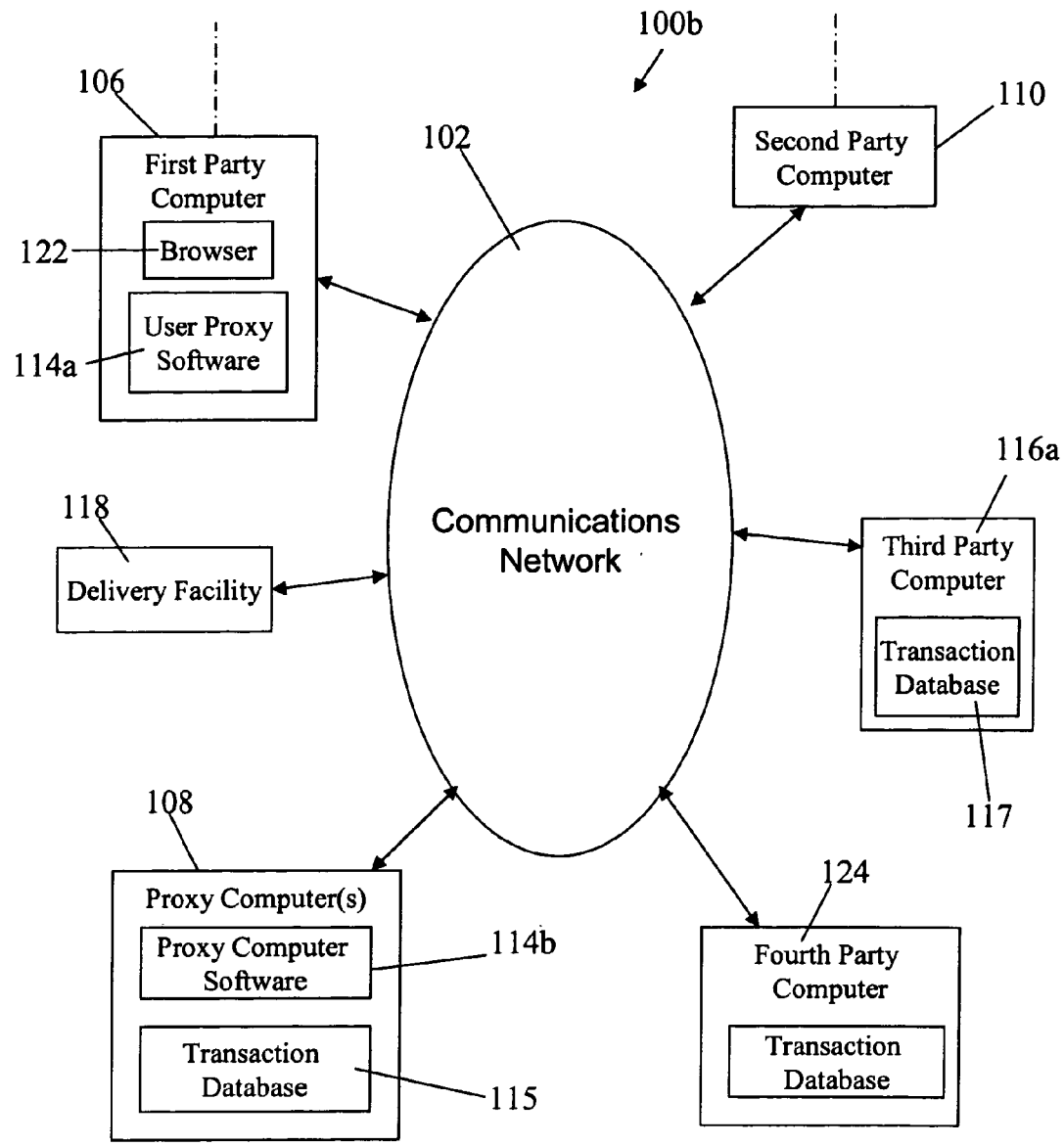
FIG. 3C is a block diagram of a portion of system depicted in FIG. 3 showing an additional party (fourth party) as part of the system depicted in FIG. 3B.
Figure 3D:
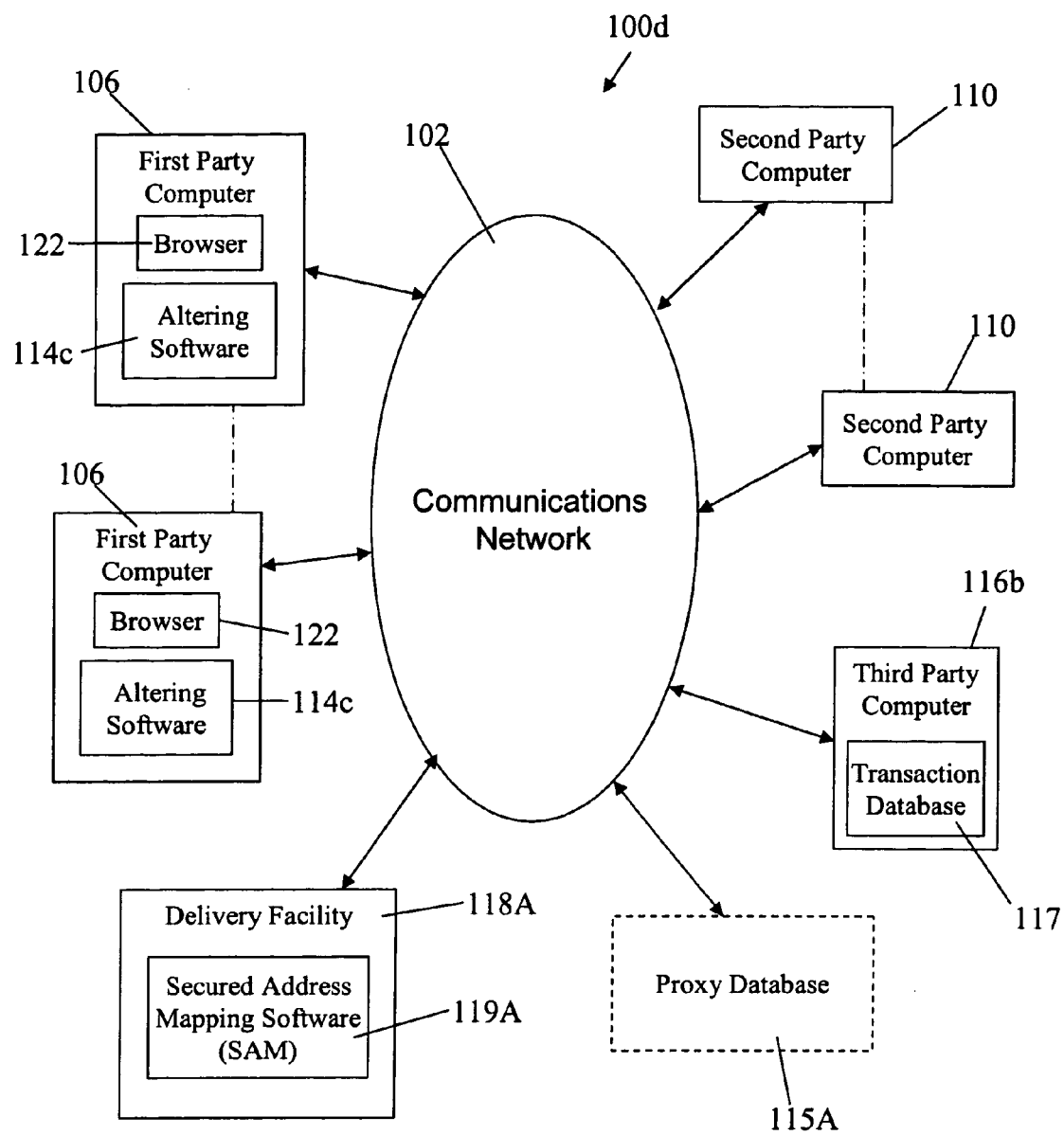
FIG. 3D is a block diagram of alternate on embodiment of a system incorporating the invention for the purchase of goods over the Internet without a proxy.
Figure 3H:
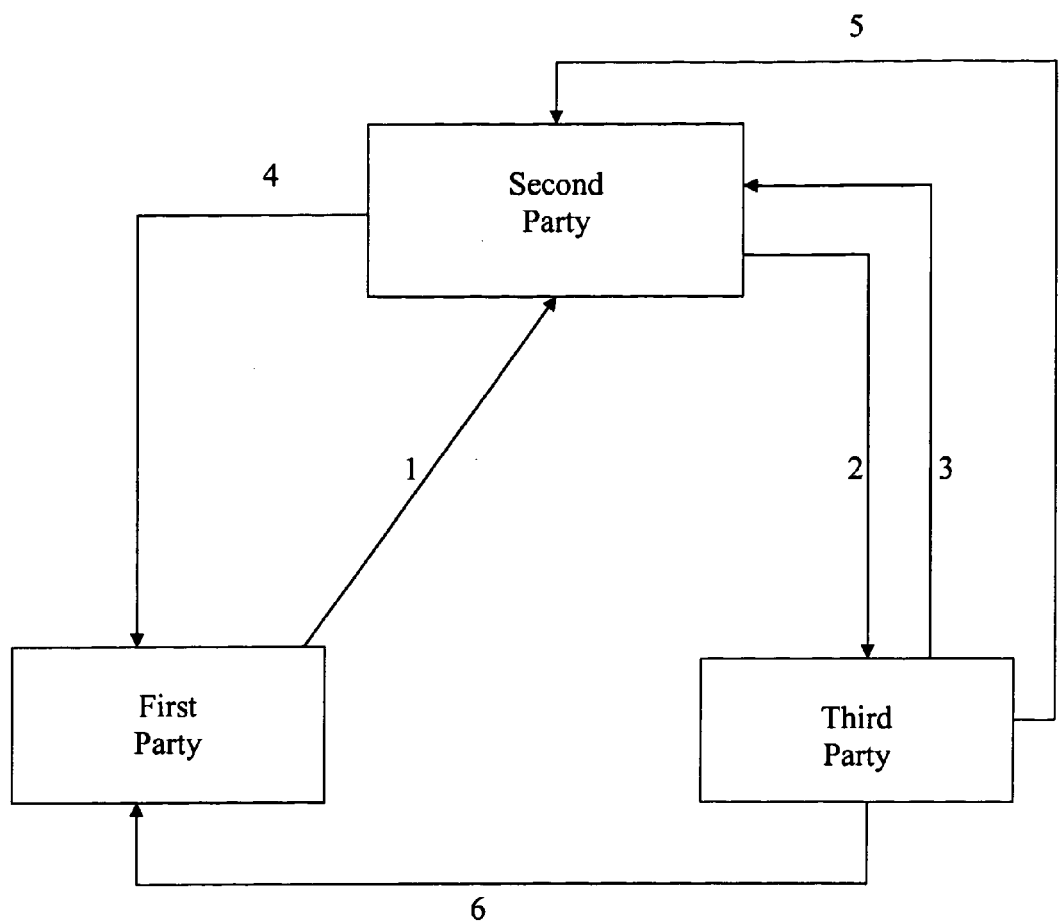

FIG. 3D shows the embodiment that does not require a proxy. System 100d includes first party computers 106 which include a browser 122 and altering software 114c which performs the filtering described in connection with the proxy software. System 100d also includes a delivery facility similar to delivery facility 118 but operated by the third party 116. Second party computers 110 and a third party computer 116b are similar to those in system 100b shown in FIG. 3B. System 100d may also include a central transaction or proxy database 115a which stores transaction data for safe keeping and later retrieval by the parties in the event of a return, or a dispute, etc.

Referring to FIG. 3B, each first party computer 106 accesses the Internet and navigates the World Wide Web with browser software 122 (e.g., Internet Explorer® and Netscape Navigator®). A first party computer 106 may access the Internet and navigate directly without using the proxy system 112, or through proxy computer(s) 108 using the proxy system 112, as described below.

Figure 4:
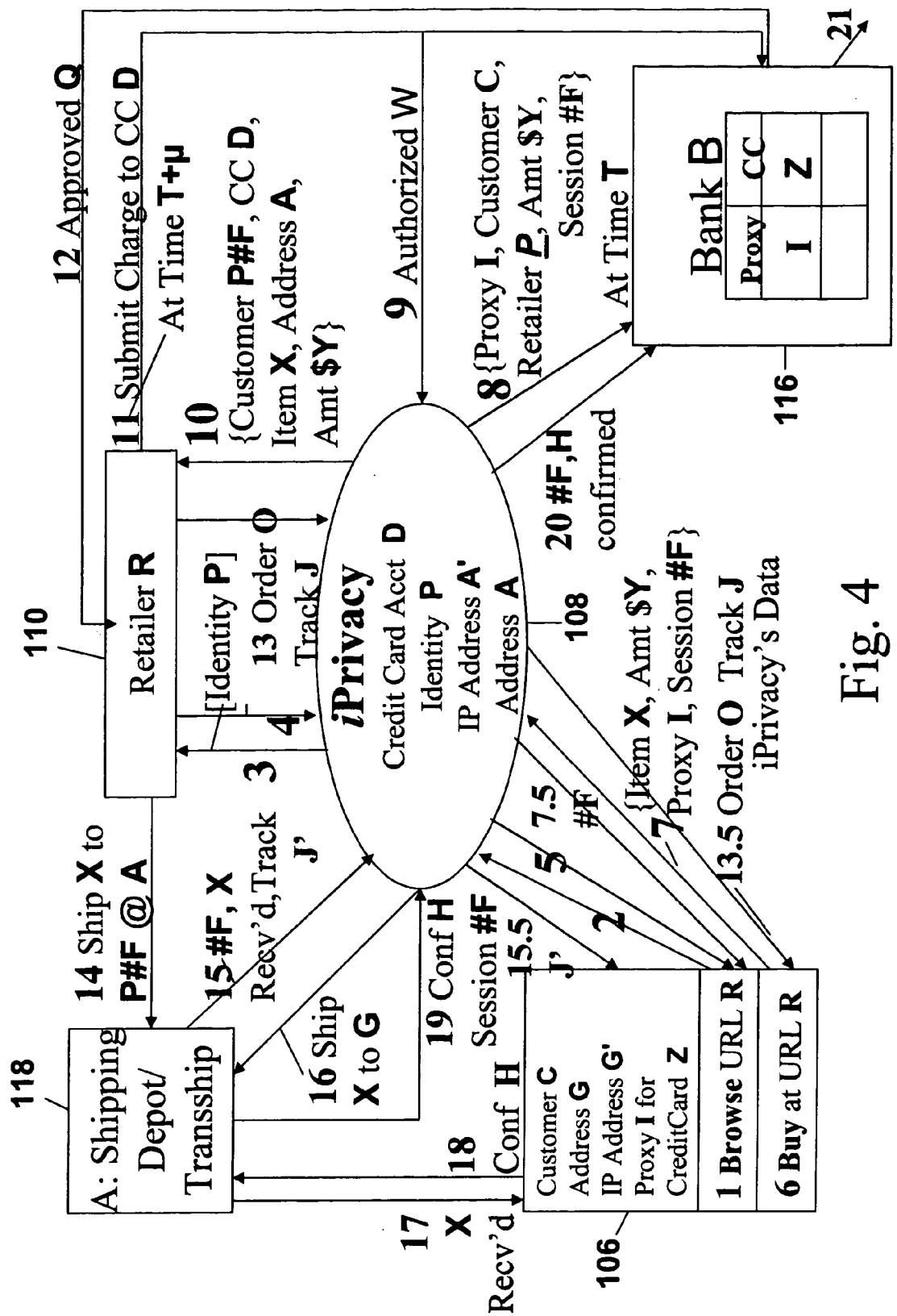
FIG. 4 is a block and flow diagram illustrating an electronic purchase made using the system depicted in FIG. 3B.

Operation of the system 100b is described with reference to FIG. 3B and FIG. 4. In the flow diagram of FIG. 4, the first party is referred to as "Customer C", or simply "the customer", the second party as "Retailer R", or simply "the retailer", the proxy party as "iPrivacy", the third party as "Bank B", or simply "the bank", and the delivery facility 118 as "A: Shipping Depot/Transship", or simply as "the depot". In FIG. 4, the customer block is referenced by 106 consistent with the first party computer(s) 106 in FIG. 3, the iPrivacy block by 108 consistent with the proxy computer(s) 108 in FIG. 3, the retailer block by 110 consistent with the second party computer(s) 110 in FIG. 3, the bank block 116 consistent with the third party computer(s) 116 in FIG. 3, and the depot block by 118 consistent with the delivery facility 118 in FIG. 3A.

Referring to FIGS. 3B and 4, the proxy software 114 extends an API (the WWW browser 122) with software to monitor, filter and reroute interactions between the browser 122 and second party computers 110 (e.g., WWW servers). The proxy software 114 provides anonymizing transformations of these interactions to assure the customer's privacy, and eliminates from the transaction all explicit and implicit information identifying the customer and issues transaction information to the retailer with the proxy system's own identifying information, including financial charging information and a "first hop" shipping address from which the ordered good may be trans-shipped or held for customer pick up. The proxy software 114 monitors and filters all data exchanged between the customer computer 106 and the merchant computer 110 and removes any data that may compromise customer privacy. For example, cookies and agents dispatched by merchant computers 110 to customer computers 106 are eliminated.

Referring to FIG. 4, the customer computer 106 has a physical address G and an IP address G', and user proxy software 114a by which the computer 106 accesses the Internet through a proxy computer 108 for anonymous WWW browsing and e-commerce. The user proxy software 114a is registered to Customer C under proxy identifier I, and can be invoked with PINs, passwords, biometrics, etc. The proxy identifier may have one or more fields or other means to identify such users, and the proxy computer software may store data relating to such users. Also, more than one copy of user proxy software 114a may be loaded on the same PC and registered to different users, or loaded on different computers and registered to the same user.

Figure 4A:
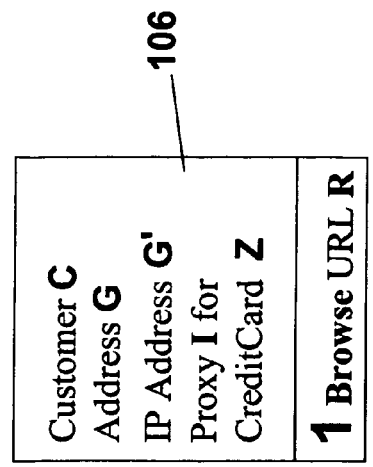
FIGS. 4A–4Q illustrate specific steps and data flows carried out using the system depicted in FIG. 3B.

Assume that the browser and the user proxy software are active on the customer computer 106 at Time T. Referring to FIGS. 4 and 4A, in step 1, the Customer C provides or clicks a URL R of a WebPage that he or she wants to visit, which is transmitted (step 2, FIG. 4B) to a proxy computer 108 having a physical shipping address (Depot) A and an IP address A', a public proxy system identifier P, and a credit card account D with the bank B. As discussed herein, the user proxy software 114a strips at least the Customer C's IP address G' from the message and substitutes the proxy computer's IP address A'. However, further filtering may be carried out by the user proxy software 114a and/or the proxy computer software 114b, as described below.

Figure 4C:
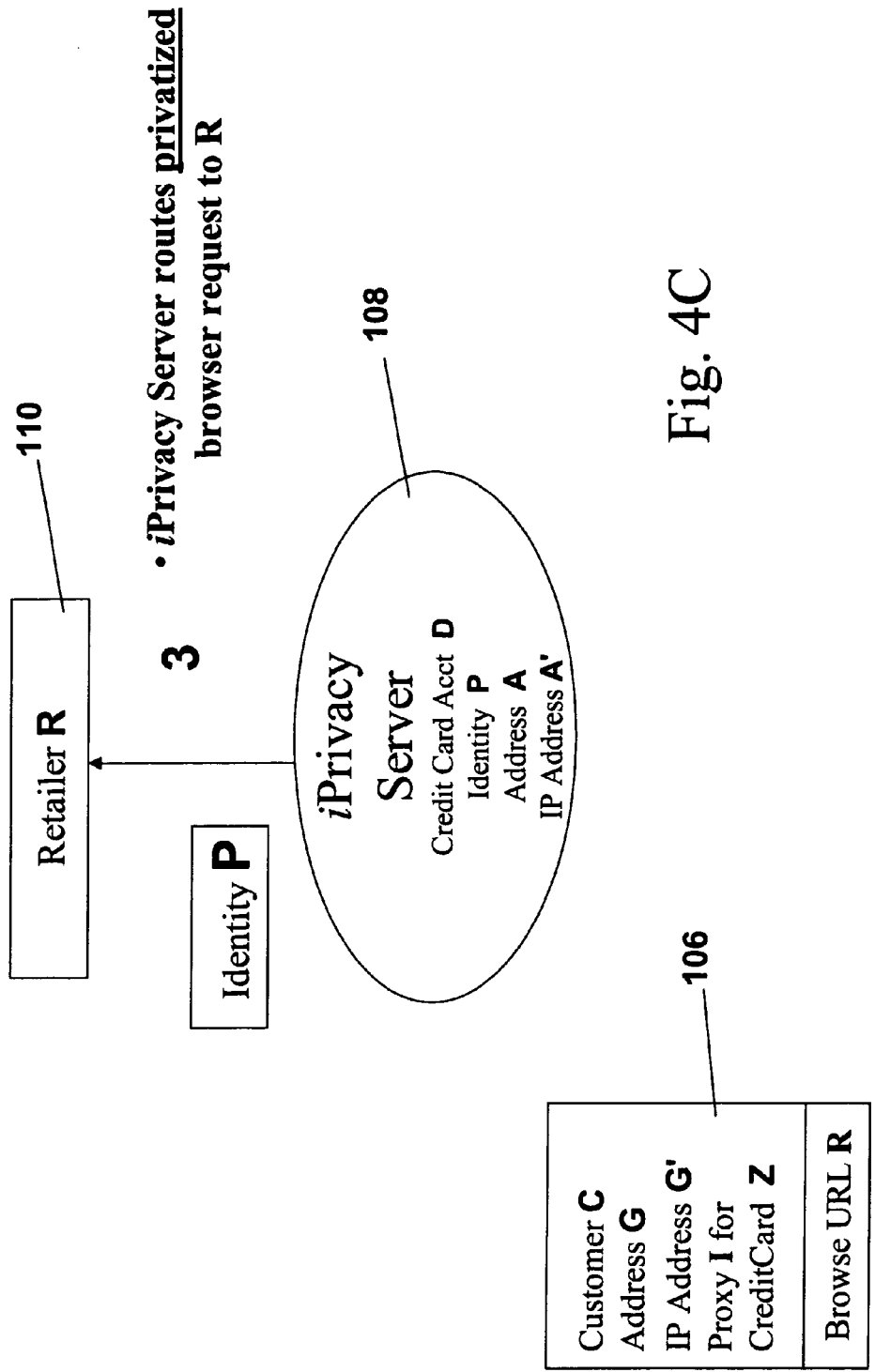
Figure 4D:
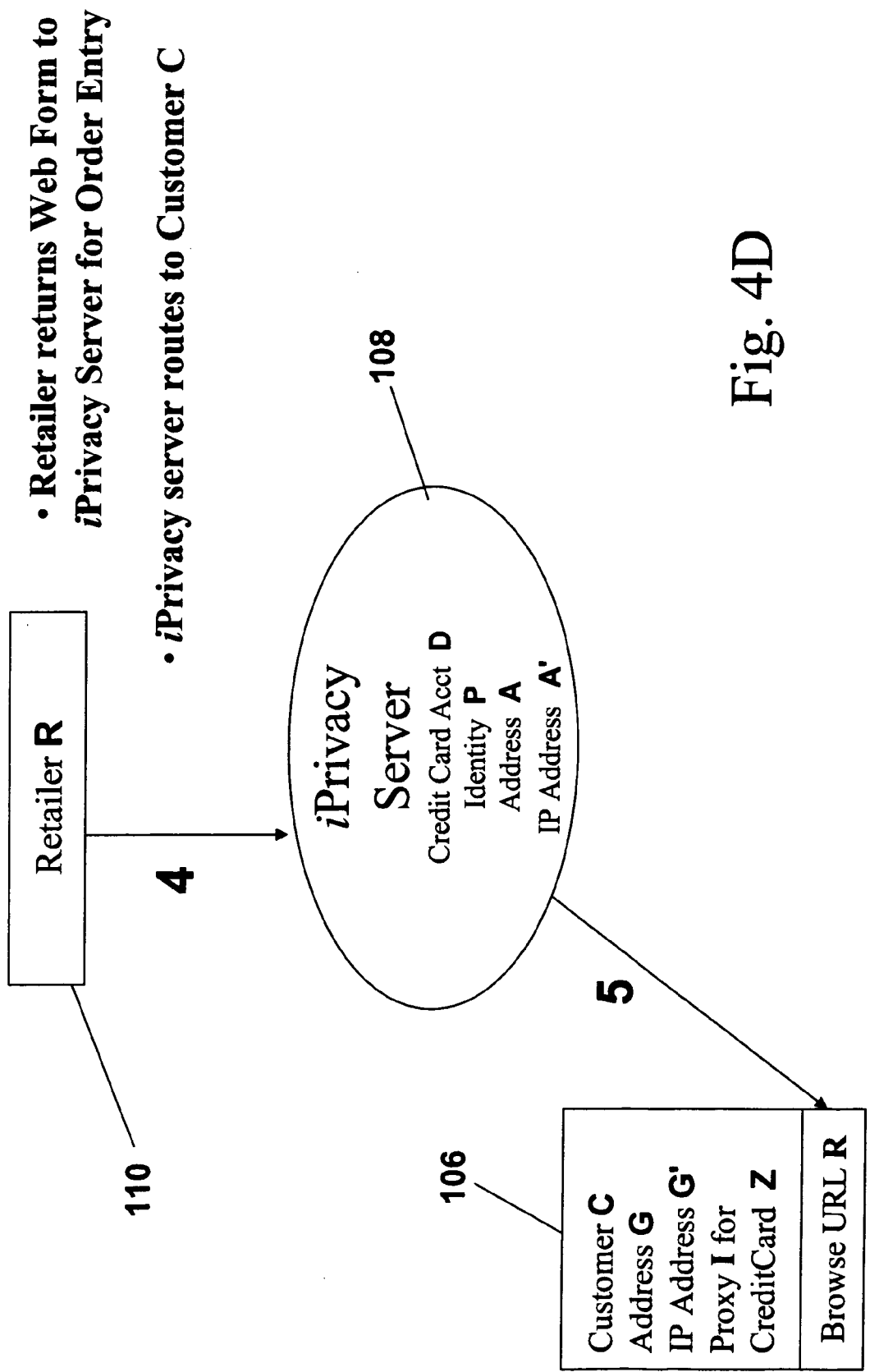
Figure 4E:
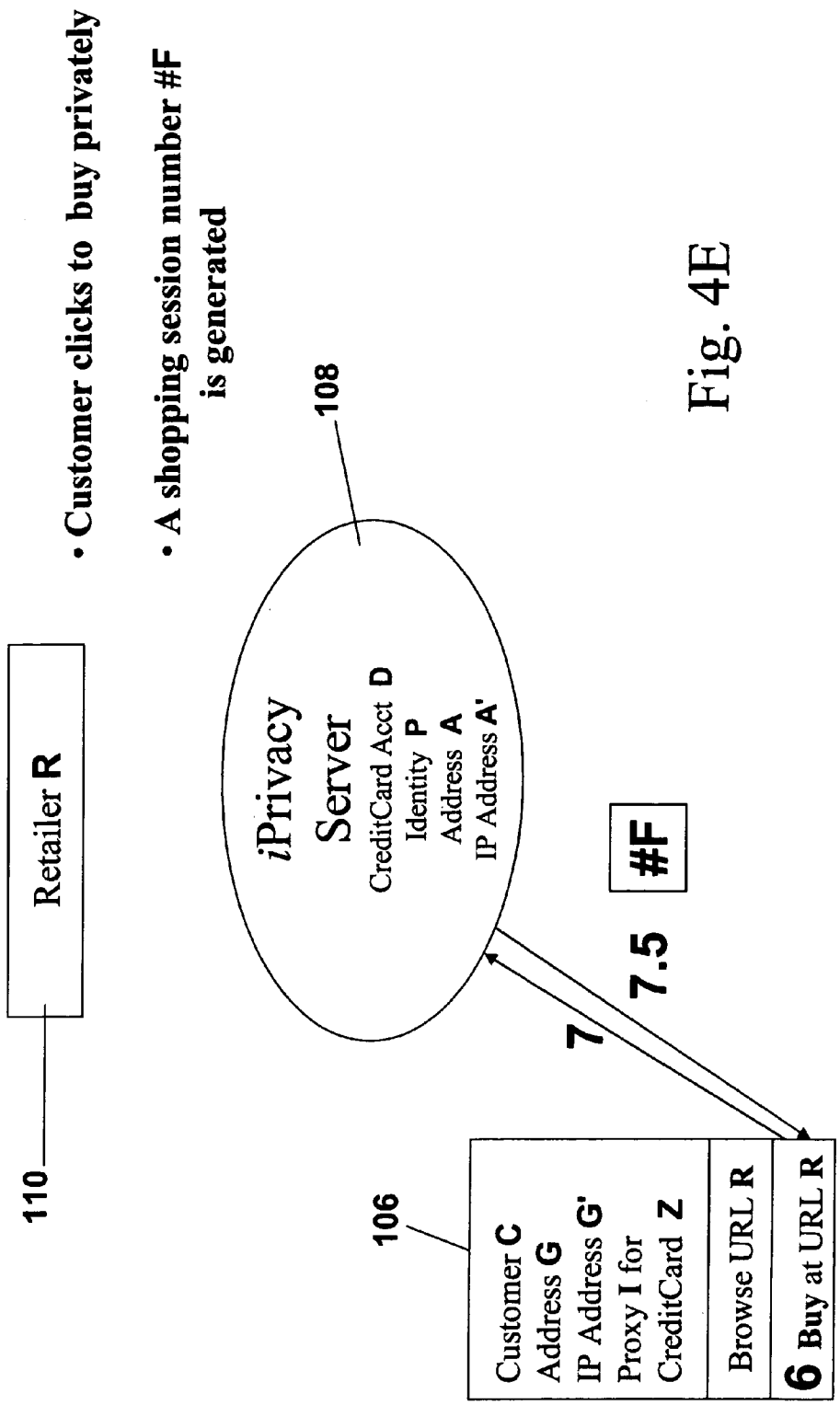

Referring to FIGS. 4 and 4C, in step 3, the proxy computer 108 transmits the altered message from the customer computer 106 to the retailer R, providing the retailer with the proxy system identifier P. The retailer responds in step 4 (FIG. 4D) with a return message to the proxy computer 108. The proxy computer 108 analyzes the message, and may filter or alter the message depending upon content before forwarding it to the customer computer 106 in step 5 (FIG. 4D). Assume that the message forwarded in step 5 includes a form portion, i.e., a portion which requests that the customer supply information such as order information, name, address, credit card information, etc. In one embodiment, the proxy computer software 114b on the proxy computer 108 may filter out form portions requesting private information and forward only the order portions of the form, which the user fills in (step 6, FIG. 4E). In another embodiment, the proxy computer 108 may forward the entire message and rely on user proxy software 114a on the user computer 106 or software transmitted with the message to warn or prevent a user from entering private information. In either case, a filled out form is returned (step 7, FIG. 4E) to the proxy computer 108, which generates a unique session number #F and provides it to the user computer 106 in step 7.5 (FIG. 4E).

A final shipping address designated by the first party and the shopping session number is stored in the secured address mapping (SAM) database 119 (FIG. 3B) along with tracking numbers and used later by the trans-shipper and depot to route the physical delivery correctly.

Figure 4G:
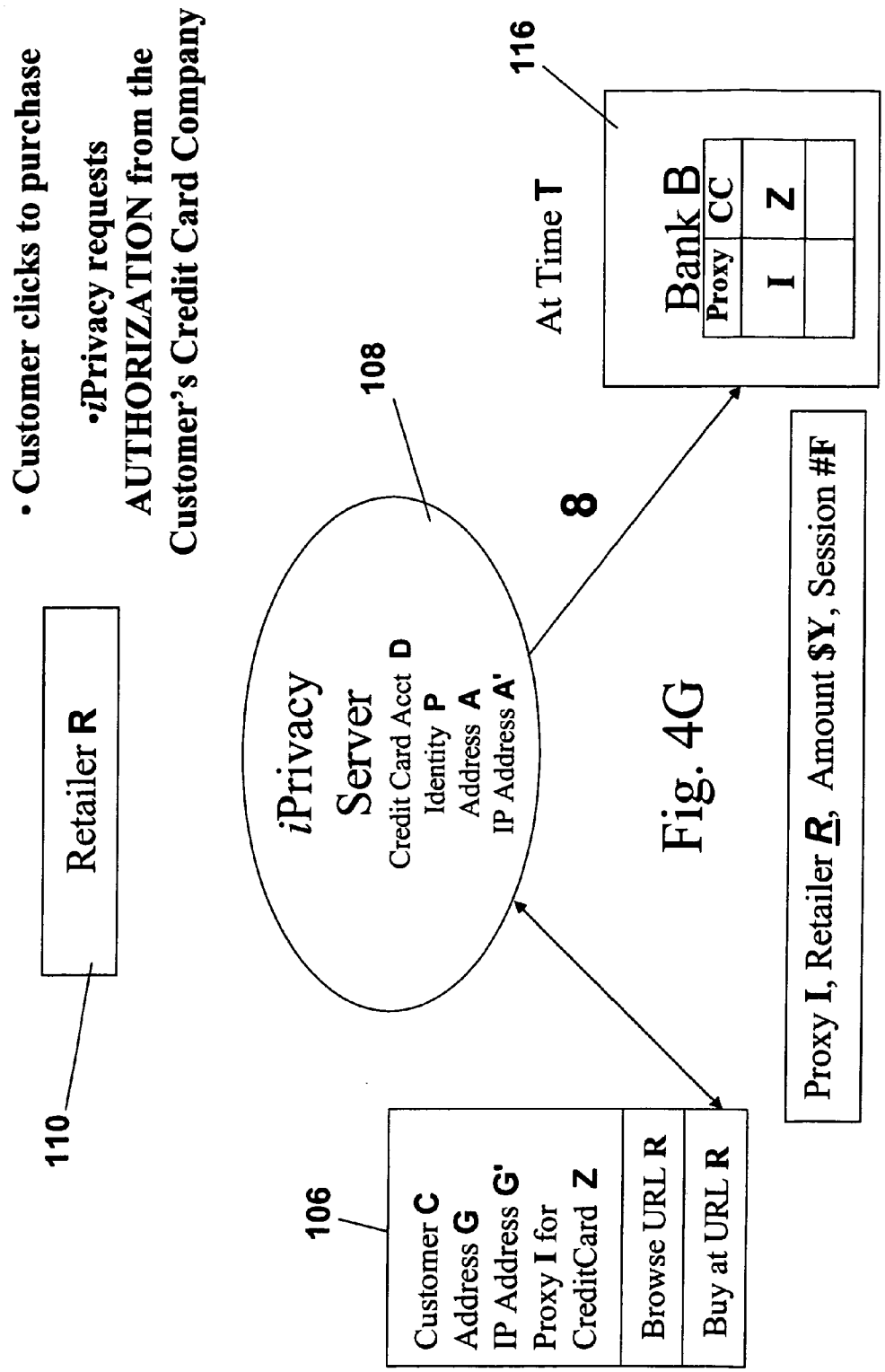
Figure 4H:
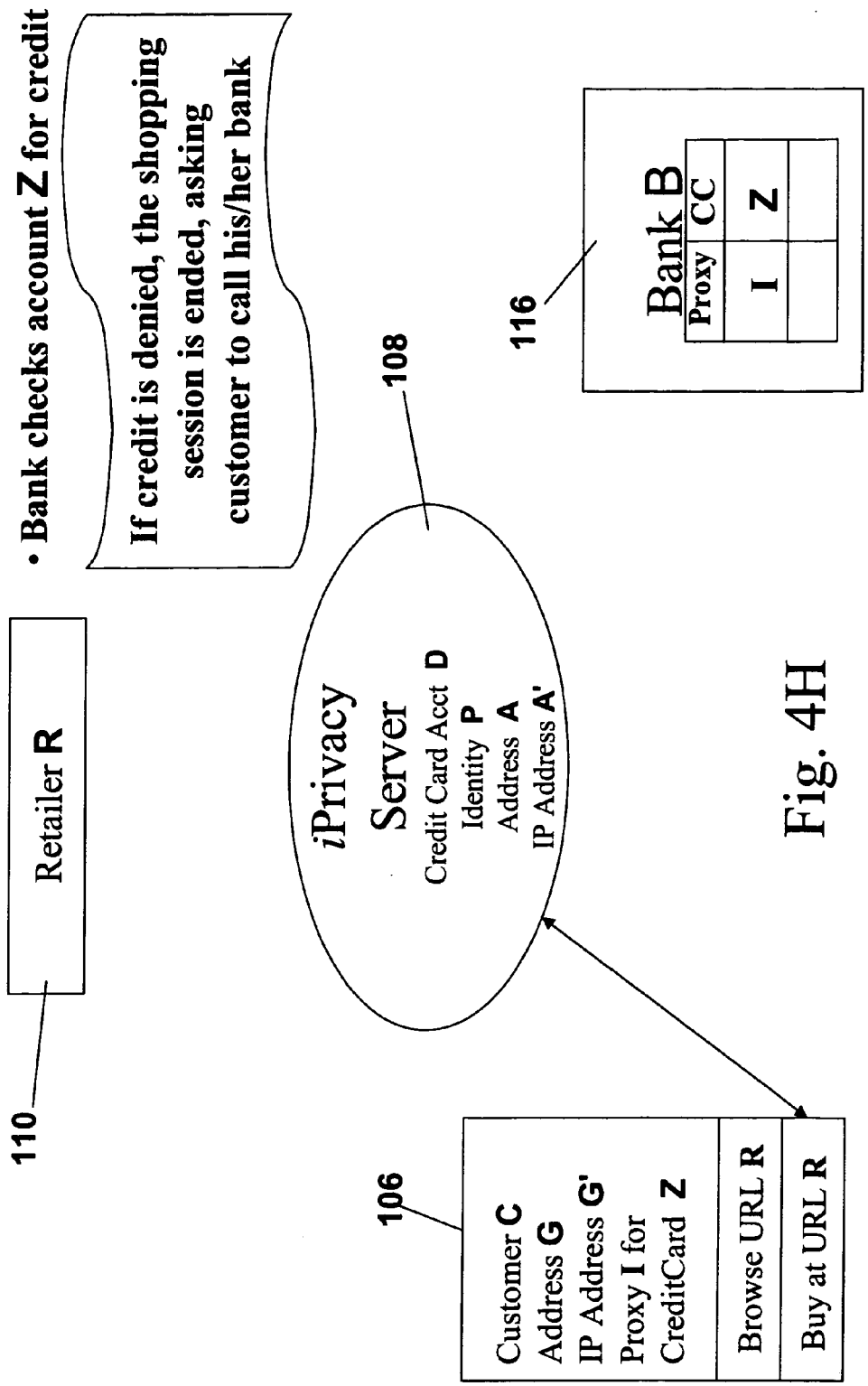

The total purchase price is determined from the good(s) ordered on the form (FIG. 4F), and the proxy computer 108 generates the ordered item(s) X and the price amount $Y. The proxy system has now generated "Item X, "Amount $Y", "Proxy I" and "Session #F". At this point, the proxy system operator obtains authorization to charge the user's credit card prior to forwarding order information to the retailer. In step 8 (FIG. 4G), the proxy computer 108 forwards to the bank B a secured message including the customer's proxy identifier I, the proxy's identity P, the amount of the requested transaction $Y, and the session (transaction) identifier #F, and requests credit authorization for the transaction. Depending upon business relationships, the retailer's identity R may have to be supplied (e.g., as a fraud prevention measure). The bank B already has the customer's account information which is accessed from the customer's proxy identifier I. (The customer's credit card number is not transmitted over the Internet, and is not subject to theft or misuse, thereby reducing fraud.) If authorization is denied (FIG. 4H), the session is ended, preferably by requesting the user to contact his, her or its bank.

In another embodiment (FIGS. 4G and 4K), the proxy identifier I and the customer's credit card number Z are held by the proxy system, and are sent to the bank B for credit authorization. The proxy system transacts with the retailer using the proxy system's credit card D. If the proxy system sends customer transaction information to the customer's bank B, and the proxy system sends transaction information to the proxy system's bank B', then the proxy system will need a credit line with B' (fourth party 124 in FIG. 3C) in advance of transacting.

Figure 4I:
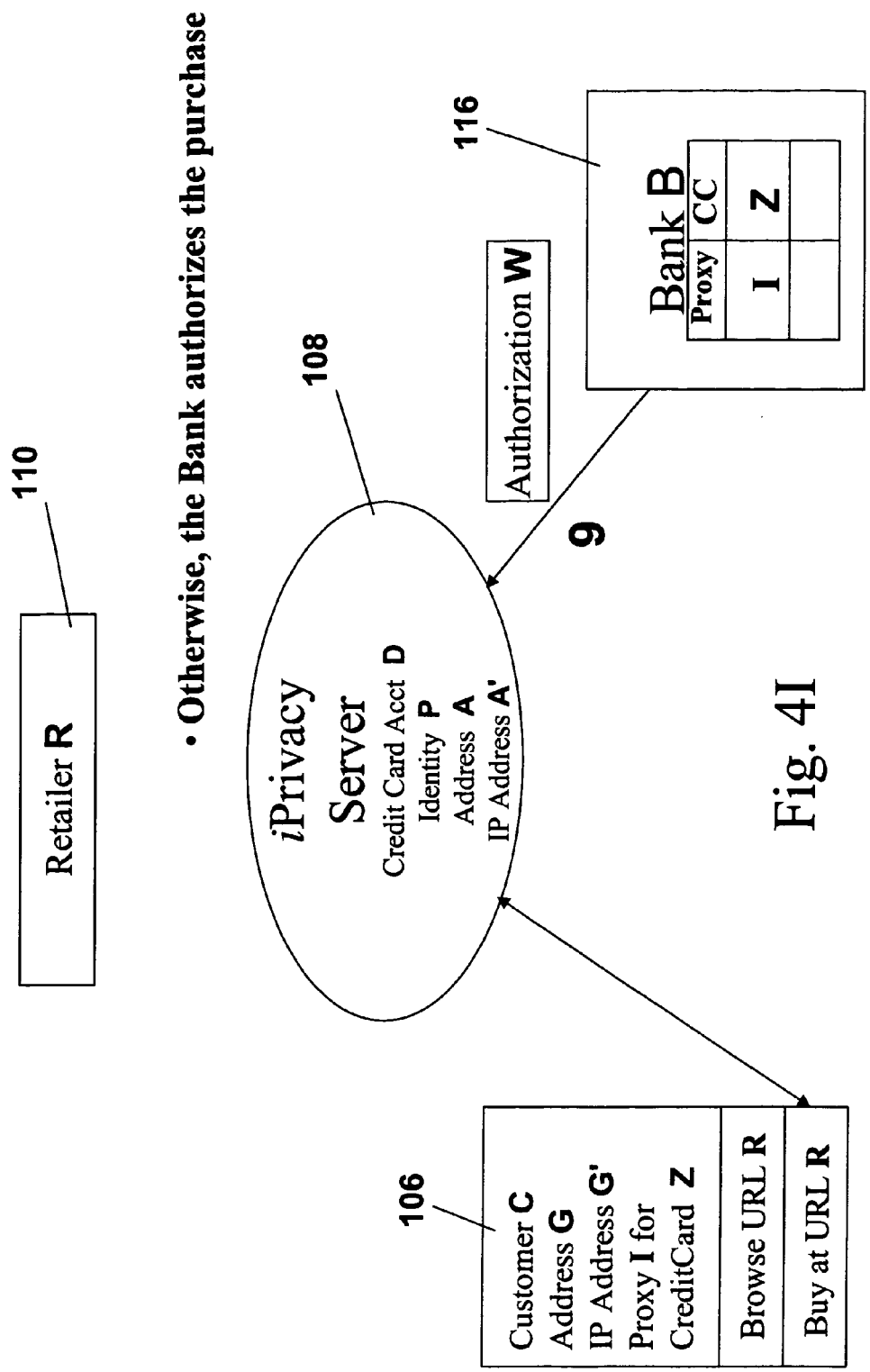
Figure 4J:
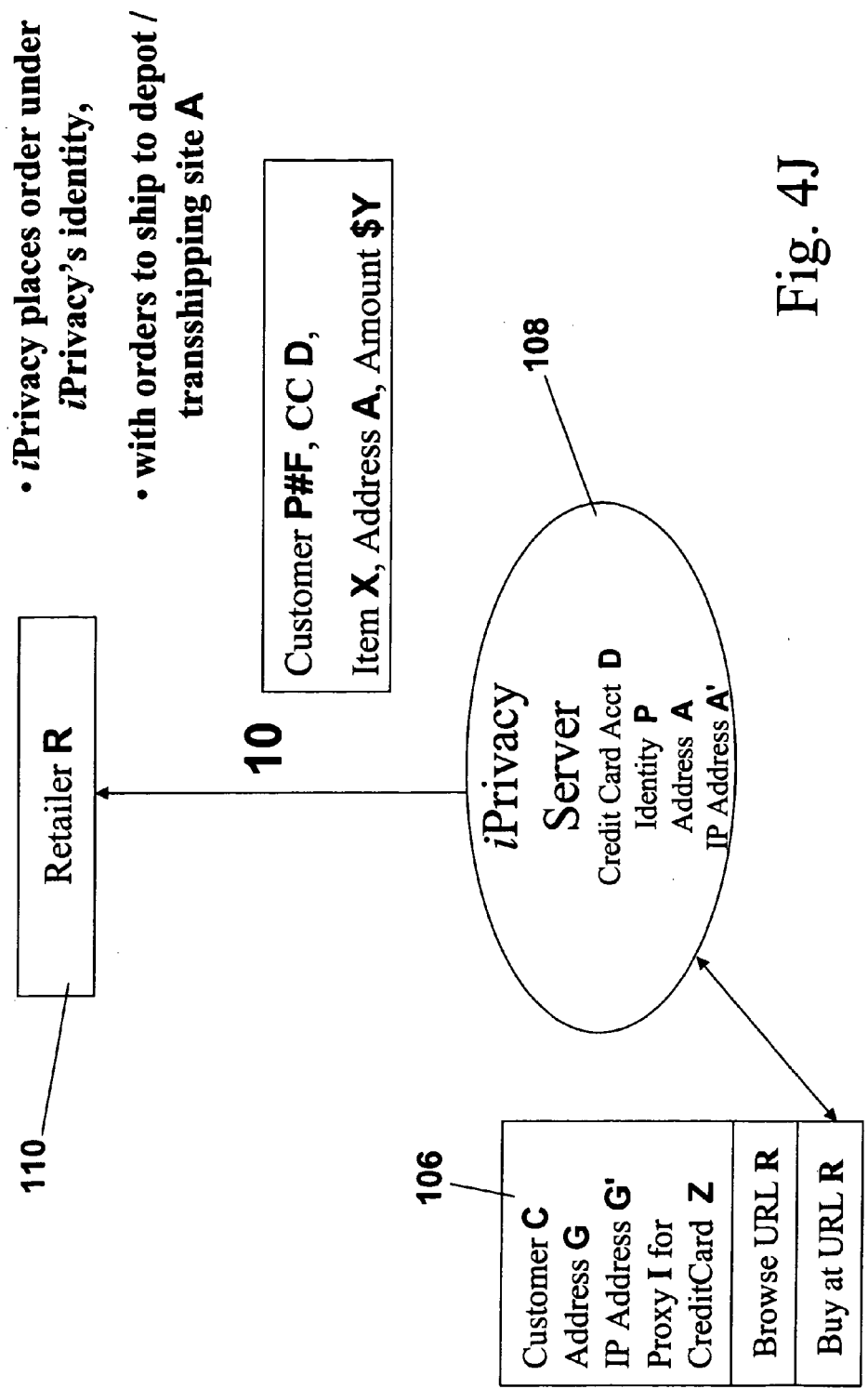

If authorization is provided, the bank B in step 9 (FIG. 4I) authorizes credit for the concerned transaction and forwards authorization information W to the proxy computer 108, adds the following (FIG. 4J) to the previously generated order information (item identification X and amount $Y): the proxy system operator's proxy identifier P, the session identifier #F, the proxy system operator's credit card number D, the proxy system-operator's depot shipping address for delivery A. The user's identity transmitted to the retailer R is P#F, a unique proxy identity preventing the retailer from linking this transaction with any other transactions. In step 10 (FIG. 4J), the proxy computer 108 forwards this information to the retailer R. The proxy (depot) delivery address A is linked to the user's delivery address G in the secured address mapping (SAM) database 119 (FIG. 3B).

Figure 4K:
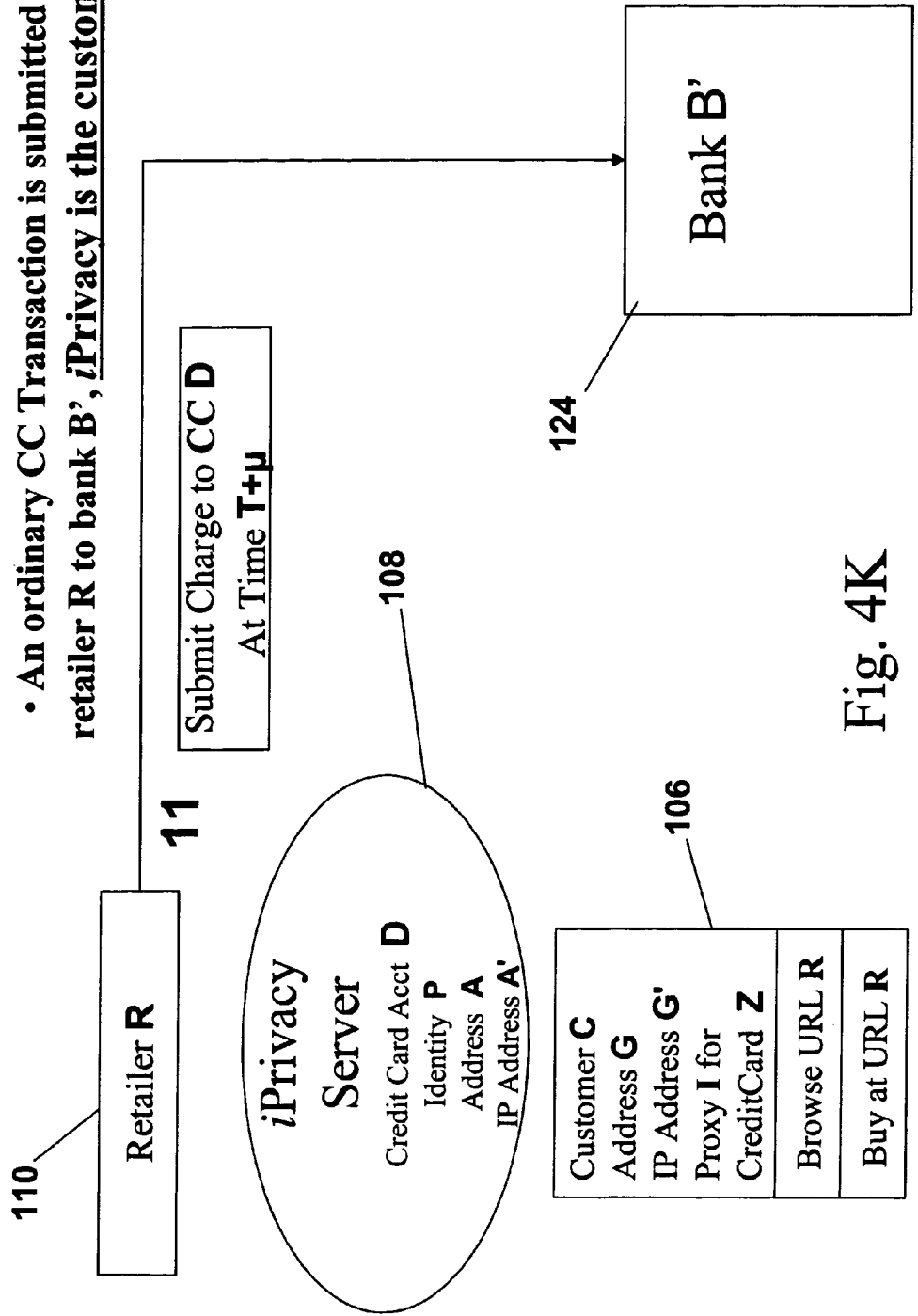

In step 11 (FIG. 4K), the retailer R requests authorization to charge the proxy system operator's credit card D. This request is made after the bank B approved the customer's credit in step 9 (FIG. 4I), which is represented in FIG. 4K by the request taking place at Time T+μ. If the proxy party and the first party have accounts with the same bank B, this request is made to bank B, as shown in FIG. 4. If not, the request is made to another bank B' (FIG. 4K) with which the proxy party has an account. If the proxy party's credit is approved, in step 12 (FIG. 4L) the bank B (or B') provides the authorization Q to the retailer.

Figure 4M:
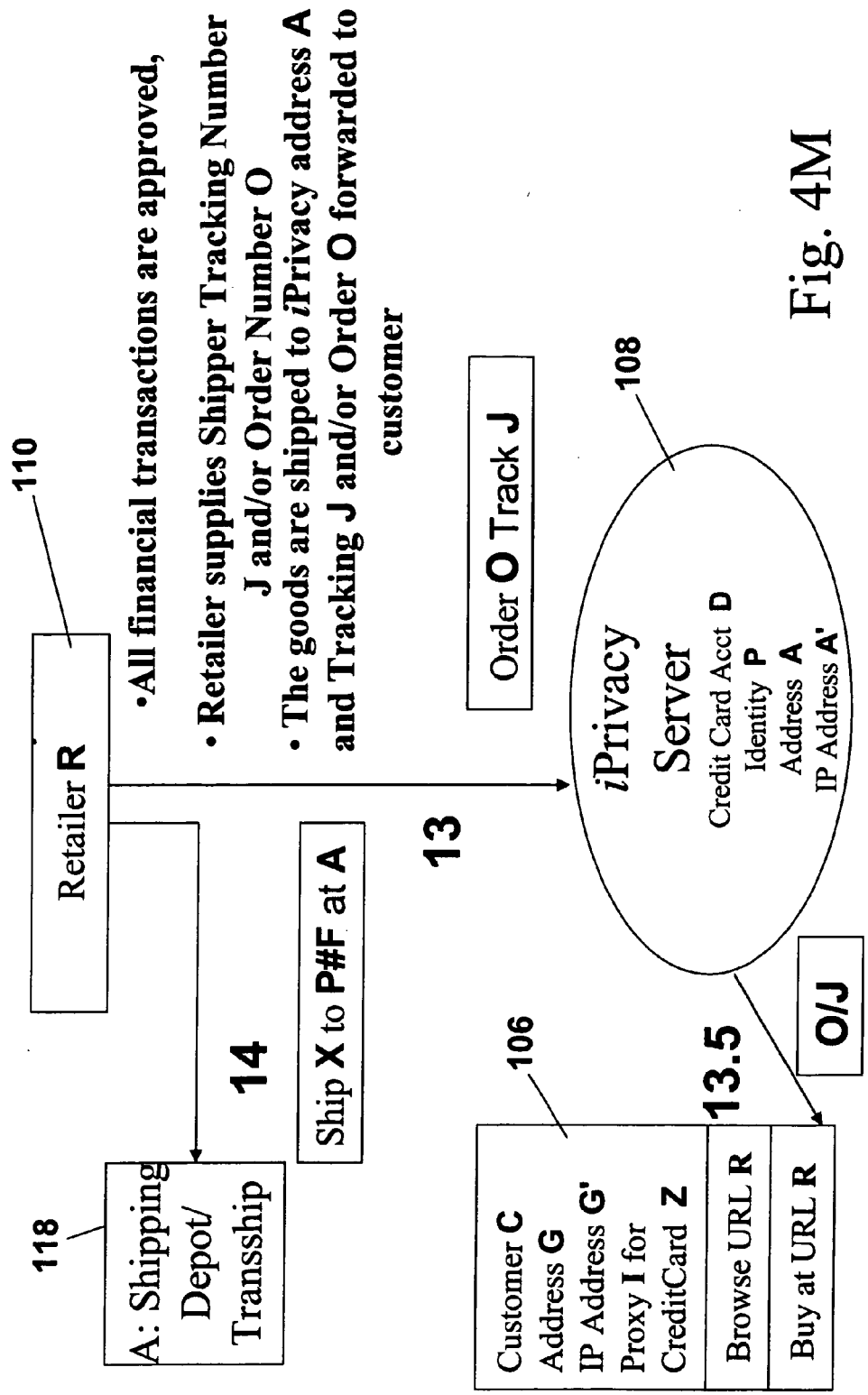

At this point (FIG. 4M), all authorizations have been provided, and the retailer in step 13 provides the proxy computer 108 with shipper tracking number J for the shipment from the retailer to the shipping depot (the first hop), and/or the order number O, which the proxy computer 108 forwards to the user computer 106 in step 13.5. The tracking number J is also stored in the SAM 119 and linked to the user's address G and shopping session number #F. The retailer then ships the good in step 14 to the proxy system operator's shipping depot address A with labeling containing the proxy system operator's proxy identifier P and the session identifier #F. In step 15 (FIG. 4N), the shipping depot A acknowledges receipt of the shipment and forwards to the proxy computer 108 acknowledgement of receipt of the shipped good identified by the session number #F, and a second hop tracking number or pick-up number J', also stored in the SAM database 119, and the proxy computer 108 forwards this information to the user computer 106 in step 15.5. Depending upon arrangements with shippers and the proxy shipping depot A, the same tracking number J may be used for both the first hop shipment to the proxy shipping depot A and the second hop shipment to the customer.

Figure 4P:
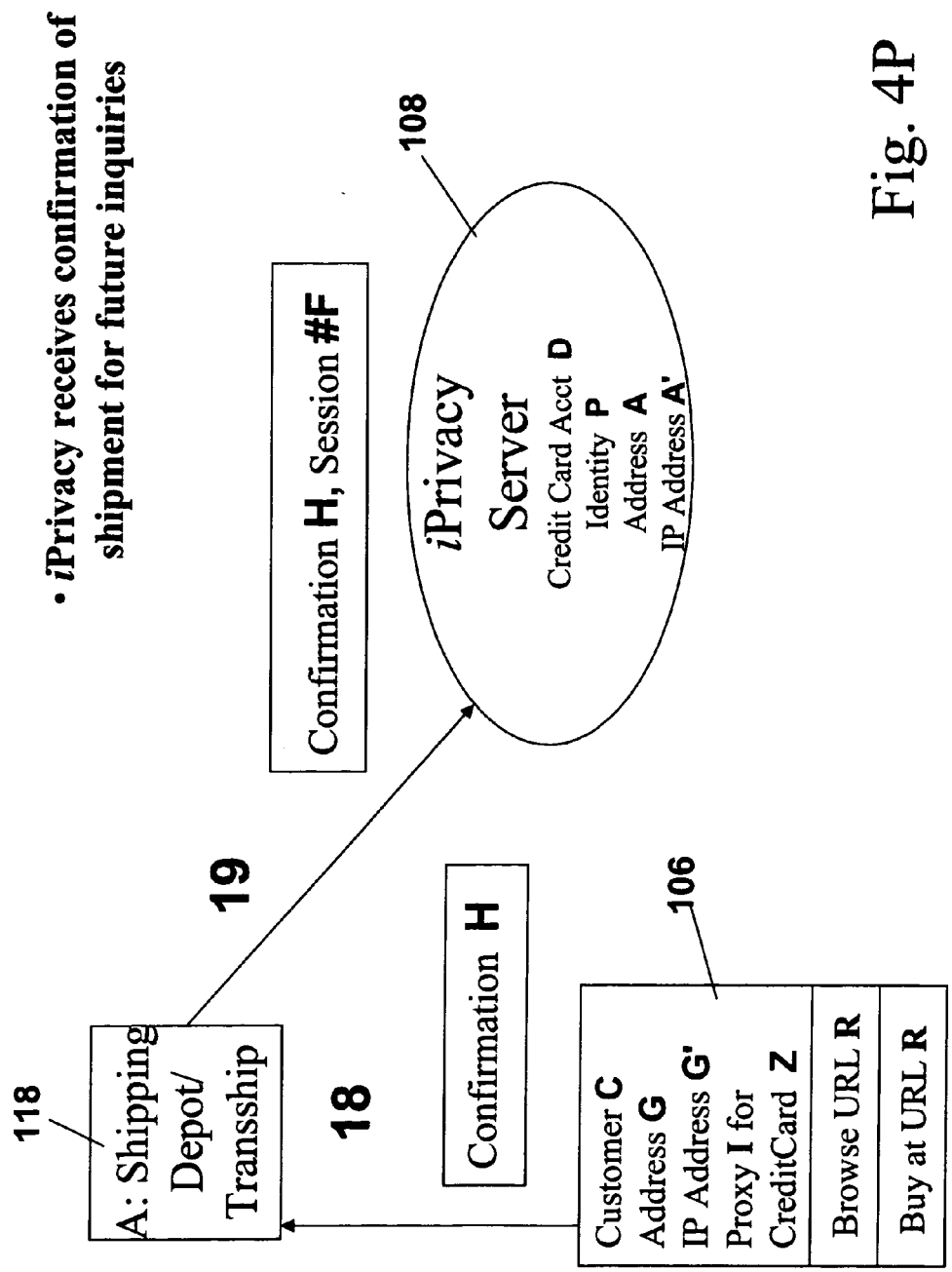

The proxy computer 108 in step 16 (FIG. 4O) directs the depot A (a) to ship the good to customer address G designated by the first user to the proxy system if the good is to be trans-shipped or (b) to hold it for pick-up ("C Picks Up"). The information needed for trans-shipping is contained in the SAM database 119 (FIG. 3B), which may be located at the delivery facility 118 or elsewhere. If the good is not to be trans-shipped, it is held at the depot A for pick-up, otherwise it is transshipped to the customer address G in step 17 (FIG. 4 O). If the good is held for pick-up, the proxy computer is informed when the good is picked up. If it is transshipped, in step 18 (FIG. 4P) confirmation of receipt (H) by the customer is provided to the shipping depot A, which informs (provides H plus #F to) the proxy computer 108 in step 19.

Figure 4Q:
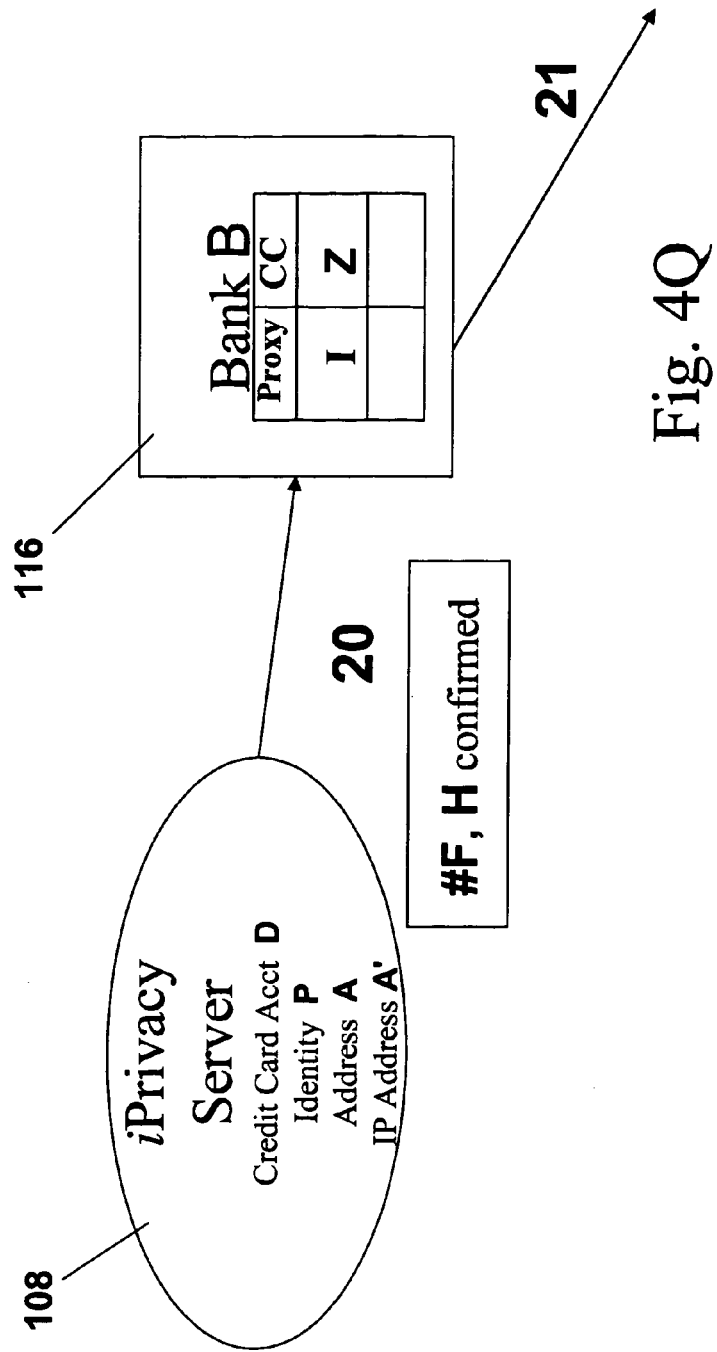

The proxy computer 108 confirms to the bank B in step 20 (FIG. 4Q) that the good was shipped by providing the session identifier #F and the confirmation H. In step 21, the bank B nets the transactions as illustrated in FIG. 5, including payment of a fee to the proxy party, as follows: the Customer C is charged $Y; and settles with the bank B; the retailer R is paid $Y less the customary transaction fee by the bank B; and the proxy party (iPrivacy) is paid a percentage of the transaction fee by the bank B. The bank B's transaction data, stored in a transaction database 117 (FIG. 3B), is shown in FIG. 7, where time T indicates transactions relating to the Customer C, and time "T+μ" indicates transactions relating to the proxy party (iPrivacy). FIG. 7 shows the data generated by the transaction which the proxy party can store in the transaction database 115 (FIG. 3B), and where appropriate, make available to others.

The proxy tracking numbers J and J' are provided via the SAM database 119 (FIG. 3B) and to the user through the proxy system or via email to the user for the user to track the delivery. The retailer R does not receive the second hop tracking number J'.

In the embodiment described above, the session identifier #F is the data key to the data record for the transaction.

Variations of the transaction represented in FIG. 4 are possible and contemplated. As discussed above, in another embodiment represented in FIG. 3C, two'banks are involved: one as the credit card company of the user (third party) and the other as the credit card company of the proxy (fourth party).

FIG. 3B shows the authorization, crediting and debiting steps where one bank in involved, and FIG. 3C where two banks are involved. FIG. 3F shows authorization, crediting and debiting where two banks are involved and the proxy party is eliminated from the authorization, crediting, debiting and liability chains. FIG. 3G shows authorization, crediting and debiting where no proxy is involved.

Referring to FIG. 4, the authorization steps 11, 12 are between the second party vendor and the proxy system operator's bank, and the authorization steps 8 and 9 are between the proxy system and the user's bank. The order of the authorizations 8, 9 and 11, 12 may be reversed if desired. The vendor charges the purchase price to the proxy system operator's bank and the proxy system charges the purchase price to user's bank, and netting provides the two banks and the proxy system with part of the bank fee. Depending upon the arrangement, identification of the good may be withheld from both banks and the identity of the vendor may be withheld from the user's bank.

The table in FIG. 8 summarizes the transaction data available to various parties. Variations are possible regarding data available to the various parties to a transaction, some of which are indicated in the table shown in FIG. 8. The table in FIG. 8 is meant to be exemplary.

Referring to FIGS. 3, 3A–3C, the user proxy software 114a extends a user's WWW browser to monitor, filter and reroute interactions between the browser and WWW servers (retailers R). The user proxy software 114a and/the proxy computer software 114b provide anonymizing transformations of these interactions to assure user's privacy, as briefly discussed above and in more detail below.

Figure 9:
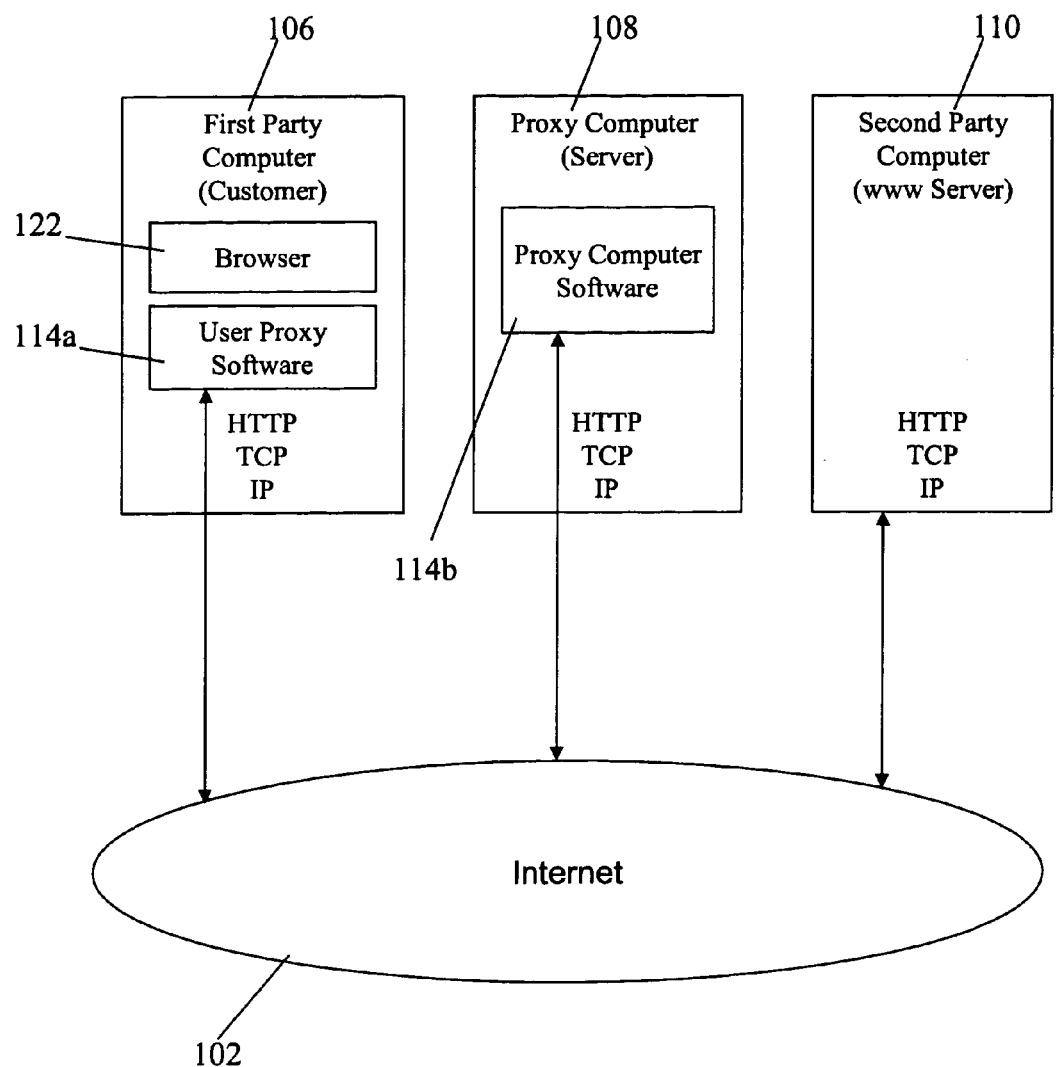
FIG. 9 is a diagram showing IP protocol layers of IP packets processed by first party (user) computers, proxy party computers and second party computers in the system depicted in FIG. 3C.

FIG. 9 depicts the various protocol layers of IP packets processed by first party (user) computers, proxy party computers and second party computers. With the user proxy software 114a active, the proxy computer software 114a strips the user computer's IP address G' (FIG. 4) in cooperation with the user proxy software and substitutes the proxy computer's IP address (identifier A'), which redirects the messages to the respective destination WWW server (second party retailer computer 110). (The user computer's IP address G' is needed by the proxy computer. Therefore, stripping is performed by the proxy computer software.) The TCP protocol layer does not present privacy risks and the proxy computer software does not intervene in its processing. The HTTP protocol layer has various header fields that provide identification of the source browser system. The proxy computer software 114b replaces all information in these fields with headers that represent the proxy system that do not disclose private information about the customer's browser system.

In addition, the proxy computer 108 monitors and filters private information in HTML documents. In particular, when a form is presented to the customer computer that includes identifying fields, the user can select a private channel mode on the customer computer browser and have the respective fields filled with information that identifies the proxy system instead, and does not compromise the user's information. The proxy computer also protects the user's system against access by Java agents to private data.

For example, the HTTP header may be replaced and the header contents filtered. As part of the content filtering, the user proxy software and/or proxy computer software also removes private past history from the content portion of the message to be transmitted to the designated WebPage. The level of filtering may be made user selectable.

Content filtering may be accomplished as follows, for example.

1. Filtering cookie data: Various transactions with WWW servers deposit cookie data on user's PC's. This cookie data is used to simplify access by users to various services and to maintain status of transactions between a WWW server and a browser. However, cookie data is often used to identify the user and correlate access to multiple services, thus compromising private data. The proxy software manages the cookie data to limit access to the data by external software. The proxy software allows access to cookies only to the owner system that created it. Thus, a given WWW server can only access cookie data that it deposited but not other cookie data generated by others.

2. Filtering data collected by active code: Some web pages may include active code such as Java applets (or Java scripts), or Active X. This code may access various files and data of the user's computer. The proxy system creates a protective shell around the interpreters of these active procedures (e.g., a Java virtual machine) that routes all accesses to such data to respective anonymizing data sources.

There are alternate means of accomplishing the filtering of communications at the various layers in the protocol stack, from IP addresses on up to the HTTP layer and beyond. The filtering function that secures the user's private information can be implemented at the operating system layer, or as modules that are callable by existing operating system software, or as complete changes to the browser at the application level. For example, the client proxy software may be implemented as a completely new downloaded browser modified to filter and secure the user's private information, or as "plug in" software modules that are directly called by the user's browser to perform the filter function, or as direct revisions of the underlying operating system modules (in the case of windows, rewriting and installing newer versions of Window's dynamic link library modules otherwise known as DLLs), or as device drivers that sit on top of the TCP/IP, software and filter the communications that flow to and from the protocol processing software, or "packet sniffing" software packages that capture communications packets that flow into and out of the PC client and that then may be used to filter the contents of those packets, or as wrapper technology, software that captures any interactions with the operating system modules that filters the communication between these modules. The latter technique is the preferred embodiment since the wrapper technology allows access to user private information to filter it while communicating via a transport protocol such as TCP/IP, and as well allows access to the operating system's file system so that cookies and privacy compromising code such as cgi scripts, or Java code, etc., may be accessed and filtered. Robert Balzar of the University of Southern California Information Science Institute has made available information on Windows OS wrapper technology that intercepts Windows DLL calls.

3. Replacing compromising procedures: With XML, information pages loaded by a server into a user PC may incorporate marks that activate compromising procedures. The meaning of such marks is defined by XSL and DTD files, processed by a local XML interpreter at the browser. The XSL files bind a mark to its meaning. The proxy system replaces compromising procedures defined by XSL files, with alternative XSL files that assign non-compromising procedures to retrieve anonymized data instead. This mechanism is not strictly necessary because the filtering described in 2 above will prevent access to compromising data anyway; the main purpose of replacing XSL libraries is to accelerate and simplify filtering whenever possible.

Figure 10:
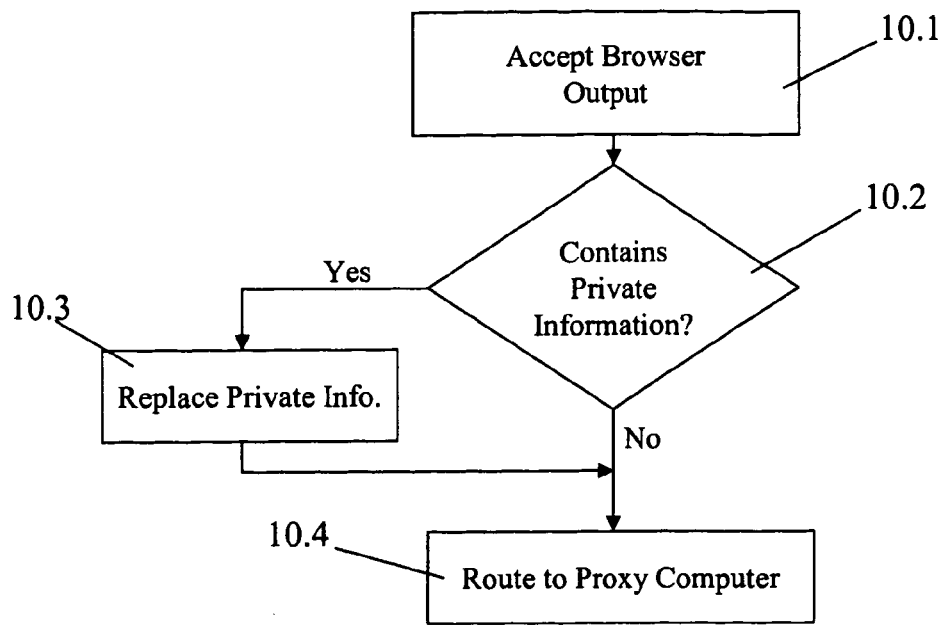
FIG. 10 is a flow chart illustrating an algorithm for filtering outgoing information from first party computers to the WWW in the system depicted in FIG. 3B.

The proxy system 112 (FIGS. 3, 3A–3C) runs two protection algorithms, one for outgoing information and one for incoming information. The algorithm for outgoing information is illustrated in the flow chart depicted in FIG. 10. In step 10.1 the outgoing information to be sent by a browser, or any code activated by the browser, is captured and analyzed by the user proxy software 114a (FIGS. 3, 3A–3C). This information is analyzed in step 10.2 to determine whether it includes private information; for example, user name and password or a transaction form. If so, the private information is replaced with proxy system information (step 10.3) and the entire data is sent to the proxy computer 108 (step 10.4) where it is further processed. In step 5, all data is routed through the proxy computer 104 to hide the IP source address. Tunneling may be used to forward packets from the user proxy software 114a in the customer computers 106 to the proxy computer software 114b in the proxy computer 108.

Figure 11:
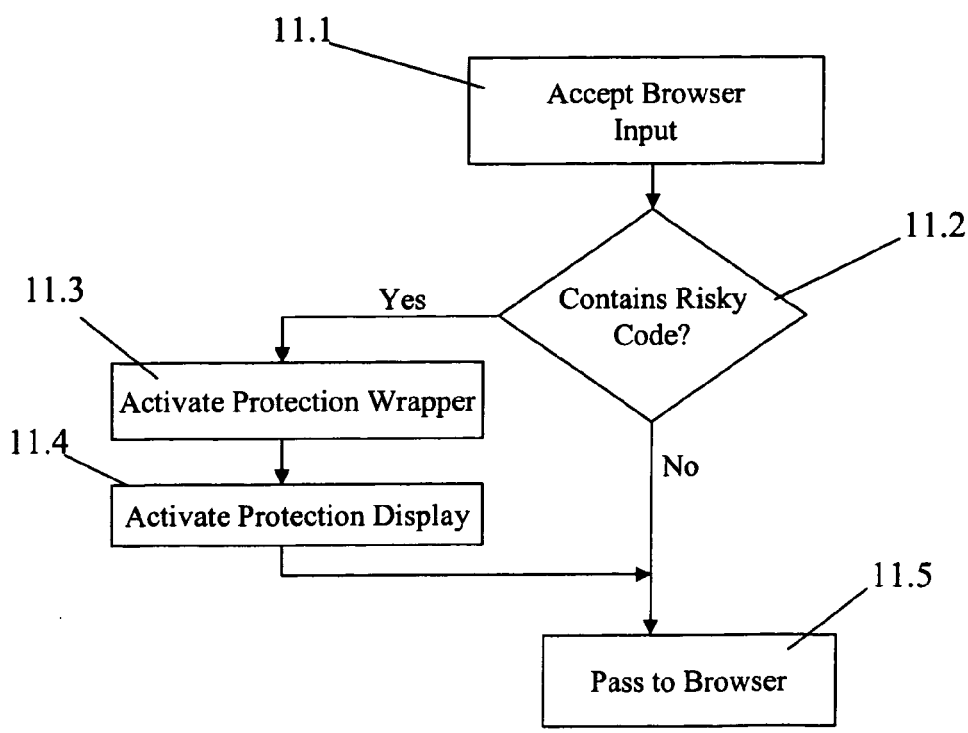
FIG. 11 is a flow chart illustrating an algorithm for filtering incoming information from the WWW to first party computers in the system depicted in FIG. 3B.

The flow chart in FIG. 11 illustrates the proxy system algorithm to handle incoming data arriving at a browser, or code activated by the browser. After accepting the data (step 11.1), the user proxy software 114a (FIGS. 3, 3A–3C) analyzes its contents to identify code that may be used to compromise the user private information. Such code can include HTML forms, or Java applets/scripts. If such code is found, the user proxy software 114a activates a protection wrapper to monitor and filter all interactions between this code and local resources (step 11.3). The wrapper will, depending on privacy selection by the user, prevent code from accessing local resources that may compromise private information. Additionally, if such code requires user input of private information, the protection display activated in step 11.4 enables the user to enter proxy system data instead of private information.

The proxy computer(s) 108 (FIGS. 3, 3A–3C) perform two major functions. First, the proxy computer route IP packets between customer computers 106 (proxy clients) and second party vendor computers 110 (WWW servers) via respective tunnels that hide the IP source identity. This function is performed at the network protocol layer by respective routers/switches. Upon activation of the user proxy software 114a, the proxy computer software 114b and user proxy software 114a authenticate each other and then establish a tunnel between them. The proxy computer strips the source IP envelope produced by the user proxy software and forwards the internal IP packets to the destination. This internal IP packet is configured with a proxy computer address as the source address. When an IP packet is returned to this source address, the proxy computer tunnels it to the respective user proxy software.

Second, the proxy computer software 114*b* (FIGS. 3, 3A–3C) interacts with the user proxy software 114*a* to privatize transactions between user computers 106 and respective transaction servers (second party vendor computers) 110. The user proxy software captures forms used by user computers to handle transactions. The fields of these forms are replaced by the user proxy software with data identifying the proxy computer as the transacting entity.

The proxy computer uses this data to obtain authorization from a respective credit card clearing service for the transaction amount and then to submit a respective privatized transaction to the vendor computer, which sees only data identifying the proxy computer as the source of the transaction.

Figure 12:
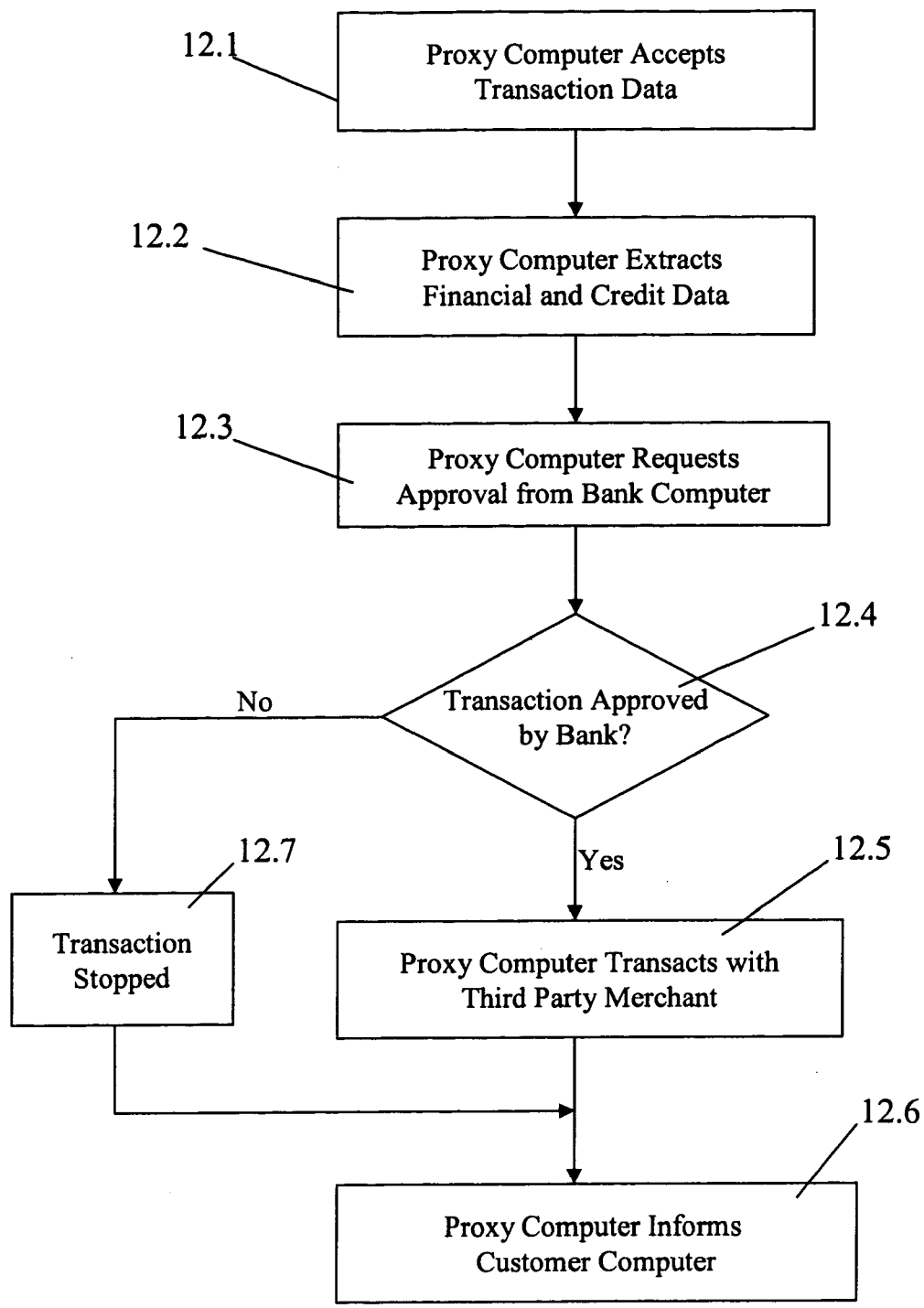
FIG. 12 is a flow chart illustrating authorization of a purchase from a first party computer in the system depicted in FIG. 3B.

The proxy computer algorithm that handles this credit processing is depicted in FIG. 12. In step 12.1 the proxy computer obtains transaction data created by the user proxy software 114*a* (FIGS. 3, 3A, 3B), and uses this data to extract the financial data needed to execute the transaction (step 12.2) and pursue clearing of the financial transaction with a credit card clearing entity (bank B, FIG. 4) (step 12.3). If the credit card entity approves the transaction (step 12.4) the proxy computer transacts on behalf of the user computer 106 with the retailer server 110 (step 12.5), the proxy computer becoming a proxy client to the retailer service. For example, the proxy computer will submit the transaction form of the retailer filled with financial data and shipping address identifying the proxy computer as the client. In step 12.6 the proxy computer instructs the user proxy software on the transaction status (e.g., completed or denied) and the user proxy software presents the results to the respective user computer.

A retailer transacting with a customer (user) through the proxy system will produce deliverable goods that need to be sent to the customers. In order to hide a customer's shipping address, the packaged goods are labeled with a code, preferably machine readable such as a bar code, that identifies a proxy authorized, associated or owned shipping facility as the delivery address. In a label-switching embodiment, the proxy system shipping depot scans these labels and produces respective labels with the destination address designated by the customer. The package is relabeled (or repackaged or wrapped) and then sent to the customer-designated address. In a first hop, the shipper delivers the package sent by the retailer labeled with the unique session identifier #F to the proxy shipping depot 118 (FIGS. 3A–3B). The proxy shipping depot A, uses this session identifier to generate a label with the customer designated address, and the customer's name. In case of return, the proxy shipping depot A reverses the process and relabels the package with the respective identifier. This information is stored in the SAM database 119 (FIG. 3B), which may be located at the delivery facility.

Figure 13:
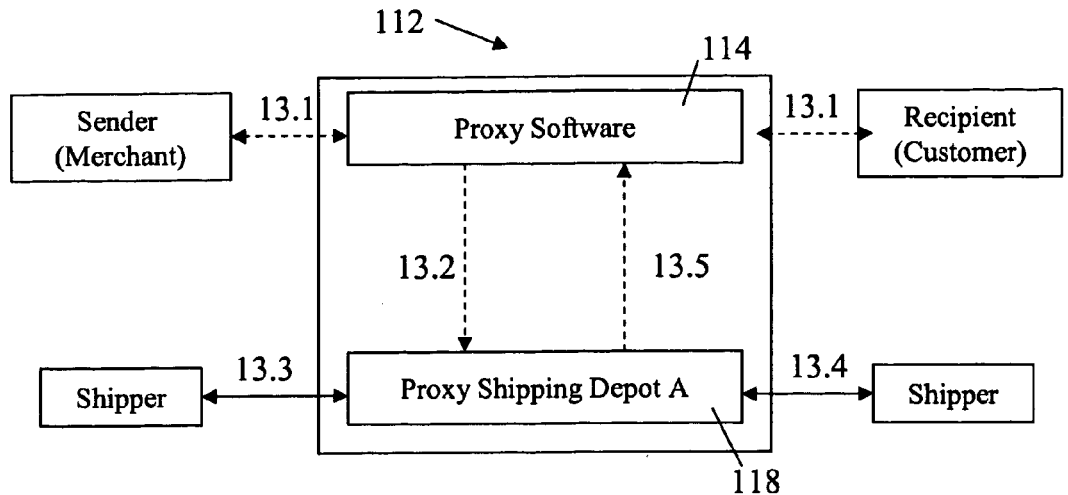
FIG. 13 is a block and flow chart illustrating shipping, relabeling and delivery of a good purchased, for example, using the system depicted in FIG. 3B.

FIG. 13 illustrates label switching and depicts the sender (retailer), recipient (customer), shippers and two proxy system entities (FIG. 3B, proxy software 114 and proxy shipping depot 118) within the box who are responsible for protecting the private information of the recipient/customer by creating a privacy protection barrier separating the sender/retailer from the recipient/customer. The proxy software brokers transactions between sender/retailer and recipient/customer (e.g., for passing credit card payment) while protecting private information. The proxy shipping depot 118 performs label switching, and protects private information of the recipient/customer through shipping and/or return. These roles of privacy protection may be provided by the same party or by different parties. For example, a shipper may provide the proxy shipping depot functions and the proxy party may provide the other functions, or the proxy party may provide all of the functions.

Referring to FIG. 13, a transaction with label-switched shipping proceeds as follows. A recipient/customer concludes a transaction with a sender/retailer using the proxy software. The proxy software generates a unique (session) identifier (#F) of the transaction and in step 13.1 provides it to the sender/retailer and recipient/customer. In step 13.2, the proxy software provides the unique identifier and the respective recipient identity and shipping address to the proxy shipping depot 118. In step 13.3, a package containing the ordered good labeled with the unique identifier is delivered to the proxy shipping depot 118, where a new shipping label is generated with the identifier and address of the recipient/customer and applied to the package (or the package is repackaged or wrapped etc. with the new label). In step 13.4, the relabeled package is delivered via a shipper to the address designated by the recipient/customer. To return a good while securing the recipient/customer's private information, in step 13.5, the proxy shipping depot 118 reverses the process, replacing the label with a unique identifier and notifying the proxy software of the relabeled shipment.

The above steps may involve multiple different media for communications and/or label switching. Specifically, in step 13.1, handling a transaction that results in shipping may be conducted electronically (indicated by broken lines) over a computer network such as the Internet. Alternatively, it may be handled via a telephone call for a catalogue order; a fax transmission of an order; or any other form of communications. Step 13.2 may be conducted through transmission of a message to the label-switching provider or by providing actual labels. In step 13.3, label-switching may too be handled in many ways. The unique identifier of a package may be coded in a bar code printed on a shipping label; alternatively it may be supplied as a number or a string of characters or any other form that uniquely identifies the package. The proxy shipping depot 118 will typically use special equipment to read the label and identify the recipient name and address. It may print this data on a new label to be placed on the package. Alternatively, it may provide the shipper with a file that can be used to generate the shipping address on a computer screen by scanning the label. This enables the shipper to deliver the package directly based on the original identifier.

Label-switched shipping accomplishes the following: (a) two way privacy protection; (b) two-way verifiability through complete tracing of each shipping stage; (c) one-time per-shipping privacy; and (d) full coordination and exchange of data with all entities participating in a transaction. Thus, label-switched privacy-protection accomplishes the primary goals identified above. There is, however, an extra cost in the transaction for handling the label switching. Such costs are scalable and are incurred per shipment not per recipient or sender as with the costs of POB-based techniques. The alternative method of delivery, depot pick-up, does not introduce additional costs and, in fact, can result in cost savings compared to current shipping.

Figure 14:
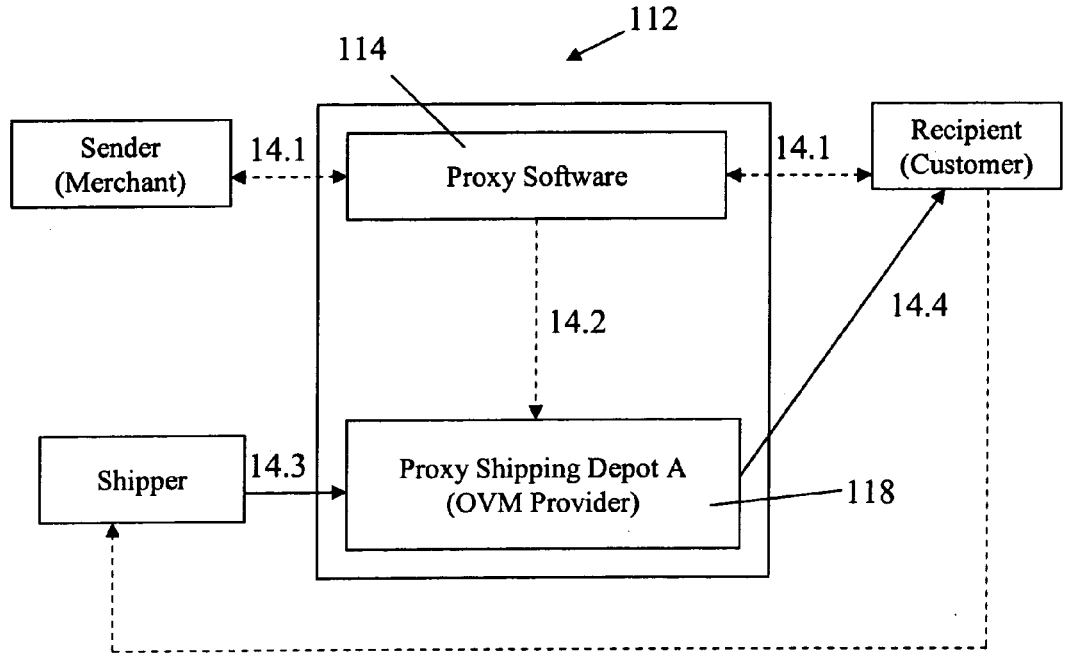
FIG. 14 is a block and flow chart illustrating operation of depot pick-up of a good purchased, for example, using the system depicted in FIG. 3B.

One-time Virtual Mailbox (OVM) technique for privacy-protected shipping operates as follows. This technique is called one-time virtual mailbox because the OVM provider (e.g., the proxy shipping depot 118) functions as if a virtual mailbox has been opened and terminated for a package and the recipient must use a secret key to retrieve its contents. Referring to FIG. 14, step 14.1 is the same as step 13.1 described above for label-switched shipping. In steps 14.2 and 14.3, the sender/retailer ships the package via a shipper to the address of an OVM provider depot (e.g., the proxy shipping depot 118) with a unique identifier printed on the package. For example, OVM77432572980975, 10 Main Street, Any Town, USA 12345. The shipper (step 14.3) delivers the package to the OVM depot at the depot's address. The recipient claims the package (step 14.4) by providing the OVM depot with the unique session identifier #F on the package, and optionally other information such as the order number. Preferably, a second form of authorization is required, for example, secret information such as a biometric or a confidential code or password known to the recipient and the OVM provider. A return is accomplished in step 14.5, where the process is reversed and simplified. The recipient/customer ships the return package directly to the sender/retailer with the respective OVM delivery identifier.

Tracking of the user's delivery is accomplished easily by the SAM database 119 (FIG. 3B) and the trans-shipper's tracking system. By providing a tracking number to the Retailer R that only reveals the depot address, or another proxy address, the user's true address is secured from the retailer, who cannot determine the true address from the tracking system. The true tracking number provided to the user provides the means of tracking the shipment.

The OVM and the proxy tracking number technique accomplishes privacy-protected shipping, which may be implemented using various media, communications and transactions.

Although the invention has been described and illustrated in connection with preferred embodiments, many variations and modifications, as will be apparent to those of skill in the art, may be made without departing from the spirit and scope of the invention. The invention as set forth in the appended clams is thus not limited to the precise details of construction set forth above as such variations and modifications are intended to be included within the spirit and scope of the invention as set forth in the claims.

The invention claimed is:

1. A system for a first party using a first device to order a good from a second party using a second device over a communications network linking the first and second devices, the first party having information of a personal or private nature specific to the first party or the first device including the first party's name and a first address associated therewith, the system providing for payment to the second party while securing said first party's name and first address from to second party, comprising:
   a proxy device altering information of a personal or private nature including at least the first party's name and first address directed from the first device to the second device to prevent the second party from determining said information of a personal or private nature specific to the first party of the first device;
   at least a third device communicating with the proxy device for approving or disapproving the purchase based on financial information of the first party available to the third device, and if the purchase is approved, for electronically crediting an amount to the second party and electronically debiting a payment from the first party and electronically crediting the proxy device with a transaction fee, wherein the third device divides the payment electronically debited from the first party into at least said amount credited to the second party and said transaction fee credited to the proxy device.

2. The system of claim 1 wherein the first device comprises a first computer, the second device comprises a second computer, the proxy device comprises a proxy computer and proxy software associated with the first computer or the proxy computer, and the third device comprises a third computer, the proxy software and the third computer cooperating to provide for approval or disapproval of the purchase based on financial information of the first party, and if the purchase is approved, the third computer providing for payment to the second party and debiting of the first party.

3. The system of claim 1 further comprising:
   a fourth device communicating with the proxy device to provide for approval or disapproval of the purchase based on financial information relating to the first party and a fifth device to provide for approval or disapproval of the purchase based on financial information relating to the proxy device, and if the purchase is approved, the fifth device electronically crediting the second party and electronically debiting the proxy device and the fourth device electronically crediting the proxy device and electronically debiting the first party;
   the system being configurable for operation with either the third device or the fourth and fifth devices.

4. The system of claim 3 wherein the first device comprises a first computer, the second device comprises a second computer, the third device comprises a third computer, the fourth device comprises a fourth computer, the fifth device comprises a fifth computer, and the proxy device comprises a proxy computer and proxy software associated with the first computer or the proxy computer, the proxy software cooperating at least with the third computer to approve and disapprove the purchase.

5. The system of claim 4 wherein the third computer or the fourth computer, or both, provide for payment of a fee to the proxy computer for the proxy computer's participation in purchases in which the third computer or the fourth computer also participates.

6. The system of claim 1 wherein the system is configurable to provide certain of said information of the first party to the third device beyond information required to provide for approval and disapproval of the purchase.

* * * * *